US011046595B2

(12) United States Patent
Cam et al.

(10) Patent No.: US 11,046,595 B2
(45) Date of Patent: Jun. 29, 2021

(54) ELECTROCHEMICAL TREATMENT METHODS

(71) Applicant: Hydrus Technology Pty. Ltd., Brisbane (AU)

(72) Inventors: David Victor Cam, Brisbane (AU); John Frederick Ellers, Brisbane (AU); Brook Douglas Hill, Brisbane (AU)

(73) Assignee: Hydrus Technology Pty. Ltd., Brisbane (AU)

( * ) Notice: Subject to any disclaimer, the term of this patent is extended or adjusted under 35 U.S.C. 154(b) by 18 days.

(21) Appl. No.: 15/313,476

(22) PCT Filed: May 22, 2015

(86) PCT No.: PCT/AU2015/150269
§ 371 (c)(1),
(2) Date: Nov. 22, 2016

(87) PCT Pub. No.: WO2015/176137
PCT Pub. Date: Nov. 26, 2015

(65) Prior Publication Data
US 2018/0009681 A1    Jan. 11, 2018

(30) Foreign Application Priority Data

May 23, 2014  (AU) ................................ 2014901949
Jan. 16, 2015  (AU) ................................ 2015900125
(Continued)

(51) Int. Cl.
*C02F 1/463*     (2006.01)
*B01D 17/06*    (2006.01)
(Continued)

(52) U.S. Cl.
CPC .......... *C02F 1/463* (2013.01); *B01D 17/0211* (2013.01); *B01D 17/06* (2013.01);
(Continued)

(58) Field of Classification Search
CPC .............. C02F 2305/10; C02F 2303/24; C02F 2301/08; C02F 2301/022; C02F 2209/44;
(Continued)

(56) References Cited

U.S. PATENT DOCUMENTS 2,931,412 A    4/1960  Wing
3,728,245 A    1/1973  Preis et al.
(Continued)

FOREIGN PATENT DOCUMENTS

AU          784188       7/2003
AU       2012244232      5/2013
(Continued)

OTHER PUBLICATIONS

International Search Opinion; PCT/AU2015/050269.
(Continued)

*Primary Examiner* — Louis J Rufo
(74) *Attorney, Agent, or Firm* — Leydig, Voit & Mayer, Ltd.

(57) ABSTRACT

Methods of treating a fluid mixture include performing a first treatment on the mixture with electrochemically produced ions to separate an aqueous phase and a hydrophobic phase and performing a second electrochemical treatment on the separated aqueous phase to thereby remove aqueous contaminants from the aqueous phase wherein substantially laminar flow of fluid occurs between electrodes in the second electrochemical treatment.

19 Claims, 22 Drawing Sheets

(30) Foreign Application Priority Data

Apr. 27, 2015 (AU) ................. 2015901496
Apr. 27, 2015 (AU) ................. 2015901497

(51) Int. Cl.
- *B03C 11/00* (2006.01)
- *B01D 17/02* (2006.01)
- *C02F 9/00* (2006.01)
- *C02F 1/467* (2006.01)
- *C02F 101/32* (2006.01)
- *C02F 103/10* (2006.01)
- *C02F 1/32* (2006.01)
- *C02F 1/28* (2006.01)
- *C02F 1/44* (2006.01)
- *C02F 1/461* (2006.01)
- *C02F 1/36* (2006.01)
- *C02F 1/30* (2006.01)
- *C02F 1/42* (2006.01)

(52) U.S. Cl.
CPC ............. *B03C 11/00* (2013.01); *C02F 9/00* (2013.01); B03C 2201/02 (2013.01); C02F 1/283 (2013.01); C02F 1/302 (2013.01); C02F 1/32 (2013.01); C02F 1/36 (2013.01); C02F 1/42 (2013.01); C02F 1/441 (2013.01); C02F 1/442 (2013.01); C02F 1/4672 (2013.01); C02F 2001/46152 (2013.01); C02F 2101/32 (2013.01); C02F 2101/325 (2013.01); C02F 2103/10 (2013.01); C02F 2201/4613 (2013.01); C02F 2201/4619 (2013.01); C02F 2201/46145 (2013.01); C02F 2209/44 (2013.01); C02F 2301/022 (2013.01); C02F 2301/08 (2013.01); C02F 2303/24 (2013.01); C02F 2305/10 (2013.01); Y02W 10/37 (2015.05)

(58) Field of Classification Search
CPC .... C02F 2201/4619; C02F 2201/46145; C02F 2201/4613; C02F 2103/10; C02F 2101/325; C02F 2101/32; C02F 2001/46152; C02F 9/00; C02F 1/4672; C02F 1/463; C02F 1/442; C02F 1/441; C02F 1/42; C02F 1/36; C02F 1/32; C02F 1/302; C02F 1/283; B03C 2201/02; B01D 17/06; B01D 17/0211
See application file for complete search history.

(56) References Cited

U.S. PATENT DOCUMENTS

| | | | |
|---|---|---|---|
| 3,925,176 A | 12/1975 | Okert | |
| 4,293,400 A | 10/1981 | Liggett | |
| 4,732,661 A | 3/1988 | Wright | |
| 4,872,959 A | 10/1989 | Herbst et al. | |
| 5,043,050 A | 8/1991 | Herbst | |
| D331,105 S | 11/1992 | Bender et al. | |
| 5,302,273 A | 4/1994 | Kemmerer | |
| 5,423,962 A | 6/1995 | Herbst | |
| 5,558,755 A | 9/1996 | Gardner-Clayson et al. | |
| 5,611,907 A | 3/1997 | Herbst et al. | |
| 5,807,473 A | 9/1998 | Sadler et al. | |
| 5,954,937 A | 9/1999 | Farmer | |
| 5,958,213 A | 9/1999 | Goto | |
| 6,139,710 A | 10/2000 | Powell | |
| 6,238,546 B1 | 5/2001 | Knieper et al. | |
| 6,274,028 B1 * | 8/2001 | Hu | C02F 1/46114 205/753 |
| 6,309,519 B1 | 10/2001 | Napper | |
| 6,488,835 B1 | 12/2002 | Powell | |
| 6,613,217 B1 | 9/2003 | Gilmore | |
| 6,652,733 B2 | 11/2003 | Napper | |
| 6,663,783 B2 | 12/2003 | Stephenson et al. | |
| 6,746,593 B2 | 6/2004 | Herbst | |
| 6,780,292 B2 | 8/2004 | Hermann et al. | |
| 6,849,178 B2 | 2/2005 | Hecking | |
| 6,866,757 B2 | 3/2005 | Gilmore | |
| 6,962,662 B2 | 11/2005 | Wurzburger | |
| 6,972,077 B2 | 12/2005 | Tipton et al. | |
| 7,211,185 B2 | 5/2007 | Powell | |
| 7,252,752 B2 | 8/2007 | Holland | |
| 7,258,800 B1 | 8/2007 | Herbst | |
| 7,682,492 B2 | 3/2010 | Bradley | |
| 7,758,742 B2 | 7/2010 | Powell | |
| 7,862,700 B2 | 1/2011 | Wilkins et al. | |
| 7,892,439 B2 | 2/2011 | Hadjiev et al. | |
| 7,943,087 B2 | 5/2011 | McGuire et al. | |
| 7,981,293 B2 | 7/2011 | Powell | |
| 7,981,301 B2 | 7/2011 | Powell | |
| 7,998,225 B2 | 8/2011 | Powell | |
| 8,048,279 B2 | 11/2011 | Powell et al. | |
| 8,157,972 B2 | 4/2012 | Hegel et al. | |
| 8,192,617 B2 | 6/2012 | Powell | |
| 8,318,027 B2 | 11/2012 | McGuire et al. | |
| D675,171 S | 1/2013 | Tanaka | |
| 8,460,520 B2 | 6/2013 | Rigby | |
| 8,551,305 B2 | 10/2013 | Behr | |
| D695,699 S | 12/2013 | Shih | |
| 8,641,875 B2 | 2/2014 | McAlister | |
| 8,871,691 B2 | 10/2014 | Rey et al. | |
| 2001/0047934 A1 | 12/2001 | Satoh | |
| 2002/0040855 A1 | 4/2002 | Morkovsky et al. | |
| 2003/0017578 A1 | 1/2003 | Ueberle | |
| 2004/0079650 A1 * | 4/2004 | Morkovsky | C02F 1/46104 205/742 |
| 2004/0168909 A1 | 9/2004 | Larson | |
| 2005/0082164 A1 | 4/2005 | Inamoto et al. | |
| 2006/0096853 A1 | 5/2006 | King | |
| 2007/0068826 A1 | 3/2007 | Morkovsky et al. | |
| 2007/0215536 A1 | 9/2007 | Bommi et al. | |
| 2009/0068895 A1 | 3/2009 | Millard et al. | |
| 2009/0230059 A1 | 9/2009 | McGuire et al. | |
| 2010/0116650 A1 * | 5/2010 | Bostock | C02F 1/463 204/277 |
| 2010/0126879 A1 * | 5/2010 | Wilman | C02F 1/46109 205/760 |
| 2010/0252447 A1 | 10/2010 | Powell | |
| 2011/0024361 A1 | 2/2011 | Schwartzel et al. | |
| 2011/0079510 A1 | 4/2011 | Tretheway et al. | |
| 2011/0266203 A1 | 11/2011 | Frisky | |
| 2011/0297552 A1 | 12/2011 | Boyle et al. | |
| 2011/0312222 A1 | 12/2011 | Tanaka | |
| 2012/0037568 A1 | 2/2012 | Karrs et al. | |
| 2012/0103797 A1 | 5/2012 | Hermann | |
| 2012/0138482 A1 | 6/2012 | Fanfan et al. | |
| 2012/0152760 A1 | 6/2012 | Robinson | |
| 2012/0160706 A1 | 6/2012 | Poirier et al. | |
| 2012/0273367 A1 | 11/2012 | Themy et al. | |
| 2012/0298526 A1 * | 11/2012 | Haivala | C02F 1/463 205/742 |
| 2013/0112571 A1 | 5/2013 | Doi | |
| 2013/0140245 A1 | 6/2013 | Themy | |
| 2013/0161262 A1 | 6/2013 | Henley | |
| 2013/0180857 A1 | 7/2013 | Heffernan et al. | |
| 2013/0206664 A1 | 8/2013 | Kim | |
| 2013/0211113 A1 | 8/2013 | Eckelberry et al. | |
| 2013/0264210 A1 | 10/2013 | Cobas et al. | |
| 2013/0299361 A1 * | 11/2013 | Wylie | C02F 1/4672 205/755 |
| 2014/0008242 A1 | 1/2014 | Duarte | |
| 2014/0021052 A1 | 1/2014 | Andersen | |
| 2014/0054173 A1 | 2/2014 | Andersen | |
| 2014/0054225 A1 | 2/2014 | De la Monja Carter et al. | |
| 2014/0069821 A1 * | 3/2014 | Marcin | C25B 15/00 205/498 |
| 2014/0076804 A1 | 3/2014 | Kruk et al. | |
| 2014/0151300 A1 | 6/2014 | Savage et al. | |
| 2014/0158550 A1 * | 6/2014 | Seth | C02F 1/36 205/751 |

(56) References Cited

U.S. PATENT DOCUMENTS

| | | | |
|---|---|---|---|
| 2014/0174942 A1 | 6/2014 | Wylie et al. | |
| 2014/0238934 A1 | 8/2014 | Losh et al. | |
| 2014/0263094 A1 | 9/2014 | Quicksall et al. | |
| 2014/0287509 A1 | 9/2014 | Sharei et al. | |
| 2014/0311920 A1* | 10/2014 | Robinson | C02F 1/46104 205/743 |
| 2014/0339162 A1* | 11/2014 | Cao | C02F 9/00 210/638 |
| 2015/0041333 A1 | 2/2015 | Li et al. | |
| 2015/0053619 A1 | 2/2015 | Cao et al. | |
| 2015/0060289 A1* | 3/2015 | Saiki | C25D 11/16 205/50 |
| 2015/0083577 A1* | 3/2015 | Govindan | B01D 1/30 203/10 |
| 2015/0266753 A1 | 9/2015 | Fraim et al. | |
| 2015/0315055 A1 | 11/2015 | Chidambaran et al. | |
| 2016/0280566 A1* | 9/2016 | Rau, III | C02F 1/463 |
| 2016/0376172 A1 | 12/2016 | Ellers | |
| 2017/0029295 A1* | 2/2017 | Ritchie | C02F 1/24 |

FOREIGN PATENT DOCUMENTS

| | | | |
|---|---|---|---|
| DE | 4443297 | 3/1996 | |
| DE | 202012006736 | 10/2012 | |
| DE | 202012006736 | 12/2012 | |
| ES | 1069094 | 2/2009 | |
| FR | 2707282 | 1/1995 | |
| GB | 2440139 A | 1/2008 | |
| GB | 2500663 A | 10/2013 | |
| WO | 199640591 | 12/1996 | |
| WO | 199943617 | 9/1999 | |
| WO | 20010059947 | 1/2001 | |
| WO | 2003016541 | 2/2003 | |
| WO | 2004029221 | 4/2004 | |
| WO | 2007070628 | 6/2007 | |
| WO | 2010060016 | 5/2010 | |
| WO | 2012098058 A1 | 7/2012 | |
| WO | WO-2012098058 A1 * | 7/2012 | B01D 61/44 |
| WO | 2012106536 | 8/2012 | |
| WO | 2012151617 | 11/2012 | |
| WO | 2012166997 | 12/2012 | |
| WO | 2013048724 | 4/2013 | |
| WO | 2013050058 | 4/2013 | |
| WO | 2013055221 | 4/2013 | |
| WO | 2013117630 | 8/2013 | |
| WO | 2013178722 | 12/2013 | |
| WO | 2014088826 | 6/2014 | |

OTHER PUBLICATIONS

International Search Report; PCT/AU2015/050269.
International Preliminary Report; PCT/AU2015/050269.
Barkley et al. Emerging Technology Summary, Electro-Pure Alternating Current Electrocoagulation, United States Environmental Protection Agency, (1993).
Kraus and Parker (1922) The Calibration of Cells for Conductance Measurements. Journal of the American Chemical Society. 44, 2422.
Lonergan and Pepper (1965) Transport Numbers and Ionic Mobilities by the Moving Boundary Method. Journal of Chemical Education. 42, 82.
CleanWave® System Core Capabilities, Multi-Chem, published prior to Jan. 12, 2015.
Halliburton Press Release: CleanWave® Frac Flowback and Produced Water Treatment, published prior to Jan. 12, 2015.
International Preliminary Report; PCT/AU2015/050268 dated Jun. 10, 2016.
Corrected version of Written Opinion; PCT/AU2015/050268 dated Aug. 11, 2015.
Corrected version of International Search Report; PCT/AU2015/050268 dated Aug. 11, 2015.
Miller et al., "Fouling-resistant membranes for the treatment of flowback water from hydraulic shale fracturing: A pilot study," *J. Membrane Sci.*, 437: 265-275 (2013).
PCT/AU2015/050748 "International Search Report" dated Feb. 9, 2016.
Miller et al., Journal of Membrane Science, 437 (2013) 265-275.

* cited by examiner

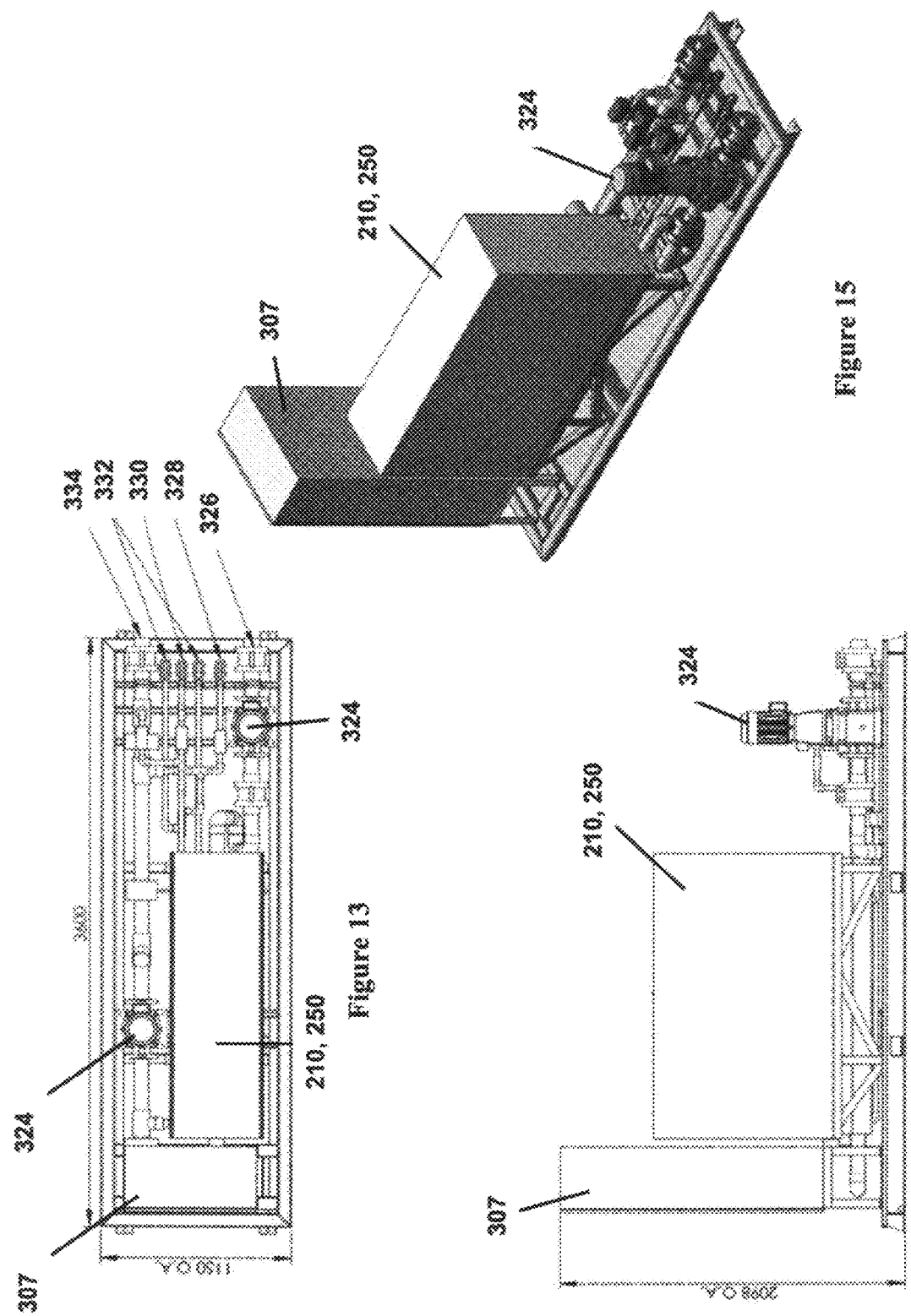

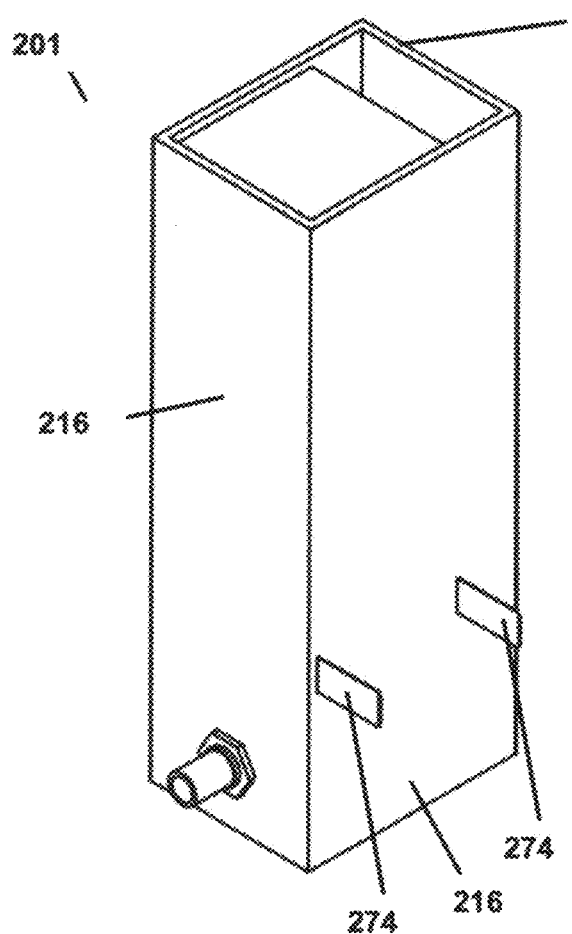
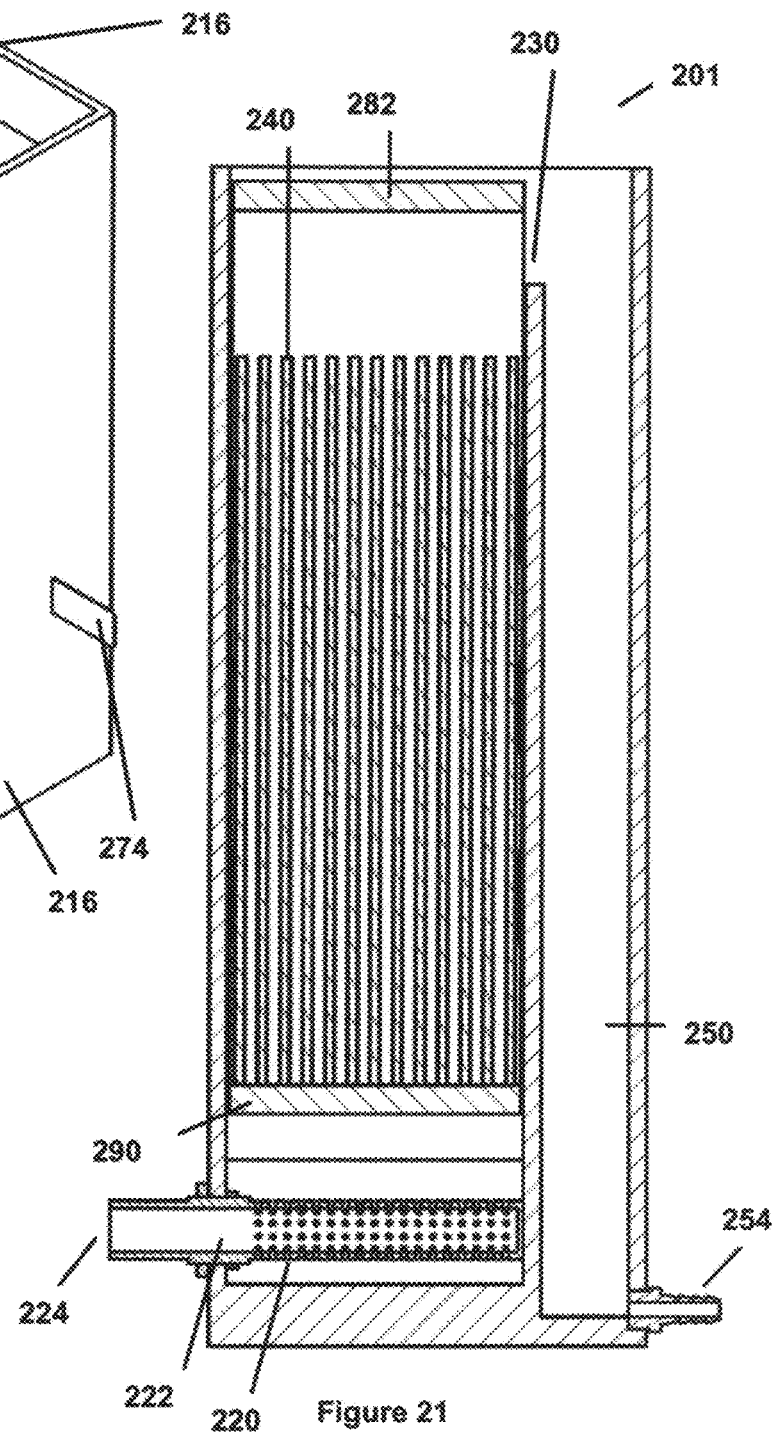
Figure 20
Figure 21

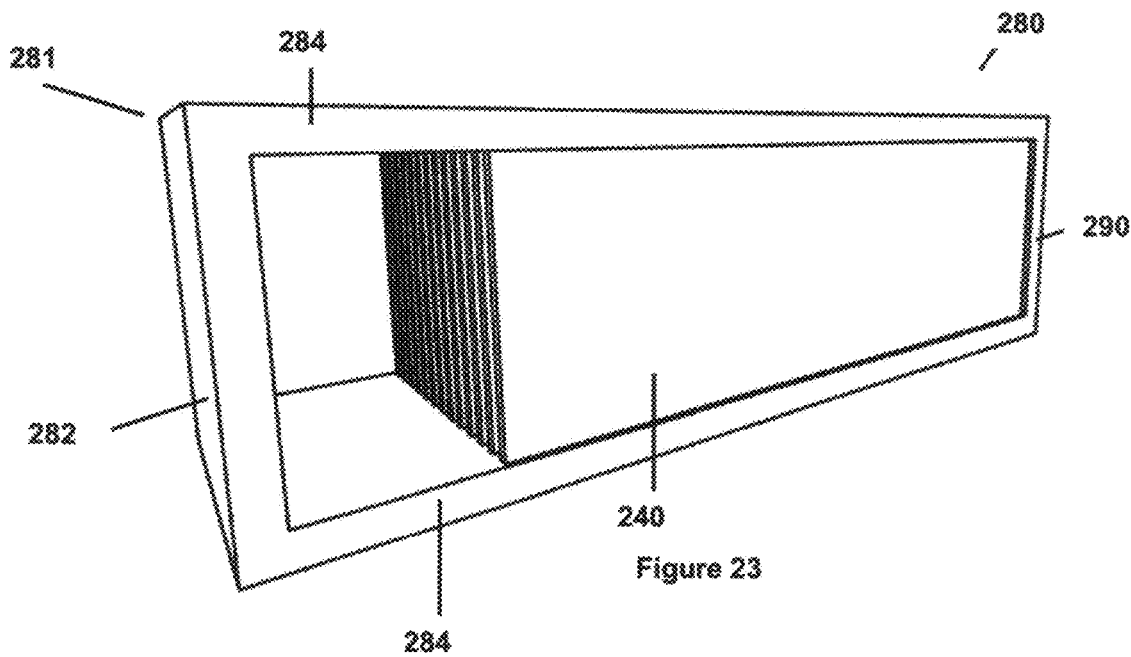
Figure 23
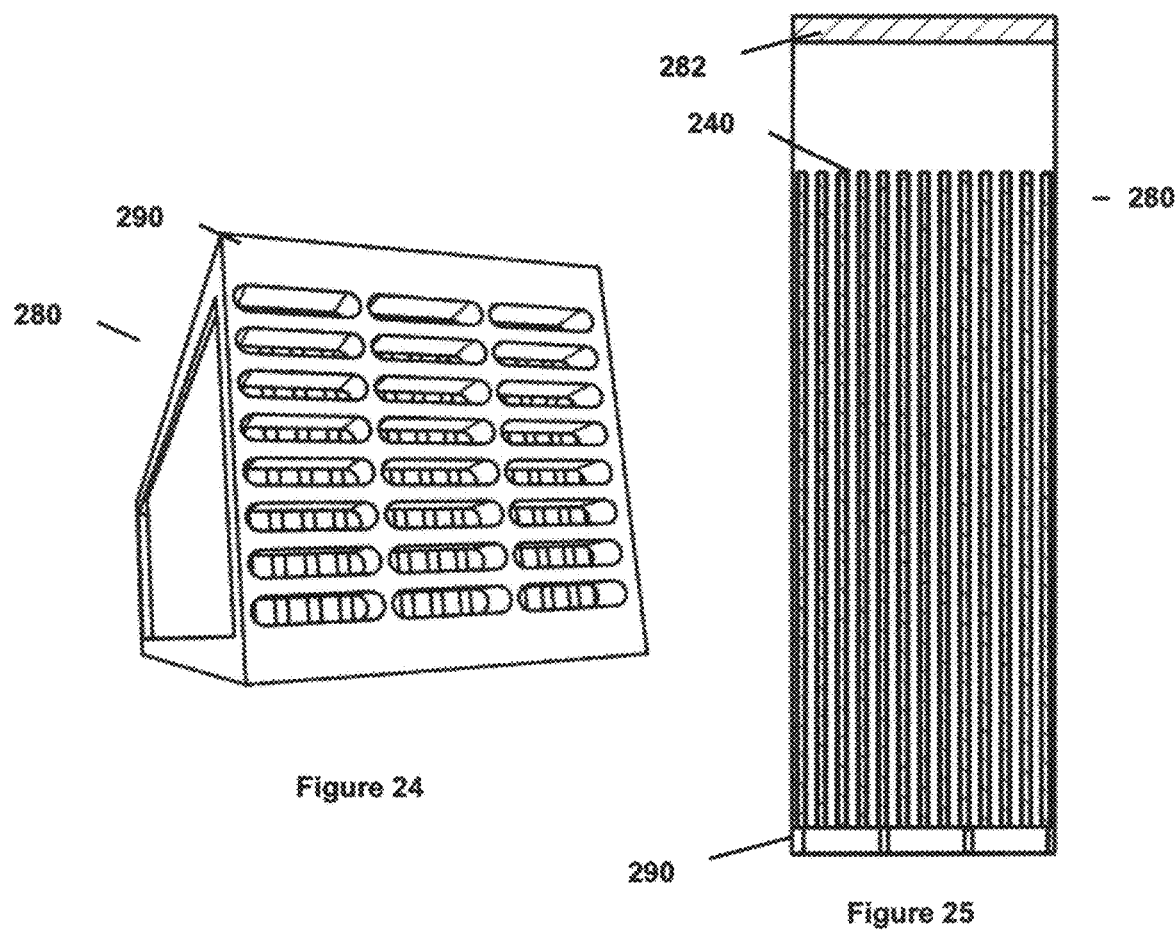
Figure 24
Figure 25

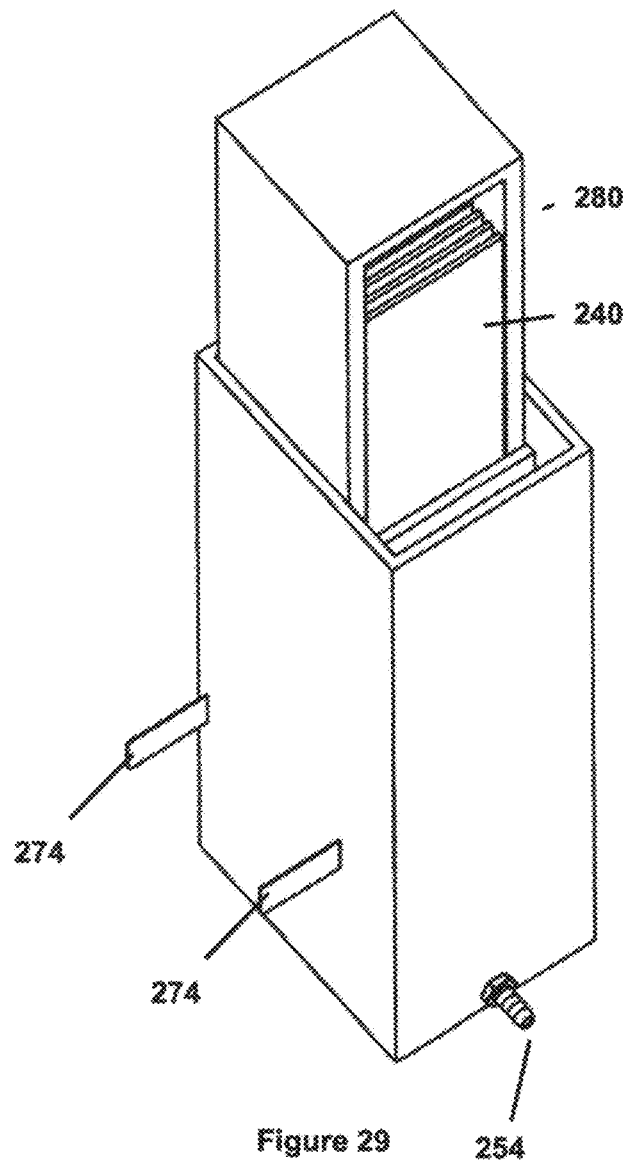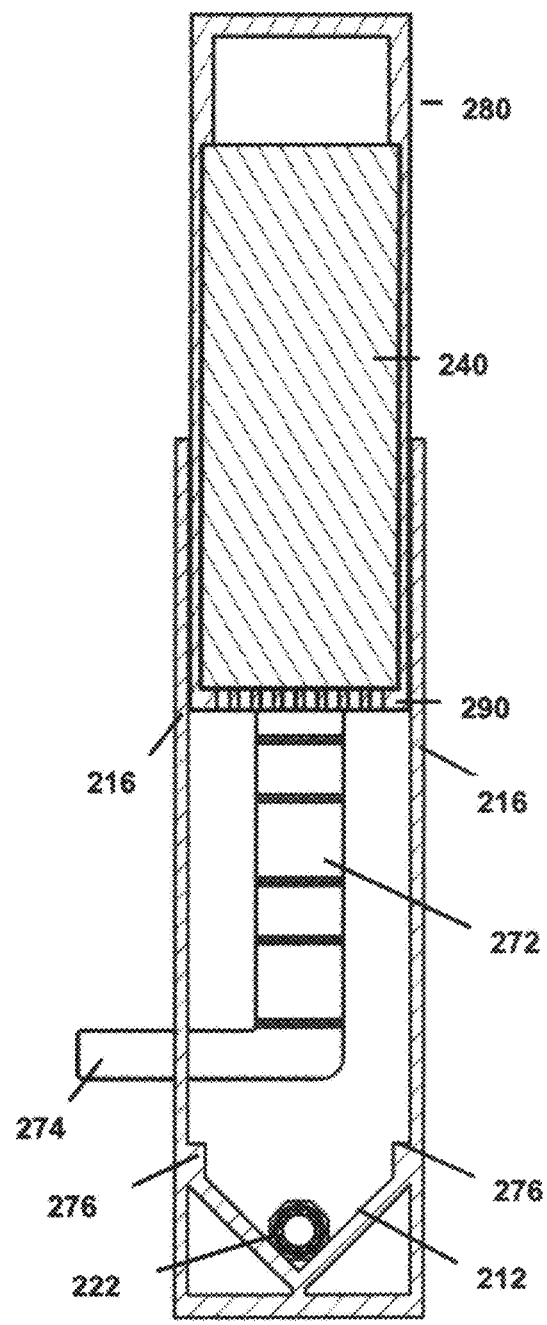
Figure 29
Figure 30

ELECTROCHEMICAL TREATMENT METHODS

TECHNICAL FIELD

The present disclosure relates, inter alia, to methods of electrochemically treating a fluid, especially wastewaters from oil and gas wells, and to an electrochemical fluid treatment apparatus and a treatment plant or system.

BACKGROUND ART

It will be clearly understood that, if a prior art publication is referred to herein, this reference does not constitute an admission that the publication forms part of the common general knowledge in the art in Australia or in any other country.

The discussion below relates to the treatment of wastewaters from oil and gas wells (including bores and reservoirs) and in particular to the treatment of fluid obtained through hydraulic fracturing operations. However, for the avoidance of doubt, the specification is not limited to such treatments.

Oil and gas wells (including bores and reservoirs) frequently produce significant quantities of wastewater. On one hand water naturally occurs in many wells, and wastewater will be mixed with the oil or gas as the oil or gas is removed from the ground. This water is often called "produced" or "formation" water. On another hand, aqueous solutions are often pumped into a well to improve production of the well or to maximize oil or gas removal. Such aqueous solutions are pumped into a well, for example, when displacing oil or gas within the well (this process is known as "flooding") and in hydraulic fracturing operations. Of course when such aqueous solutions are removed from the well the aqueous solutions often also include oil or gas, and this wastewater is often call "flow-back water".

In many countries there are stringent regulations governing how wastewater from oil and gas wells may be disposed, and in part, these regulations have been driven by environmental concerns about such wastewater—from the public. Consequently, if the wastewater is to be discharged to the environment, then it may be necessary to perform treatment steps, including media filtration, gravity separation, removal of emulsifiers, chemical treatment, membrane filtration and other advanced treatments. Due to the volume of wastewater produced and the complexity of contaminants frequently found in the wastewater, such treatment steps can be time consuming and expensive. It can also be difficult to remove some contaminants from the wastewater at all.

Flow-back water from hydraulic fracturing (often called "frac flow-back water") can be especially difficult to treat, as such flow-back water can include a complex mixture of hydrocarbons, water, inorganics, organic compounds, proppants, boiling point modifiers, biocides, surfactants and gelling agents. In a hydraulic fracturing operation, a high viscosity gelled liquid (or fracturing fluid), usually containing some hydrocarbon and a suspended particulate proppant material (such as spherical sand or ceramics, garnet or alumina), is pumped through a well bore into a subterranean formation to be stimulated. The pressure and rate at which the fracturing fluid is pumped into the subterranean formation are such that crevices and fractures form and extend laterally and longitudinally in the formation. When the fracturing is complete, the fracturing fluid is returned to the surface and some proppant material remains deposited in the fractures to prevent the formed fractures from closing. This allows conductive channels in the subterranean formation to remain, through which produced hydrocarbon derived fluid or gas can readily flow to the surface. Hydraulic fracturing therefore allows previously inaccessible or poorly accessible oil and gas to flow to the surface, and is very important to the oil and gas industry.

One approach for treating wastewater from oil and gas wells is by membrane filtration. Such filtration may involve using a suite of membranes, such as microfiltration and ultrafiltration membranes to remove oils and other organics, as well as nanofiltration and reverse osmosis membranes to remove dissolved solids such as salts. However, with complex mixtures such as frac flow-back water, membrane fouling can become a significant problem. The salts, oils, particulates and other contaminants in the frac flow-back water can cause significant and irreversible deterioration of permeate flux, and often requires aggressive chemical cleaning that shortens membrane lifetime (Miller et al., *Journal of Membrane Science*, 437 (2013) 265-275).

There is therefore a need to provide an improved method and/or an improved apparatus for the treatment of oil and gas wastewater.

SUMMARY OF INVENTION

In a first aspect, the present disclosure relates to a method of treating a fluid mixture, the fluid mixture including an aqueous phase, a hydrophobic phase and aqueous contaminants, the method including the steps of:
(i) Electrochemically treating the mixture (or performing a first electrochemical treatment on the mixture) to at least partially separate the aqueous phase and the hydrophobic phase; and
(ii) Electrochemically treating the at least partially separated aqueous phase (or performing a second electrochemical treatment on the at least partially separated aqueous phase) to thereby remove aqueous contaminants from the aqueous phase.

In a second aspect, the present disclosure relates to a method of treating an aqueous solution including an organic carboxylic acid, the method comprising the step of simultaneously or consecutively subjecting the aqueous solution to electrochemical treatment and a treatment enhancer to thereby at least partially decompose the organic carboxylic acid. The treatment enhancer may be ultraviolet light.

In a third aspect, the present disclosure relates to a method of electrochemically treating an aqueous solution, wherein the solution includes a source of chloride ions and a source of sulfate radicals, and wherein the sulfate radicals at least partially ameliorate the inhibitory effect of the chloride ions on the electrochemical treatment. The present disclosure may also relate to a method of electrochemically treating an aqueous solution including a source of chloride ions, the method including the steps of:
(i) adding a source of sulfate radicals to the solution; and
(ii) electrochemically treating the solution of step (i).

In a fourth aspect, the present disclosure relates to a method of treating an aqueous solution including an organic carboxylic acid, the method comprising the step of electrochemically treating the aqueous solution in the presence of a catalyst to thereby at least partially decompose the organic carboxylic acid.

In a fifth aspect, the present disclosure relates to a method of treating an aqueous solution including an organic carboxylic acid, the method comprising the step of electrochemically treating the aqueous solution to thereby at least partially decompose the organic carboxylic acid.

In a sixth aspect, the present disclosure relates to a method of treating a fluid mixture, the fluid mixture including an aqueous phase and a hydrophobic phase, the method including the step of electrochemically treating the mixture.

In a seventh aspect, the present disclosure relates to an electrochemical fluid treatment apparatus, the apparatus including a treatment chamber including at least one inlet for entry of a fluid to be treated, and at least one outlet for exit of electrochemically treated fluid, and a plurality of electrodes (such as at least one anode and at least one cathode or a plurality of anodes and/or cathodes) positioned within the treatment chamber for electrochemical treatment of the fluid. In one embodiment, the fluid is a liquid and the electrochemical fluid treatment apparatus is an electrochemical liquid treatment apparatus. In one embodiment of this aspect, the present disclosure relates to an electrochemical liquid treatment apparatus including:
 a treatment chamber containing at least one inlet for entry of a liquid to be treated, and including at least one outlet for exit of electrochemically treated liquid;
 a plurality of electrodes positioned within the treatment chamber for electrochemical treatment of the liquid; and
 a flow aligner for aligning the flow of the liquid between the electrodes, wherein the flow aligner is positioned intermediate the at least one inlet and the electrodes.

In an eighth aspect, the present disclosure relates to an electrochemical fluid treatment apparatus, the apparatus including a plurality of electrodes angled from a vertical plane. In one embodiment of this aspect, the apparatus further includes a treatment chamber within which said plurality of electrodes are positioned, the treatment chamber including at least one inlet for entry of a fluid to be treated and at least one outlet for exit of electrochemically treated fluid. In one embodiment, the fluid is a liquid and the electrochemical fluid treatment apparatus is an electrochemical liquid treatment apparatus.

In a ninth aspect, the present disclosure relates to a fluid treatment plant or system, wherein the plant or system includes at least one electrochemical fluid treatment apparatus. The electrochemical fluid treatment apparatus may be as described in the seventh or eighth aspects of the present disclosure. The fluid treatment plant or system may further include one or more of the following components: a balance tank, a treatment tank (such as an acid tank, a base tank, a treatment agent tank), a clarifier, a screw (sludge dewatering) press, a drop tank, a storage tank, and a filtration system. The filtration system may include one or more of: a sand filter, a carbon filter, and one or more of a series of membrane filters (such as a membrane for ultrafiltration, microfiltration, nanofiltration or reverse osmosis, including separate membranes (of flat sheet, ceramic, spiral wound and other forms), as required for further polishing of treated water). Other filter mechanisms (such as a granular ferric hydroxide or activated charcoal column) may be used to remove specific organic contaminants (such as acetic acid or borate).

Features of the first to ninth aspects of the present disclosure may be as further described below.

Any of the features described herein can be combined in any combination with any one or more of the other features described herein within the scope of the invention.

In some aspects, the present disclosure relates to methods of treating various fluids. In one embodiment the fluid (or fluid mixture) is, or is derived from, fluid from an oil or gas well (including oil or gas well bores and reservoirs). The fluid from the oil or gas well may be produced (or formation) water (i.e. water which naturally occurs in a well which has been mixed with oil or gas as the oil or gas is removed from the ground), or it may be flow-back water (i.e. in which an aqueous solution is pumped into a well and subsequently removed). The fluid from an oil or gas well may especially be frac flow-back water (in which the fluid pumped into the well was for hydraulic fracturing or other work-over operations). The fluid to be treated may be a liquid.

The fluid to be treated in the methods of the present disclosure may include: an aqueous phase and/or a hydrophobic phase, and optionally solids (which may be dispersed or suspended in either the aqueous or hydrophobic phase). The fluid to be treated may be an emulsion.

The hydrophobic phase may include a hydrocarbon liquid. The hydrocarbon liquid or the hydrophobic phase may include (for example) crude oil, a petroleum distillate, or one or more of olefins, kerosene, diesel oil, gas condensates and fuel oil.

The fluid mixture, hydrophobic phase, or aqueous phase may include one or more of: a gelling agent, a cross-linker for cross-linking the gelling agent, a cross-linked gelling agent, a boiling point modifier, a salt, an antiscaling agent, a breaking agent, a pH modifier (such as an acid or a base), an iron chelant, an iron chelate, an anti-clay swelling or suspension agent, a microorganism (or microorganisms), a surfactant (or emulsifier), a de-emulsification agent and an agent (such as a biocide) to control microorganism growth or content. These components may have been added, for example, prior to hydraulic fracturing, or they may have been added after the flow-back water has returned to the surface (i.e. prior to treatment).

The gelling agent may be a saccharide (especially a polysaccharide; more especially a galactomannan such as guar gum or a starch such as corn starch).

The cross-linker may be a borate (such as sodium borate (borax) or a borate compound including a surfactant such as mono, di or tri-ethanolamine), an alkaline earth (such as calcium) or a transition metal (such as zirconium). Borax and calcium are both known to cross-link guar gum. The cross-linker may be used to control the viscosity of the solution containing the gelling agent. The viscosity of the solution importantly affects the ability of the solution to support the proppant, and this is crucial when performing hydraulic fracturing. Other suitable cross-linkers and viscosity modifiers would be known to a skilled person.

Due to the viscosity of the solution used in hydraulic fracturing, a breaking agent may need to be added to decrease the viscosity of the solution before it can be pumped back to the surface. Suitable breaking agents would be known to a skilled person. Exemplary breaking agents are acids (especially inorganic acids (such as hydrochloric acid), and organic acids (such as citric and acetic acids)) and enzymes (or microorganisms).

Suitable boiling point modifiers would be known to a skilled person. An exemplary boiling point modifier is a glycol such as ethylene glycol.

The salt may be an alkaline earth salt (including a magnesium salt, a calcium salt (such as calcium carbonate or calcium sulfate), or a barium salt (such as barium sulfate)), a transition metal salt (including an iron salt such as iron carbonate), a carbonate salt (such as calcium carbonate or iron carbonate), a sulfur-containing salt (such as a sulfate (including calcium sulfate and barium sulfate), a sulfide or a persulfate salt), a halide salt (including a chloride or a fluoride salt) or a phosphate salt. The salts can come from water that has been underground, or the salts can be added to the water prior or after to being pumped underground (in hydraulic fracturing for example, salts may be added to assist in retaining proppants in solution). Formation permeability damage may reduce the productivity of oil wells and may also occur when reactive ion species combine to form water insoluble or sparingly soluble species such as barium sulfate, calcium carbonate or silica based compounds including calcium and magnesium silicates. Such species may be present in the fluid.

Suitable anti-scaling agents would be known to a person skilled in the art. Exemplary anti-scaling agents include: an acid (such as hydrochloric, phosphoric, citric, acetic and thioglycolic acids), an acrylamide (such as an acrylamide or acrylamide co-polymer), and a chelating agent (such as an amino-polycarboxylic acid such as ethylene-diamine-tetra-acetic acid (EDTA) or a polycarboxylate). Scalants in frac flow-back water, for example, may include one or more of calcium, magnesium, barium, strontium and silica. These scalants may be extremely problematic for some filtration steps, such as reverse osmosis.

During hydraulic fracturing, iron complexes can also block pores and flow pathways. Therefore, an iron chelant may be added to inhibit the formation or precipitation of iron oxides. Such inhibition may be achieved by stabilising the ferrous ion, and/or suspending or dispersing the iron oxide(s). Suitable iron chelants would be known to a skilled person. Exemplary iron chelants may include citric acid, ethylenediaminetetraacetic acid (EDTA) or nitriloacetic acid (NTA). An iron chelate may be iron complexed to one of the aforementioned iron chelants.

Suitable anti-clay swelling or suspension (or stabilizing) agents would be known to a skilled person. Exemplary agents may include an alcohol (such as methyl, ethyl, isopropyl, propyl or 2-butoxyethyl alcohol), lauryl sulfate, naphthalene, a halite salt, choline chloride and a tetra-alkyl ammonium salt. Such agents act to retain the clay platelets in position by controlling the charge and electrolytic characteristics of the subterranean and treatment fluid. If clay platelets deflocculate and migrate within a well, formation permeability damage may occur which may reduce the productivity of the well.

Microorganisms (such as bacteria) may grow in subterranean regions, and these microorganisms may, for example, form biofilm slimes that occlude conduits, or produce products that cause corrosion of well components or promote precipitation or scaling in proppant-filled fractures or conduits.

Suitable agents for controlling microbial content would be known to a person skilled in the art. Suitable agents may include: an aldehyde (such as glutaraldehyde or formaldehyde), an ammonium salt (such as a quarternary ammonium salt), tetrakis hydroxymethyl-phosphonium sulfate, a chlorate, a hypochlorite, an alcohol, hypochlorous acid, hypobromous acid, and chlorinated or brominated ammonia chemicals (including mono, di and trichlorammines and bromammines).

A de-emulsification agent is an agent that acts to promote separation of an emulsion into an aqueous and a hydrophobic phase. Suitable de-emulsification agents would be known to a skilled person. One type of de-emulsification agent is a microorganism (such as a bacteria or fungi) that promotes the separation of an emulsion into an aqueous and a hydrophobic phase. The aqueous phase (or hydrophobic phase) may also include a de-emulsification promoting agent. The term "de-emulsification promoting agent", as used herein, refers to an agent which promotes the growth of a de-emulsifying microorganism.

The solids may include a proppant or a subterranean solid (such as a clay or rock particle). Suitable proppants for hydraulic fracturing would be known to a person skilled in the art. For example, the solid may be one or more of: sand (including graded and resin coated sand), bauxite (especially sintered bauxite), or a ceramic. The choice of proppant may depend on the characteristics of the subterranean formation being fractured.

The aqueous phase of the fluid may have a total dissolved solids (TDS) content of greater than 1,000 milligrams per liter (mg/L), especially greater than 2000, 3000, 4000, 5000, 6000, 7000, 8000, 9000 or 10000 mg/L. The aqueous phase of the fluid may have a chemical oxygen demand (COD) of greater than 30 mg/L, especially greater than 50, 100, 250, 500, 750, 1000, 1250, 1500, 1750, 2250, or 2500 mg/L. The aqueous phase of the fluid may have a biological oxygen demand (BOD) of greater than 300 mg/L, especially greater than 350, 400, 450, 500, 550, 600, 650, 700 or 750 mg/L.

The fluid to be treated in the methods of the present disclosure may be produced water or flow-back water (including frac-flow back water), both of which have a hydrophobic and an aqueous phase. The fluid to be treated in the methods of the present disclosure may also be derived from produced water or flow-back water. For example, the fluid to be treated may be the separated aqueous phase of produced water or flow-back water. The "aqueous solution" to be treated in the methods of the present disclosure may be the separated aqueous phase as previously discussed, and the aqueous solution may be as defined above for the aqueous phase.

The aqueous solution may include one or more of: a gelling agent, a cross-linker for cross-linking the gelling agent, a cross-linked gelling agent, a boiling point modifier, a salt, an antiscaling agent, a breaking agent, a pH modifier (such as an acid or a base), an anti-clay swelling or suspension agent, an iron chelant, an iron chelate, a microorganism (or microorganisms), a de-emulsification agent and an agent to control microorganism content (such as a biocide). These components may be as described above for the aqueous phase. However, the aqueous solution may not include a cross-linked gelling agent, as this agent may have been removed in the process of separating the aqueous phase from the hydrophobic phase.

The fluid (including the aqueous solution) may be treated by one or a plurality of electrochemical treatment steps. In one embodiment, the fluid is treated by one or two electrochemical treatment steps.

When the fluid mixture includes an aqueous phase, a hydrophobic phase and aqueous contaminants, the treatment method may include a first and a second electrochemical treatment step (or a first and a second electrochemical treatment). The first electrochemical treatment step may include electrochemically treating the mixture to at least partially separate the aqueous phase and the hydrophobic phase. The second electrochemical treatment step may include treating the at least partially separated aqueous phase to thereby remove aqueous contaminants from the aqueous phase.

The first electrochemical treatment step may be performed under relatively mild conditions. The first electrochemical treatment may be performed at a current to voltage ratio of greater than 1:5, especially greater than 1:5.5, 1:6, 1:6.5, 1:7, 1:10, 1:15 or 1:20. The electrochemical treatment may be performed at a resistance of greater than $5\Omega$, especially greater than 5.5, 6, 6.5, 7, 10, 15 or $20\Omega$. Use of mild conditions is advantageous as it typically allows for breaking of emulsions and better separation between the aqueous and hydrophobic phases, and the separated hydrophobic phase may be advantageously returned to the well operator for sale. This stage may improve the likelihood of compliance with environmental regulations for landfill disposal of solid residues (sludges) and waste products generated during the various treatment stages described. Advantageously, the first electrochemical treatment step may remove suspended and colloidal material by coagulation and electrostatic destabilisation of surface charges.

The first electrochemical treatment step at least partially separates the aqueous phase and the hydrophobic phase. In another embodiment, the first electrochemical treatment step may substantially separate the aqueous phase and the hydrophobic phase. After the first electrochemical treatment step the aqueous phase may include less than 50 mg/L hydrocarbons, especially less than 40 mg/L, less than 30 mg/L, 20 mg/L or 10 mg/L hydrocarbons, more especially less than 8 mg/L hydrocarbons or less than 5 mg/L hydrocarbons.

The first electrochemical treatment step may reduce the concentration of alkaline earth metals, silica, boron and sulfates in the aqueous phase, especially the concentration of alkaline earth metals (such as calcium and magnesium) in the aqueous phase. The first electrochemical treatment may reduce the calcium concentration in the aqueous phase by at least 50%, especially at least 60%, 70%, 75% 80%, 85% or 90%. The first electrochemical treatment may reduce the magnesium concentration in the aqueous phase by at least 50%, especially at least 60%, 70%, 75%, 80% or 85%. The first electrochemical treatment may reduce the silica concentration (which may include dissolved and amorphous silica (total)) in the aqueous phase by at least 50%, especially at least 60%, 70%, 75% 80%, 85%, 90% or 95%. The first electrochemical treatment may reduce the sulfates in the aqueous phase by at least 5%, especially at least 10%, 12.5%, 15%, 17.5% or 20%. The first electrochemical treatment may reduce the chemical oxygen demand (COD) of the aqueous phase by at least 20%, especially at least 25%, 30%, 35%, 40%, 45% or 50%. The first electrochemical treatment may reduce the biological oxygen demand (BOD) by at least 20%, especially at least 25%, 30%, 35%, 40%, 45% or 50%. The first electrochemical treatment may reduce the boron concentration in the aqueous phase by at least 10%, especially at least 15%, 20%, 25% or 30%.

The first electrochemical treatment step may also be for decomposition of the crosslinking agent (such as guar gum) in the aqueous solution. Use of mild conditions is advantageous in this regard, as it avoids hyperoxidation of the cross linking agent which then typically results in the treated aqueous phase having a reduced chemical oxygen demand (COD) relative to the same solution if it had been treated under harsher conditions.

The first electrochemical treatment step may be performed under acidic conditions. For example, the first electrochemical treatment step may be performed at a pH of less than 7, 6.5, 6, 5.5, 5, 4.5 or 4. It may be advantageous to perform the electrochemical treatment at an acidic pH. If a crosslinking agent such as guar gum has been reversibly crosslinked (for example using borax), an acidic pH may reverse the crosslinking. Therefore, performing the first electrochemical treatment step under acidic conditions can prevent the crosslinking agent from crosslinking, thereby preventing an increase in the viscosity of the solution. The pH of the solution may increase as the electrochemical treatment progresses. An acidic pH coupled with sacrificial iron or mild steel electrodes may also assist in the occurrence of Fenton reactions during the electrochemical treatment step, and an acidic pH may also be advantageous if the electrochemically treated aqueous phase is filtered through a media such as activated carbon (to either decolour the solution or remove some of the components contributing to COD).

The first electrochemical step may include use of at least one treatment agent to assist in the treatment of the liquid. Suitable treatment agents are discussed below. The at least one treatment agent may be added to the fluid prior to, during or after the first electrochemical treatment step.

The first electrochemical treatment step may include applying at least one treatment enhancer. The at least one treatment enhancer may be applied prior to, during or after the first electrochemical treatment step. Exemplary treatment enhancers are ultraviolet light, microwave radiation and ultrasonic waves (or ultrasonication). Other treatment enhancers are defined below.

The first electrochemical treatment step may be performed using a sacrificial anode. The anode(s) and the cathode(s) of the electrochemical cell in which the first electrochemical treatment step is performed may include iron. In one embodiment, the anode(s) and the cathode(s) of the electrochemical cell are made of steel, especially mild steel. Other types of electrodes may be used, and would be known to a skilled person. Exemplary electrodes (which may be the anode(s) and/or the cathode(s)) include aluminium, iron, steel, stainless steel, steel alloy (including mild carbon steel), magnesium, titanium and carbon (including boron doped carbon or diamond). In another embodiment, each electrode may be made of an alloy of or containing a material selected from the group consisting of: aluminium, iron, steel, magnesium, titanium and carbon. The anode(s) and/or the cathode(s) may be inert electrode(s) including stainless steel, titanium and coated titanium electrodes including electrodes coated with platinum, ruthenium, palladium, rhodium, osmium, iridium and combinations thereof. The selection of electrode may influence the chemistries in the electrochemical treatment step. For example, a weighted blend of ruthenium will generally produce a plurality of protons whereas a greater proportion of iridium will generally produce more hydroxyl radicals. This can assist in the choice of oxidising or reducing electrochemical reaction desired. Multiple different types of electrodes may be used in the first electrochemical treatment step. The electrodes may also include at least one treatment agent, as further described below.

The first electrochemical treatment step may be performed at ambient temperature and pressure. However, the first electrochemical treatment step may be performed at greater than atmospheric pressure, for example at from greater than 1 atmosphere to 10, 9, 8, 7, 6, 5, 4, 3 or 2 atmospheres (especially from 1-3 atmospheres). Alternatively, the first electrochemical treatment step may be performed at less than atmospheric pressure, for example at from less than 1 atmosphere to 0.1, 0.2, 0.3, 0.4, 0.5, 0.6, 0.7, 0.8 or 0.9 atmospheres.

Without wishing to be bound by theory, it is believed that in the first electrochemical treatment step the aqueous phase is flooded with charged hydroxyl and hydronium ions, which, with assistance from dissolved oxygen, peroxide and ferrous ions from the sacrificial anode, produces hydroxyl and or sulfate radicals to oxidise aqueous contaminants. Hydrogen peroxide may also be produced by the reaction of these peroxidants with water. This may prepare the aqueous and hydrophobic phases to separate.

In one embodiment, the solution that is treated in the second electrochemical treatment step is an aqueous solution (or aqueous phase). The aqueous solution may be the aqueous phase from the first electrochemical treatment step, after at least partial separation from the hydrophobic phase. The aqueous solution (or at least partially separated aqueous phase) to be treated in the second step may be as defined for the aqueous phase in the first electrochemical treatment step.

The second electrochemical treatment step may be performed under harsher conditions than the first electrochemical treatment step. The second electrochemical treatment may be performed at a current to voltage ratio of less than 1:5, especially less than 1:4.5, 1:4, 1:3.5, 1:3, 1:2.5, 1:2 or 1:1.5. The electrochemical treatment may be performed at a resistance of less than 5Ω, especially less than 4.5, 4, 3.5, 3, 2.5, 2 or 1.5Ω.

The second treatment step may be for removing aqueous contaminants from the aqueous phase. The aqueous contaminants may include one or more of inorganic compounds, boron and transition metals. Without wishing to be bound by theory, the boron and transition metals may be removed as hydroxides, hydroxychlorides and as components of complex mixed layered hydroxysilicate minerals. In another embodiment, the aqueous contaminants may include one or more of: hydrocarbons, microorganisms (including bacteria), an alkaline earth salt (including a magnesium or calcium salt) a transition metal salt (including an iron salt), a halide salt (such as a fluoride salt), a phosphate salt, a sulfate salt and refractory organics (including organic carboxylic acids). In another embodiment, the aqueous contaminants may include one or more of: a gelling agent, a cross-linker for cross-linking the gelling agent, a cross-linked gelling agent, a boiling point modifier, a salt, an antiscaling agent, a breaking agent, a pH modifier (such as an acid or a base), an anti-clay swelling or suspension agent, an iron chelant, an iron chelate, a microorganism (or microorganisms), a de-emulsification agent and an agent to control microorganism content (such as a biocide). These components may be as described above for the aqueous phase. However, the aqueous contaminants may not include a cross-linked gelling agent, as this agent may have been removed in the process of separating the aqueous phase from the hydrophobic phase.

As used herein, the phrase "remove aqueous contaminants" includes partially or completely removing said contaminants, or decomposing aqueous contaminants. The second electrochemical treatment step may reduce the aqueous contaminants in the aqueous phase, especially the aforementioned aqueous contaminants. In another embodiment, the second electrochemical treatment step may decompose refractory organics into organic carboxylic acids (such as acetic and propionic acids). The second electrochemical treatment may reduce the concentration of one, at least one, or all of the aqueous contaminants in the aqueous solution by at least 40%, especially at least 45%, 50%, 55%, 60%, 65%, 70%, 75%, 80%, 85% or 90%.

The second electrochemical treatment may reduce the concentration of boron (depending on the solution pH, the boron may form part of a larger molecule such as borate) in the aqueous solution by at least 40%, especially at least 45%, 50%, 55%, 60%, 65%, 70%, 75%, 80%, 85% or 90%. The second electrochemical treatment may reduce the concentration of hydrocarbons in the aqueous solution by at least 50%, especially at least 55%, 60%, 65%, 70%, 75%, 80%, 85%, 90% or 95%. The second electrochemical treatment may reduce the concentration of microorganisms (especially bacteria) in the aqueous solution by at least 60%, 65%, 70%, 75%, 80%, 85%, 90% or 95%. The second electrochemical treatment step may reduce the concentration of calcium in the aqueous solution by at least 50%, especially at least 55%, 60%, 65%, 70%, 75%, 80%, 85% or 90%. The second electrochemical treatment may reduce the concentration of magnesium in the aqueous solution by at least 30%, especially at least 35%, 40%, 45%, 50%, 55%, 60% or 65%. The second electrochemical treatment step may reduce the concentration of silica (especially amorphous and dissolved silica) in the aqueous solution by at least 50%, especially at least 55%, 60%, 65%, 70%, 75%, 80%, 85% or 90%. The second electrochemical treatment may reduce the concentration of iron in the aqueous solution by at least 30%, especially at least 35%, 40%, 45%, 50%, 55% or 60%. The second electrochemical treatment may reduce the concentration of fluoride in the aqueous solution by at least 5%, especially at least 10%, 15% 20%, 25% or 30%. The second electrochemical treatment may reduce the concentration of phosphate in the aqueous solution by at least 5%, especially at least 10% or 15%. The second electrochemical treatment may reduce the concentration of sulfates in the aqueous solution by at least 5%, especially at least 10%, 15% or 20%. The second electrochemical treatment may reduce the chemical oxygen demand (COD) of the aqueous solution by at least 30%, especially at least 35%, 40%, 45%, 50% or 55%. The second electrochemical treatment may reduce the biological oxygen demand (BOD) by at least 30%, especially at least 35%, 40%, 45%, 50% or 55%.

After electrochemical treatment in the second electrochemical treatment step, the aqueous solution may include organic carboxylic acids. Exemplary organic carboxylic acids include acetic acid, propanoic acid and isopropanoic acid. It may be advantageous to recover the organic carboxylic acids as these compounds may be re-used in a subsequent hydraulic fracturing operation as, for example, a breaking agent. Therefore, in one embodiment the organic carboxylic acids are recovered from the aqueous solution.

Alternatively, the second treatment step may be for decomposing organic carboxylic acids which may be present in the aqueous solution. The organic carboxylic acids may be decomposed (or mineralised) into carbon dioxide and water.

The second electrochemical step may include use of at least one treatment agent to assist in the treatment of the liquid. Therefore, in one embodiment, the second electrochemical treatment is performed in the presence of at least one treatment agent. The use of at least one treatment agent may assist in decomposing the organic carboxylic acids. Suitable treatment agents are discussed below. However, in some embodiments the treatment agent may be selected from at least one of the group consisting of: a source of sulfate radicals, an oxidant, a pH modifier (such as an acid or a base), an adsorbant material (for facilitating removal of oxidised contaminants) and a catalyst. The at least one treatment agent may be added to the aqueous solution prior to, during or after the second electrochemical treatment step. The aqueous solution may be subjected to simultaneous or consecutive electrochemical treatment and treatment with the at least one treatment agent.

The second electrochemical treatment step may include applying at least one treatment enhancer. The at least one treatment enhancer may be applied prior to, during or after the second electrochemical treatment step. Accordingly, in one embodiment, a treatment enhancer is applied to the aqueous phase during or after the second electrochemical treatment. Exemplary treatment enhancers are ultraviolet light, ultrasonic waves (or sound) and microwave radiation. Other treatment enhancers are defined below.

As used herein, the term "treatment enhancer" refers to matter or energy (including radiation, sound or photons) that is capable of penetrating a solid wall of the treatment chamber to enhance reactions within the treatment chamber. Exemplary treatment enhancers include electromagnetic radiation and sonic waves. Electromagnetic radiation may include one or more of radiowaves, microwaves, infrared radiation, visible light, ultraviolet radiation, X-rays and gamma rays. Sonic waves may include ultrasonic, infrasonic and audible waves. In one embodiment, the treatment enhancer may be a microwave or ultraviolet radiation, or ultrasonic sound waves. The treatment enhancer may accelerate or modify reactions in the treatment chamber (especially reactions involving contaminants) during the electrochemical treatment. The treatment enhancer may also reduce passivating accumulations on the electrodes (especially the cathodes; sonic waves may be suitable for this purpose, especially ultrasonic waves). The treatment enhancer (especially ultraviolet light) may be directed into the treatment chamber during electrochemical treatment.

It may be advantageous to use high energy ultrasonic waves (ultrasonication) in conjunction with the electrochemical treatment. Although ultrasonication alone failed to oxidize carboxylic acids, it has advantageously been found that combining ultrasonication at 125-150 watts with either hydrogen peroxide ($H_2O_2$) or preferably up to 3 mg/L of ozone as a treatment agent, had a significant effect on the mineralisation of carboxylic acid with coincident 75-85% reduction in chemical oxygen demand (COD). In addition to assisting in the destructive removal of aqueous contaminants in this way, the ultrasonication may also reduce passivation of the cathodes in the electrochemical cell, and thereby keep the electrodes clean.

It may also be advantageous, and particularly cost-effective, to use ultraviolet light in conjunction with the electrochemical treatment. The ultraviolet light may be at any suitable wavelength, for example from 400 to 10 nm. In exemplary embodiments, the ultraviolet light is at a wavelength of from 400 to 100 nm, especially from 350 to 100 nm, or from 280 nm to 100 nm (ultraviolet C light), more especially from 280 to 200 nm, most especially about 250 nm or 254 nm. The ultraviolet light may assist in decomposing the organic carboxylic acids. For example, the inventors have found that a two hour treatment of an aqueous solution including organic carboxylic acids with a 38 W UV light (at 254 nm) resulted in a 75% reduction in organic carboxylic acids, and a one hour treatment resulted in a 50% reduction in organic carboxylic acids.

In one example, the ultraviolet light may be from or derived from sunlight. In this example, the sunlight may be direct from the sun, or may involve use of a solar concentrator. The solar concentrator may concentrate the sunlight at a specific location (for example where the treatment occurs), and/or it may filter the sunlight so that only light of a desired wavelength is concentrated. In another example, the ultraviolet light may be from an ultraviolet light device.

Catalysts (such as titanium catalysts, including titanium dioxide) and/or oxidants (such as permanganate, persulfate, ozone and peroxide) may be used with the treatment enhancer. Suitable catalysts and oxidants may be as described elsewhere herein.

Therefore, in a second aspect the present disclosure relates to a method of treating an aqueous solution including an organic carboxylic acid, the method comprising the step of simultaneously or consecutively subjecting the aqueous solution to electrochemical treatment and a treatment enhancer to thereby at least partially decompose the organic carboxylic acid. The treatment enhancer may be ultraviolet light, especially ultraviolet-C (UVC) light. Especially when in a commercial production environment, use of UVC light may be cost-effectively implemented using low cost access to solar energy such as in open tanks. This may be best achieved following clarification to allow penetration of the UVC.

The source of sulfate radicals may be a persulfate, such as sodium persulfate. It can be advantageous to include a source of sulfate radicals as during the electrochemical treatment chloride ions in the aqueous solution may be converted at the cathode to chlorine. However, the chlorine is not strong enough to decompose acetic acid, for example. Furthermore, the presence of chloride ions in the aqueous solution may inhibit the electrochemical treatment (for example, the removal of aqueous contaminants or the decomposition of organic carboxylic acids). It has been found that hydroxyl radicals generated through the various process stages have very short life and their oxidative potential is restricted when large concentrations of chloride ion are also present. Oxidants such as permanganate, peroxide and ozone in an electrochemical treatment would all produce hydroxyl radicals. It has also been found that sulfate radicals have equal or greater oxidative potential for refractory organic compounds however are less susceptible to reaction with surplus chloride ions (sulfate radicals have a longer half-life than hydroxyl radicals, and sulfate radicals are also less likely to react with chloride ions than hydroxyl radicals).

Therefore, in a third aspect the present disclosure relates to a method of electrochemically treating an aqueous solution, wherein the solution includes a source of chloride ions and a source of sulfate radicals, and wherein the sulfate radicals at least partially ameliorate the inhibitory effect of the chloride ions on the electrochemical treatment. In another aspect, the present disclosure relates to a method of electrochemically treating an aqueous solution including a source of chloride ions, the method including the steps of:

(i) adding a source of sulfate radicals to the solution; and
(ii) electrochemically treating the solution of step (i).

In another aspect, the present disclosure relates to a method of electrochemically treating an aqueous solution including a refractory organic compound (or an organic carboxylic acid) and chloride ions, wherein the method comprises the step of electrochemically treating the aqueous solution in the presence of a source of sulfate radials to thereby at least partially decompose the refractory organic compound (or organic carboxylic acid). The aqueous solution may include a concentration of chloride ions of greater than 500 mg/L, especially greater than 1000 mg/L, 1500 mg/L, 2000 mg/L, 2500 mg/L, 3000 mg/L, 3500 mg/L, 4000 mg/L, 4500 mg/L, 5000 mg/L, 5500 mg/L, 6000 mg/L or 6500 mg/L.

Suitable oxidants are discussed below. Exemplary oxidants include ozone, a peroxide (such as hydrogen peroxide), permanganate (such as potassium permanganate) and a persulfate (such as sodium persulfate). The choice of oxidant may depend upon water quality parameters such as chloride ion concentration, pH and bicarbonate alkalinity.

In a fourth aspect the present disclosure relates to a method of treating an aqueous solution including an organic carboxylic acid, the method comprising the step of electrochemically treating the aqueous solution in the presence of a catalyst to thereby at least partially decompose the organic carboxylic acid.

As used herein, the phrase "at least partially decompose the organic carboxylic acid" may include reducing the concentration of organic carboxylic acid in the aqueous solution by at least 10%, 20%, 30%, 40%, 50%, 60%, 70%, 80%, 90% or 95%.

In one embodiment, the second electrochemical treatment step is performed using a catalyst and ultraviolet light, especially using a catalyst, ultraviolet light and ultrasonics.

The catalyst may be a heterogeneous catalyst, a homogenous catalyst or an enzyme. The heterogeneous catalyst may be, for example, provided by a transition metal doped electrode, especially a transition metal doped electrode used in combination with photocatalysis. The catalyst may also be an iron salt or compound (such as iron oxide). Use of iron salts or compounds may be advantageous as these catalysts may provide Fenton type reactions. The catalyst may be added to the aqueous solution, or it may be provided on a component of the electrochemical cell (for example the electrodes or the treatment chamber). It may be advantageous to provide the catalyst on a component of the electrochemical cell as this decreases catalyst recovery costs. In one embodiment, the catalyst is provided on a component of the electrochemical cell. In another embodiment, the catalyst is added to the aqueous solution (whether before or during the electrochemical treatment). It may be advantageous to use a catalyst as process losses may be minor.

Suitable catalysts (especially catalysts to accelerate or enhance the mineralisation of carboxylic acids to $CO_2$ and water in the presence of UV-C light) would be known to those skilled in the art and without limiting the generality of this disclosure in any way, include one or more of: a titanium catalyst (such as an anastase mineral based titanium dioxide catalysts (such as Degussa P25)); an iron catalyst (such as goethite (such as a nano-particulate goethite suspension) or magnetite (such as acidulated nanoparticulate magnetite)), persulfate ions (peroxydisulfate ions, $S_2O_8^{2-}$), a cerium doped, manganese dioxide catalyst (particularly when using permanganate as a pre-cursor for hydroxyl radical formation), ferrous ions when used in combination with peroxide (as an intermediate to formation of hydroxyl radicals in photo-Fenton type reactions), a precious metal (such as platinum, palladium and rhodium as well as titanium coated with platinum, ruthenium, palladium, rhodium, osmium, iridium and combinations thereof, especially when used in combination with external sources of activation energy such as UV light). Other metallic, non-metallic and transition metal catalysts would be known to those skilled in the art. Exemplary combinations of the above catalysts include an iron catalyst in combination with persulfate ions (for example, nanoparticulate goethite suspensions in combination with persulfate ions; and acidulated nanoparticulate magnetite in combination with persulfate ions (this may enable partial recovery of the heterogeneous catalyst in a separation step)). The final choice of catalyst may depend on the need to achieve treated water production volumes, and factors to be considered may include cost of catalyst, and its ability to be recovered either by settling and clarification, or other means, in the subsequent steps.

The anode(s) and the cathode(s) of the electrochemical cell in which the second electrochemical treatment step is performed may be or include aluminium. Other types of electrodes may be used, and would be known to a skilled person. Exemplary electrodes (which may be the anode(s) and/or the cathode(s)) include aluminium, iron, steel, stainless steel, steel alloy (including mild carbon steel), magnesium, titanium and carbon. In another embodiment, each electrode may be made of an alloy of or containing a material selected from the group consisting of: aluminium, iron, steel, magnesium, titanium and carbon (including boron doped carbon or diamond). The anode(s) and/or the cathode(s) may be inert electrode(s) including stainless steel, titanium and coated titanium electrodes including electrodes coated with platinum, ruthenium, palladium, rhodium, osmium, iridium and combinations thereof. The selection of electrode may influence the chemistries in the electrochemical treatment step. For example, a weighted blend of ruthenium will generally produce a plurality of protons whereas a greater proportion of iridium will generally produce more hydroxyl radicals. Multiple different types of electrodes may be used in the second electrochemical treatment step.

The second electrochemical treatment step may be performed at ambient temperature and pressure. However, the second electrochemical treatment step may be performed at greater than atmospheric pressure, for example at from greater than 1 atmosphere to 10, 9, 8, 7, 6, 5, 4, 3 or 2 atmospheres (especially from 1-3 atmospheres). Alternatively, the second electrochemical treatment step may be performed at less than atmospheric pressure, for example at from less than 1 atmosphere to 0.1, 0.2, 0.3, 0.4, 0.5, 0.6, 0.7, 0.8 or 0.9 atmospheres.

Without wishing to be bound by theory, it is believed that in the second electrochemical treatment step aluminium or inert electrodes (for example) coupled with dissolved oxygen, hydrogen peroxide and hydroxyl or sulfate radicals may enhance and provide higher oxidation energies than in the first electrochemical treatment step. These higher oxidation energies force refractory organics to decompose into the carboxylic acids (for example acetic or propanoic acids), carbon dioxide and water. Aluminium or inert electrodes, in particular, may provide improved removal of boron compared to iron. The second electrochemical treatment step may improve COD and TOC removal from the fluid, especially through concomitant dosing of oxidants such as ozone and potassium permanganate, while further removing contaminants left from the first electrochemical treatment step.

If the water being treated contains a high proportion of frac return water with a correspondingly high COD, then the second electrochemical treatment step may be performed with ultraviolet-C light, ozone and hydrogen peroxide to assist in the mineralisation of the organic carboxylic acids. Aqueous solutions including a higher concentration of organic acids may require a homogeneous nano-particle sized catalyst provided as a suspension within the electrochemical cell together with ultraviolet C light treatment (the nanoparticle sizing may ensure that the surface area of the catalyst, combined with the UV-C treatment, can mineralise any residual carboxylic acid).

The methods of the present disclosure may also include more than two electrochemical treatment steps, especially a third, fourth or fifth electrochemical treatment step. The third, fourth or fifth electrochemical treatment steps may be as described above for the first and second electrochemical treatment steps.

The methods may further include an ultraviolet light treatment step. This may be performed separately to the second electrochemical treatment step. However, it may be advantageous for the ultraviolet light treatment step to be performed immediately after the second electrochemical treatment step (in which case the electrochemically treated liquid exiting the electrochemical cell (in which the second electrochemically treatment step occurs) may flow directly into an ultraviolet light cell). It may be important for the solution to be treated by ultraviolet light to include sufficient peroxide (which may be produced during the second electrochemical treatment step) to remove coloured organics that may reduce the effectiveness of the ultraviolet light treatment.

In one embodiment, the step of treating the aqueous solution with ultraviolet light may be performed in the presence of a catalyst. Suitable catalysts may be as discussed above. The step of treating the aqueous solution with ultraviolet light may also be performed after clarification of the electrochemically treated solution from the second electrochemical treatment step (as discussed below).

In some cases with exceptionally high COD (for example arising from frac return components), it may be necessary to for the aqueous solution to flow through activated carbon (for example in a tower or bed) to remove residual colour prior to ultraviolet light treatment (however this is not expected to be necessary unless treating frac return water in isolation). In these cases, the liquid treated in the second electrochemical treatment step may flow through a bed of activated charcoal prior to ultraviolet light treatment.

The ultraviolet light used in the ultraviolet light treatment step may be as described above in the second electrochemical treatment step. Use of ultraviolet light may also be advantageous in reducing populations of microorganisms in the solution.

The methods of the present disclosure may further include a filtration step. However, in some embodiments no filtration step is needed, especially when the solution is to be re-used in hydraulic fracturing operations. However, it may be necessary to perform a filtration step to meet discharge criteria set by environmental protection agencies.

The methods may include one or more than one filtration step. The filtration steps may be performed at any stage in the method. For example, the methods may include a filtration step prior to the first electrochemical treatment step, between the first and second electrochemical treatment steps, or after the second electrochemical treatment step.

The filtration steps may be performed using any suitable filtration media. For example, the filtration step may include activated charcoal, sand, a screen (such as a 2 mm screen), pre-filters or membrane filtration (including ultrafiltration, microfiltration, nanofiltration, and reverse osmosis). The filtration step may include media filtration, which may include use of carbon (especially activated carbon, more especially granulated activated carbon) or use of iron hydroxide (especially ferric hydroxide, more especially granular ferric hydroxide). The type of filtration media may be selected by a skilled person depending on what components are intended to be removed from the aqueous solution. For example, if residual COD is high, then the COD may be reduced using a membrane filtration step. In some cases multiple types of filtration steps may be used. In one embodiment, the filtration step may include use of a nanofiltration or reverse osmosis membrane through which the aqueous solution flows to provide a permeate and a retentate (further processing of the retentate may be needed prior to disposal to ensure compliance with environmental protection regulations).

In some cases, a portion of the aqueous solution may be filtered (for example by nanofiltration or reverse osmosis), and the permeate from the filtration is recombined with further aqueous solution which was not filtered. This may be a cost effective way of reducing the concentration of aqueous contaminants in the aqueous solution. In some cases, it may be more cost effective to remove organic carboxylic acids by filtration rather than electrochemically decomposing the organic carboxylic acids in the second electrochemical treatment step.

In another example, conventional media and microfiltration may be used to remove adsorbed chemicals, and a nanofiltration membrane may allow almost all monovalent ion species (including sodium and potassium) to pass with low rejection. In this example, divalent ions or high molecular weight compounds (if present) may captured and rejected to enable, typically, temporary storage for further processing. In the event that residual COD of the permeate remains high due to poor rejection by the nanofiltration membrane, then reverse osmosis membranes may be utilized to produce a permeate blend either low in COD (or free of COD) and a reject stream for either temporary storage, further treatment or blending with other treated water streams.

The methods of the present disclosure may further include the step of storing the fluid (including the aqueous solution), for example in a fluid storage. The step of storing the fluid may include transferring the fluid (including the aqueous solution) to a fluid storage (such as a water storage); and/or transferring the fluid (including the aqueous solution) from the fluid storage. The fluid storage may be a storage tank or pond. The step of storing the fluid may be performed prior to electrochemical treatment. This may be advantageous, as it may allow the composition of the fluid to be more easily tested. Knowing the precise composition of the fluid may be very important when assessing exactly how the fluid should be treated. For example, fluids with a high chemical oxygen demand (COD; which may be measured in the field by either Hach COD vials or which may be estimated from total organic carbon data) may require more extensive treatment than fluids with a low COD. In general, produced water would have a lower COD than frac flow-back water. The methods of the present disclosure may include a step of treating stored fluid with a treatment enhancer, such as ultraviolet light. The ultraviolet light treatment may be as discussed above.

The methods of the present disclosure may further include the step of adding one or more treatment agents to the stored fluid. The step may be performed prior to the first electrochemical treatment step. For example, pH modifiers and/or oxidants may be added to the stored fluid enhance removal of aqueous contaminants in the first electrochemical treatment step.

The methods of the present disclosure may also include the step of storing the fluid after electrochemical treatment (i.e. after the first electrochemical treatment step and/or the second electrochemical treatment step). For example, if the treated fluid is to be re-used or disposed to the environment, it may be necessary to place the fluid in a temporary storage to await further use or disposal.

The methods of the present disclosure may also include the step of clarifying the fluid. The step of clarifying may be performed after an electrochemical treatment step, for example after the first electrochemical treatment step or the second electrochemical treatment step.

In one example, the step of clarifying may include clarifying the at least partially separated aqueous phase from the first electrochemical treatment step. The clarified aqueous phase may be subjected to the second electrochemical treatment step. The step of clarifying the at least partially separated aqueous phase may be advantageous as it may improve the efficiency of the second electrochemical treatment step.

In another example, the step of clarifying may include clarifying the electrochemically treated aqueous phase from the second treatment step (or clarifying the electrochemically treated aqueous solution). The clarified aqueous phase (or solution) may then be re-used, further processed (for example by filtration) or disposed to the environment. The step of clarifying the electrochemically treated aqueous phase from the second electrochemical treatment step may be advantageous as it may enable improved separation of clear water from residues or sludge particles. If any catalysts are present in the solid residue from this clarification step, these catalysts may be separated and re-used in future second electrochemical treatment steps. Therefore, the step of clarifying may include recovering catalysts from the solid residue. The step of clarifying may also include separating floc from electrochemically treated fluid.

The step of clarifying the fluid may be advantageous as the electrochemical treatment may produce gelatinous or solid material such as sludge, and the clarifying step may allow the gelatinous or solid material to settle. The step of clarifying may include adding settling agents to the fluid. Suitable settling agents would be known to a skilled person and may include surfactants and/or polymeric compounds. The step of clarifying may also include de-aerating the gelatinous or solid material (which may be needed for the gelatinous or solid material to settle).

The clarifying step may produce supernatant and a solid residue. The supernatant from the clarifying step may be further processed. For example, the present disclosure may provide a method of treating a fluid mixture, the fluid mixture including an aqueous phase, a hydrophobic phase and aqueous contaminants, the method including the steps of:
  (i) A first electrochemical treatment step including electrochemically treating the mixture to at least partially separate the aqueous phase and the hydrophobic phase;
  (ii) A first clarification step including clarifying the at least partially separated aqueous phase from the first electrochemical treatment step to provide a solid residue and an aqueous supernatant; and
  (iii) A second electrochemical treatment step including electrochemically treating the aqueous supernatant from the first clarification step to thereby remove aqueous contaminants from the aqueous supernatant.

The above method may further include a second clarification step including clarifying the electrochemically treated aqueous supernatant from the second electrochemical treatment step to provide a solid residue and an aqueous supernatant. Typically, less solid residue is provided following the second clarification step than the first clarification step. The aqueous supernatant from the second clarification step may be filtered, as discussed above.

The solid residue may include gelatinous or solid material. The solid residue may include less than 10% solids, especially less than 5% solids, more especially less than 2% solids. Solid residues from each clarification step may be further treated separately, or the solid residues may be combined for further treatment.

In one example, methods may include the step of dewatering the solid residue from the clarification step(s). Settling and/or densification agents may be added to the solid residue, for example, for improving recovery of free water. The settling and/or densification agent may be used to counteract residual electronic charges on the solid residue to promote dewatering. The dewatering step may be performed using a dewatering apparatus.

The dewatering apparatus may include a mixing chamber for mixing the solid residue with one or more settling and/or densification agents. Flocculated residue from the mixing chamber may then be pressed (for example in a mechanical press) to press water out of the solid residue. For example, the mechanical press may include an inclined screw (at, for example, 20°) rotating inside a wedge screen (which may be made of steel, in which the screen may be 200 micron). The screw may include a series of narrowing flights, and the solid residue is compressed as it advances up the narrowing flights of the screw (the screw may also include a brush mounted to the screw flights for cleaning of the screen). As the solid residue advances up the screw, filtrate flows through the screen. This filtrate may be further clarified (for example as discussed above). An absorbant agent or polymer may be added (such as bentonite or a specialised polymer such as polyacrylamide) to the solid residue (for example via an auger feed) as the solid residue advances up the screw. The absorbant agent may be added at a rate from approximately 20 kg to approximately 100 kg per hour (this rate may be affected by the moisture content of the solid residue). The pressure in the screw may be controlled by the distance between the discharge end of the screw and a cone (as the dewatered solid residue is driven through the gap created by this distance). The efficiency of the dewatering step may be affected by one or more of: the absorbing effect of the absorbant agent, the frictional forces between the screen and the solid residue, and the restriction in the outlet of the screw. The screw may be a screw press.

The dewatering apparatus may also include a pre-dewatering portion in which free water drains by gravity prior to treatment with the mechanical press. The pre-dewatering portion may include a mesh floor.

The solid residue discharged from the screw (which may be a sludge cake) may include up to 10% solids, especially up to 15%, 20% or 25% solids. The dewatering step may include drying the solid residue discharged from the screw (for example at ambient temperature and pressure), prior to disposal.

The solid residue discharged from the screw may be conveyed to a transporter (such as a semi-trailer). For example the solid residue discharged from the screw (optionally after drying) may be conveyed by a screw auger (especially a horizontal screw auger) to a semi-trailer for disposal. It may be advantageous to maintain two transporters so that it is not necessary to stockpile solid residue on-site for re-loading.

The aqueous solution provided following the treatment methods may be used for, for example, oil or gas field re-use (for example for re-use in flooding or hydraulic fracturing operations), or for discharge to the environment. In one embodiment, organic carboxylic acids, especially acetic acid, may be separated and returned to the oil or gas well operator for further use in hydraulic fracturing operations.

Features of the electrochemical treatment apparatus used in the methods of the present disclosure (including for either or both of the first and second electrochemical treatment steps) may be as described below. Furthermore, features of the electrochemical liquid treatment apparatus in the seventh and eighth aspects of the present disclosure and the electrochemical treatment apparatus which forms part of the ninth aspect of the present disclosure may be as further described below.

The apparatus may be used (or be configured) to remove, immobilise, oxidise or reduce contaminants in or from a liquid. Contaminants may be selected from one or more of the group consisting of: metals (including transition and heavy metals), salts, solids, pathogens (including bacteria, protozoa, viruses and other organisms including algae), amphoteric species, colloids (organic and inorganic), suspended solids, organic or inorganic chemicals (including surfactants, biocides, cross-linkers or breakers) and oils or other hydrocarbons (such as in droplet and emulsified forms) and various other undesirable substances. The contaminants may include one or more of a refractory organic, a cation (such as a metal ion, including $Fe^{2+}$), or an anion (including a sulfate, a chloride, a hydroxide, a nitrate, a bicarbonate or a carbonate). The liquid may include one or more of oil wastes, dyes, suspended particulates, chemicals, and organic matter from various industrial processes and effluents. The apparatus may be used (or be configured) to remove, immobilise, oxidise or reduce contaminants in or from the liquid. The contaminants are typically removed from the liquid in the form of flocculated particles or floc.

The apparatus may be used with a fluid of any suitable electrical conductivity. The fluid to be electrolytically treated may have any suitable electrical conductivity. Liquids with moderate to high levels of total dissolved solids (TDS) generally respond well to treatment and the number and hence surface area of electrodes required is typically a function of the TDS.

The apparatus includes a treatment chamber (or a treatment vessel which defines a treatment chamber). The treatment chamber may be of any suitable size. In one embodiment, the treatment chamber is a large industrial unit. For example, the treatment chamber may accommodate from 60 kL to 1,000 kL of liquid; especially from 80 kL to 750 kL or from 100 kL to 600 kL; more especially from 125 kL to 500 kL or from 180 kL to 400 kL; most especially from 200 kL to 300 kL or about 250 kL of liquid.

The treatment chamber in another embodiment is portable. For example, the treatment chamber may accommodate less than 50 kL, 40 kL, 30 kL, 20 kL, 10 kL, 1 kL, 900 L, 800 L, 700 L, 600 L, 500 L, 400 L, 300 L, 200 L, 100 L, 80 L, 60 L, 40 L, 20 L or 10 L liquid. In another example the treatment chamber may accommodate greater than 40 kL, 30 kL, 20 kL, 10 kL, 1 kL, 900 L, 800 L, 700 L, 600 L, 500 L, 400 L, 300 L, 200 L, 100 L, 80 L, 60 L, 40 L, 20 L 10 L or 5 L liquid. In a further example, the treatment chamber may accommodate a range in which the upper and lower limits are as previously described.

Any suitable flow rate of liquid may flow through the at least one inlet, and thereby the treatment chamber. The optimal flow rate will depend on the size of the apparatus, the capacity of the treatment chamber and electrical conductivity (EC) of the liquid, which is typically a function of the total dissolved solids (TDS). The apparatus may be configured for a liquid flow rate of at least 500 mL/s; especially at least 1, 3, 5, 7, 10 or 13 L/s; more especially at least 15, 18 or 20 L/s; most especially about 23 L/s. In another embodiment, the apparatus is configured for a liquid flow rate of less than 100 L/s; especially less than 90, 80, 70, 60, 50 or 40 L/s; more especially less than 30 L/s; most especially about 23 L/s.

The residence time of the liquid within the treatment chamber may be controlled or varied, depending on the size of the treatment chamber, the surface area of electrodes and/or the flow rate of the liquid. This may achieve, for example, improved performance in either coagulation, REDOX reactions or emulsion breaking. In some embodiments, the residence time is less than 10 minutes in the treatment chamber, especially less than 9, 8, 7, 6, 5, 4, 3, 2 or 1 minute in the treatment chamber, more especially about 30 seconds in the treatment chamber. In other embodiments, the residence time is from 5 seconds to 5 minutes in the treatment chamber, especially from 10 seconds to 2 minutes in the treatment chamber, more especially from 20 to 55 seconds in the treatment chamber, most especially from 30-45 seconds in the treatment chamber.

The treatment chamber may be configured for use at atmospheric pressure. The treatment chamber may be configured for use at greater than atmospheric pressure, for example at from greater than 1 atmosphere to 10, 9, 8, 7, 6, 5, 4, 3 or 2 atmospheres (especially from 1-3 atmospheres). Pressures of greater than atmospheric pressure may be used to accelerate a reaction within the treatment chamber. The treatment chamber may be configured for use at less than atmospheric pressure, for example at from less than 1 atmosphere to 0.1, 0.2, 0.3, 0.4, 0.5, 0.6, 0.7, 0.8 or 0.9 atmospheres. Pressures of less than one atmosphere may be beneficial for the removal of dissolved gases (such as bicarbonate or carbonate), thereby limiting, by way of example, the electrode passivating effects of dissolved carbon dioxide. Gases may also be removed from the treatment chamber by use of a membrane system within the treatment chamber which operates at such reduced pressure so as to preferentially degas the liquid being treated.

The treatment chamber may be made of any suitable material. In one embodiment, the treatment chamber may be made of a polymer such as a polymer plastic (examples include high density polyethylene (HDPE), acrylonitrile butadiene styrene (ABS), polyvinyl chloride (PVC), polyethylene terephthalate (PET), a phenolic polymer plastic, polypropylene or polyethylene (PE)); a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; a rubber; a metal such as steel, steel alloy, aluminium, or stainless steel (especially a metal insulated using a polymer plastic or composite material); a carbon fibre insulated using a polymer plastic or a composite material; or an insulating plastic (such as a phenolic insulating plastic) bonded (especially thermally) to a substrate such as a metal, concrete or compressed fibre-cement sheet. The treatment chamber may be machine finished. The treatment chamber may be partially or completely transparent (for example, the treatment chamber may be made of glass or a transparent plastic). A transparent treatment chamber may be advantageous for use with some treatment enhancers (such as UV light).

In one embodiment, the treatment chamber is configured so that the plurality of electrodes are positioned (or configured to be positioned) intermediate the at least one inlet and at least one outlet. In this embodiment liquid may enter the treatment chamber via the at least one inlet, pass between the plurality of electrodes, and then exit the treatment chamber via the at least one outlet. In a first example, the treatment chamber is configured so that the liquid flows substantially vertically through the treatment chamber. In this example, the at least one inlet may be positioned at the lower portion of the treatment chamber; and the at least one outlet may be positioned at the upper portion of the treatment chamber (i.e. the liquid substantially ascends through the chamber). Alternatively, the at least one inlet may be positioned at the upper portion of the treatment chamber; and the at least one outlet may be positioned at the lower portion of the treatment chamber (i.e. the liquid substantially descends through the chamber). In a second example, the treatment chamber is configured so that the liquid flows substantially horizontally through the treatment chamber. In this example the at least one inlet may be positioned at or adjacent to one side wall of the treatment chamber, and the at least one outlet may be positioned at or adjacent to an opposite side wall of the treatment chamber. In a third example, the treatment chamber is configured so that the liquid flows obliquely through the treatment chamber.

The treatment chamber may be a plurality of treatment chambers arranged in parallel. It may be advantageous to use a plurality of parallel treatment chambers in order to increase the external surface area of the treatment chamber during the electrochemical treatment. This may allow for greater exposure to, or penetration of, treatment enhancers (such as ultraviolet light, microwaves or ultrasonic waves) during the electrochemical treatment.

The treatment chamber may be of any suitable shape or dimensions. The treatment chamber may have a square, circular, ovoid, elliptical, polygonal or rectangular cross-section. In one embodiment, the treatment chamber has a first wall, and one or more side walls. The first wall may include or be adjacent to the at least one inlet. The first wall may be distal to the electrodes and proximate to the at least one inlet. In this embodiment, the treatment chamber may include a second wall opposite to the first wall. The second wall may be distal to the electrodes and proximate to the at least one outlet. The second wall may be removable (such as if the second wall forms the lid of the chamber). The second wall may include or be adjacent to the at least one outlet. A side wall may also include or be adjacent to the at least one outlet. In another embodiment, the treatment chamber may include a base (first wall), a top or lid (second wall), and one or more side walls (especially if the treatment chamber is configured so that the liquid flows substantially vertically through the treatment chamber). It may be advantageous for the treatment chamber to include a lid so that pressure in the treatment chamber may accumulate as the electrochemical treatment progresses. If the liquid flows substantially vertically through the treatment chamber, then the at least one outlet may be positioned in the upper portion of the treatment chamber, and the at least one inlet may be positioned in the lower portion of the treatment chamber. A wall or panel of the treatment chamber may be at least partially removed or opened. In one embodiment, the treatment chamber may be cylindrical, especially a pipe.

The one or more side walls may be planar, circular or ovoid. The second wall may include a vent or gas outlet for gases which evolve during the electrochemical process.

The inner surface of the first wall may be planar. The inner surface of the first wall may also be configured to direct the flow of liquid towards the electrodes. The inner surface of the first wall may include at least one (especially one) trough or channel which narrows to its base. The trough or channel may be substantially V-shaped. The trough or channel may be for directing the flow of water towards the electrodes. The first wall (especially the trough or channel) may include the at least one inlet, or the at least one inlet may be located within the trough or channel.

The apparatus may include any suitable number of treatment chambers (and optionally any number of defoaming chambers). The apparatus may include a plurality of treatment chambers. In one embodiment, the apparatus includes at least a first and a second treatment chamber (each of which may be as herein described), wherein the apparatus is configured so that liquid from said at least one outlet of the first treatment chamber flows into at least one inlet of the second treatment chamber. In another embodiment, the apparatus includes at least a first and a second treatment chamber and a first and a second defoaming chamber (each of these may be as described herein), wherein the apparatus is configured so that liquid passes through the first treatment chamber, the first defoaming chamber, the second treatment chamber and the second defoaming chamber; especially wherein the liquid passes sequentially through the aforementioned chambers.

In one embodiment, the at least one inlet is a plurality of inlets for entry of a liquid to be treated. The treatment chamber may include at least 10 inlets, especially at least 15 inlets, more especially at least 20 inlets and most especially at least 30 inlets. The plurality of inlets may be for dispersing the liquid to be treated into the treatment chamber, especially for evenly dispersing the liquid to be treated throughout the treatment chamber.

Advantageously, by using a plurality of inlets the liquid may evenly enter the treatment chamber. This may improve even, or so-called laminar, fluid flow throughout the treatment chamber and said flow may maximise uniform and efficient contact between the electrodes positioned within the treatment chamber and the liquid being treated. Without wishing to be bound by theory, the benefits of encouraging such laminar or uniform flow may include some or all of reduced electrode and power consumption, improved transfer of electrical charge to the liquid to be treated, improved oxidation of impurities by short-lived free radicals (particularly refractory organic contaminants) and reduced electrode passivation.

The liquid may be dispersed into the treatment chamber by way of at least one liquid disperser, especially one liquid disperser. The liquid disperser may be separate to, or integral with, the first wall. The disperser may include a plurality of liquid inlets into the treatment chamber (these would be outlets from the disperser). Said liquid disperser may be for evenly dispersing the liquid to be treated throughout the treatment chamber or relative to the electrodes in the treatment chamber, and may especially be a liquid manifold. In one embodiment, the treatment chamber includes a liquid disperser for dispersing the liquid to be treated into the treatment chamber, wherein said liquid disperser includes a plurality of inlets within the treatment chamber for entry of a liquid to be treated. Any suitable type of liquid disperser may be used.

In a first example, the disperser is a tube, especially a tube perforated along its length to provide a plurality of inlets into the treatment chamber. The tube may be of circular, ovoid, square, rectangular or triangular cross section. The tube may be perforated on all sides, or on all sides except for a side opposite to the electrodes. Advantageously, the disperser in this embodiment may be positioned within the at least one (especially one) trough or channel which narrows to its base in the first wall. If the first wall includes multiple troughs or channels, then a disperser may be positioned within each trough or channel. In one embodiment, the treatment chamber includes at least one liquid disperser for dispersing the liquid to be treated into the treatment chamber, wherein said liquid disperser includes a plurality of inlets within the treatment chamber for entry of a liquid to be treated, and wherein within each said at least one channel is positioned one said liquid disperser.

In a second example, the disperser includes a plurality of liquid passageways, wherein each said liquid passageway includes at least one inlet to the treatment chamber for entry of a liquid to be treated. The disperser in this example may be a manifold. Said plurality of liquid passageways may include at least one longitudinal liquid passageway and/or at least one transverse liquid passageway. Said passageways may be in fluid communication with each other. For example, the disperser may include at least one liquid entry point, at least one longitudinal liquid passageway and/or at least one transverse liquid passageway. At least one or each of the liquid passageways may include at least one and preferably a plurality of inlets to the treatment chamber. The liquid passageways may be arranged in any suitable way. Advantageously, computational fluid dynamic (CFD) modelling may be used to provide for laminar flow across the surface of the electrodes within the treatment chamber.

Typically, the at least one transverse liquid passageway may be in liquid communication with the at least one longitudinal liquid passageway. The at least one liquid entry point may be in liquid communication with or abut either the at least one longitudinal liquid passageway, or the at least one transverse liquid passageway. The at least one longitudinal liquid passageway may be in fluid communication with, and extend from (especially at from 30 to 150 degrees to; more especially at from 60 to 120 degrees to; most especially at about 90 degrees to) the at least one transverse liquid passageway. The inlets to the treatment chamber may be provided by the outlets of the liquid disperser. In the second example, the disperser (especially manifold) may include at least one longitudinal liquid passageway in fluid communication with at least one transverse liquid passageway, wherein the at least one longitudinal liquid passageway and/or the at least one transverse liquid passageway include at least one inlet to the treatment chamber for entry of a liquid to be treated. The at least one inlet and/or disperser may be positioned beneath the plurality of electrodes (if the liquid substantially ascends as is passes through the treatment chamber).

The disperser may include a diffuser for evenly distributing the liquid exiting the disperser. However, depending on the results of the aforementioned CFD modelling or other factors, the diffuser may not be necessary.

The disperser may be made of any suitable material. In one embodiment, the disperser may be made of the same types of materials as previously described for the treatment chamber. In one embodiment, the disperser is made from welded polypropylene or polyethylene, polyester or epoxy resin fibreglass, a polymer, rubber, or cast or extruded components based on polymer plastic materials.

The apparatus may include a pretreater positioned prior to, and in fluid communication with the at least one inlet. The pretreater may be a filter to remove larger particulate solids from the fluid stream that could lodge between the electrodes and disrupt liquid flows or otherwise impede with the functioning of the device.

The apparatus may further include a flow aligner (or flow distributor) for aligning the flow of the liquid between the electrodes. The flow aligner may also be for distributing the liquid between the electrodes. The flow aligner may be positionable between the at least one inlet and the electrodes. A flow aligner may be advantageous as the liquid between the electrodes and the at least one inlet (or if the liquid substantially ascends through the treatment chamber, beneath the electrodes) may especially be turbulent. The flow aligner may assist the liquid in moving substantially or uniformly along the same longitudinal axis as the plurality of electrodes, which in turn may improve the contact time and hence electrochemical reaction between the liquid to be treated and the electrodes.

In a first example, the flow aligner may be in the form of at least one (especially a plurality of) baffles or baffle walls extending beneath the electrodes (or between the electrodes and the at least one inlet). The at least one baffle or baffle wall may extend substantially vertically beneath the electrodes (or in a plane perpendicular to the first wall of the treatment chamber). The at least one baffle or baffle wall may extend along substantially the same longitudinal axis as the electrodes. The at least one baffle or baffle wall may be positioned transversely or substantially perpendicularly to the electrodes. The flow aligner may integrally formed with the treatment chamber, or may be removable and/or replaceable. Each baffle or baffle wall may be in the form of a plate. Each baffle or baffle wall may be from 20 mm to 500 mm long, especially from 50 mm to 250 mm long or from 60 mm to 150 mm long, more especially from 80 mm to 120 mm long, most especially about 100 mm long.

In a second example, the flow aligner may be a partition (or wall or barrier) (especially a removable partition) defining a plurality of apertures for passage of the liquid. The apertures defined by the removable partition may be consistently spaced and sized so that liquid flows evenly through the partition. The flow aligner may extend between the side walls of the treatment chamber. The apparatus may be configured so that when in use, the liquid pressure on the side of the partition proximate to the at least one inlet is greater than the liquid pressure on the side of the partition proximate to the electrodes. In one embodiment, the partition is configured to provide a greater liquid pressure on the side of the partition proximate to the at least one inlet than on the side of the partition proximate to the electrodes when the apparatus is in use. Advantageously, this may assist the even, uniform or laminar flow of liquid between the electrodes. In an alternative embodiment, the treatment chamber may have only one inlet. In this embodiment the volume of liquid beneath the flow aligner may be sufficiently large so that turbulence in the liquid is ameliorated after the liquid passes through the flow aligner. Depending on a range of fluid, electrode and cell design parameters, such further design refinement could be influenced or determined by the CFD modelling as described above.

In the second example, the flow aligner (or removable partition or wall) may be in the form of a plurality of segments, such that any one segment may be removed independently of the others. Each said segment may abut the adjoining segment, or each said segment may be in close proximity with the adjoining segment. In one embodiment, the apparatus includes a plurality of electrode holders and each said electrode holder includes a segment of the flow aligner. The flow aligner may be in the form of at least one plate (or panel) (especially a plurality of plates), wherein each said plate defines a plurality of apertures for passage of the liquid. The flow aligner may define a plurality of apertures each having a polygonal (especially hexagonal), circular or ovoid shape.

The combination of a disperser and a flow aligner (especially a disperser in the form of a perforated tube positioned within a trough or channel in the first wall, and a flow aligner in the form of a partition (or wall) defining a plurality of apertures for passage of the liquid) may promote the even, uniform or laminar flow of liquid between the electrodes, to thereby maximise the transfer of electrical charge and the efficiency of the electrochemical reaction. In this way, so-called "deadspots" in the flow of liquid through the reaction chamber can be minimised.

The flow aligner may be made of any suitable material, but especially may be made of a non-conductive material. The flow aligner may be made of the materials discussed above for the treatment chamber. The flow aligner may be especially made from a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; a polymer plastic such as high density polyethylene (HDPE), polyethylene (PE), polyethylene terephthalate (PET), polyvinyl chloride (PVC); a phenolic polymer plastic; or be fabricated from a number of composite materials including carbon fibre (for example a carbon fibre insulated using a polymer plastic or a composite material) and variations thereof.

The inventors have performed computational fluid flow simulations on various treatment chamber configurations. The inventors have also studied fluid flow and pH variations within the treatment chamber during electrochemical treatments using pH sensitive indicators, and by inclusion of synthetic resin beads (of size less than 0.5 mm) in the fluid flow within the treatment chamber. These techniques were used to identify preferential channelling of the fluid flow. Advantageously, the inventors have found that inclusion of a flow aligner intermediate the at least one inlet and the electrodes, especially a flow aligner in the form of a partition defining a plurality of apertures provides decreased preferential channelling of the fluid flow, and increased uniformity of the fluid flow through the treatment chamber.

The apparatus may be configured to electrochemically treat the liquid in the presence of at least one treatment enhancer or at least one treatment agent.

The at least one treatment agent may be a fluid (including a gas or a liquid) or a solid. The at least one treatment agent may be a plurality of treatment agents. The at least one treatment agent may assist in the treatment of the liquid. The at least one treatment agent may act as a reactant or a catalyst during the electrochemical treatment, or it may modify or adjust the properties of the reactants, the liquid (solvent) or the products of the electrochemical treatment, or it may be inert during the electrochemical treatment. The at least one treatment agent may be used to form a reactant or catalyst in situ during the electrochemical treatment. Each said at least one treatment agent may also perform multiple functions. For the avoidance of doubt, the term "treatment agent" does not include chemicals produced in the course of an electrochemical treatment (such as hydrogen gas, metal ions generated by a sacrificial anode, and hydroxyl ions and hydroxyl radicals produced at the cathode); the term "treatment agent" refers to chemical matter deliberately added to the liquid to be treated by an operator during, prior to or after the electrochemical treatment. Electrodes per se, for example, are not treatment agents, although an electrode may be doped with a treatment agent so that the treatment agent is released, or acts as a catalyst, during the electrochemical treatment as the anode corrodes.

The at least one treatment agent may be an oxidant, reductant or catalyst. The at least one treatment agent may form an oxidant, reductant or catalyst in situ in the treatment chamber during the electrochemical treatment. The at least one treatment agent may be selected from the group consisting of: an oxidant, a reductant, a homogenous or heterogeneous catalyst, a pH modifier (an acidifier (or acid) or a basifier (or base/alkali)), a surfactant, a defoaming agent, a conductivity modifier (for modifying the conductivity of the liquid to be treated), a chelant (for chelating with metal ions in the liquid), a viscosity modifier (for modifying the viscosity of the liquid or the floc), a ligand (for forming a catalyst), and a buoyant gas (which may advantageously improve or increase the liquid flow velocity between the electrodes and/or improve the reaction of components within this liquid). Suitable catalysts are described above.

The at least one treatment agent may be a source of sulfate radicals. An exemplary source of sulfate radicals is sodium persulfate as discussed above.

Exemplary oxidants may include permanganate (such as potassium permanganate), hydrogen peroxide, an inorganic peroxide, a peroxysulfates, a disulfate, a peracid (such as an organic or inorganic peracid—an exemplary example is meta-chloroperoxybenzoic acid), oxygen gas, ozone, a halogen gas (such as fluorine or chlorine), nitric acid, sulfuric acid, a chlorite, a chlorate, a perchlorate, hypochlorite, and salts of the aforementioned oxidants. Exemplary reductants may include carbon monoxide, iron (II) compounds, hydrogen sulfide, disulfide, formic acid, sulfite compounds, boron reducing agents and hydrogen gas. Other oxidants and reductants would be known to a skilled person. The oxidant or reductant may assist in the electrochemical conversion of contaminants (especially to enable removal or recovery of the contaminants). The oxidant may assist in enhanced oxidative processes (EOP), such as for refractory contaminants.

Advantageously, the presence of an oxidant or reductant within the treatment chamber may encourage or facilitate the further electrochemical reactions of reduction or oxidation or may result in enhanced oxidation processes or enhanced reduction processes within the reaction chamber. In one example, the liquid to be treated may be refined during the electrochemical (or electrolytic) treatment by oxidative or reductive reactions in which the physical or chemical properties of contaminants in the liquid are altered by electrochemical processes, especially electrocoagulation processes.

The at least one treatment agent may be for reaction with certain contaminants in the liquid to be treated, may be used to adjust the properties of the liquid being treated (for example to adjust the pH of the liquid), or may be for adjusting the properties of the floc (for example the agglomeration, viscosity, flowability or settling velocity of the floc).

The at least one treatment agent may be a gas (which may be inert, an oxidant or a reductant, for example). The gas may be selected from one or more of the group consisting of: air, hydrogen, oxygen, ozone, carbon monoxide, carbon dioxide, sulphur dioxide, hydrogen sulfide, nitrogen, chlorine, fluorine, chlorine dioxide, ammonia, or a combination thereof; especially hydrogen, hydrogen sulfide, ozone, chlorine, carbon monoxide, air, carbon dioxide, or a combination thereof; more especially air, carbon dioxide, hydrogen sulfide, ozone, hydrogen, carbon monoxide, or a combination thereof. A plurality of treatment agents may enter the treatment chamber, such as an inert gas and an oxidant or reductant.

A said at least one treatment agent may be added to the liquid after the chemical treatment (either before or after the liquid exits the treatment chamber). For example, if the liquid provided after the electrochemical treatment is transferred to a tank (such as a clarification tank) a said at least one treatment agent may be added to encourage the separation (typically by gravity settling) of floc.

The apparatus may be adapted to provide at least one treatment agent in the treatment chamber during electrochemical treatment of the liquid. The at least one treatment agent may be provided within the treatment chamber in any suitable way.

In a first example, a said at least one treatment agent may be mixed with the liquid to be treated before the liquid enters the treatment chamber. The apparatus may include a mixer in fluid communication with the at least one inlet for a liquid to be treated, wherein the mixer is for mixing at least one treatment agent (which may be a liquid, gas or solid) with the liquid to be treated, before the liquid to be treated passes through the at least one inlet. Alternatively, the treatment agent may be provided on a liquid conduit to the treatment chamber, such as a pipe or manifold for transferring the liquid to be treated to the treatment chamber.

In a second example, a said at least one treatment agent may be provided on a surface within the treatment chamber. For example, a catalyst may be provided on an inner side wall of the treatment chamber, on the walls at which the electrodes are held (e.g. on an electrode holder), or within at least one of the electrodes (such as via a doped-electrode), in which the treatment agent may be chemically alloyed within or physically attached, laminated or layered to the electrode materials. Said treatment agent may be released from the doped electrode when the electrode functions as an anode (at which time the anode releases metal ions into the liquid)). An exemplary doped electrode is a cerium doped electrode, although several other rare earth or precious metals when coated onto inert electrodes such as titanium, will be known to those skilled in the art.

In a third example, a said at least one treatment agent may be provided following electrochemical treatment.

In a fourth example, a said at least one treatment agent may enter the treatment chamber through at least one treatment inlet. The treatment chamber may include at least one treatment inlet (or a plurality of treatment inlets, especially in fluid communication with each other) for each or each mixture of treatment agents. The treatment chamber may include at least 10 treatment inlets, especially at least 15 inlets, more especially at least 20 inlets, and most especially at least 30 inlets. The at least one treatment inlet may be for assisting in the treatment of the liquid.

The at least one treatment inlet may be at least one fluid treatment inlet (the fluid may include gases and liquids, and for example, liquids including suspended solids). The at least one fluid treatment inlet may be in the form of a fluid treatment disperser. The at least one fluid treatment inlet may be at least one liquid treatment inlet. The at least one liquid treatment inlet may be in the form of a liquid treatment disperser. The liquid treatment disperser may be as described above for the liquid disperser.

The at least one treatment inlet may be an inlet for a gas treatment agent (i.e. a gas inlet). The treatment chamber may further include a gas treatment disperser having a plurality of gas inlets to the treatment chamber. Said gas treatment disperser may be for evenly dispersing the gas relative to the electrodes in the treatment chamber, and may especially be a gas manifold.

The gas disperser may include a plurality of gas passageways, wherein each said gas passageway includes at least one inlet for entry of a gas. Said plurality of gas passageways may include at least one longitudinal gas passageway and/or at least one transverse gas passageway. Any suitable type of gas disperser may be used. For example, the gas disperser may include at least one gas entry point, and at least one longitudinal gas passageway and/or at least one transverse gas passageway. Each of the gas passageways may include at least one and preferably a plurality of gas inlets. The gas passageways may be arranged in any suitable way. Typically, the at least one transverse gas passageway may be in gaseous communication with the at least one longitudinal gas passageway. The at least one gas entry point may be in gaseous communication with or abut either the at least one longitudinal gas passageway, or the at least one transverse gas passageway. The at least one longitudinal gas passageway may be in gaseous communication with, and extend from (especially at from 30 to 150 degrees to; more especially at from 60 to 120 degrees to; most especially at about 90 degrees to) the at least one transverse gas passageway. The at least one gas inlet to the treatment chamber may be provided by outlets of the gas disperser. The treatment chamber may include at least 20 gas inlets.

The at least one treatment inlet may be positioned at any suitable point or points in the treatment chamber. In one embodiment, the at least one treatment inlet is positioned between the electrodes and the first wall (especially between the flow aligner and the first wall). If the liquid substantially ascends as it passes through the treatment chamber, then the at least one treatment inlet may be positioned beneath the electrodes (especially so that the treatment agent substantially rises as it travels through the treatment chamber). In one embodiment, the at least one treatment inlet (including a fluid treatment disperser) is integral with the first wall (or base) of the treatment chamber. In another embodiment, the at least one treatment inlet (including a fluid treatment disperser) is removable from the treatment chamber.

The treatment chamber may include at least one treatment inlet (or a plurality of treatment inlets in fluid communication with each other) for each or each mixture of treatment agents. When the treatment chamber includes treatment inlets for different types of treatment agents (for example, a liquid treatment disperser and a gas disperser), these may be positioned relative to each other and to the at least one liquid inlet in any suitable way. For example, if the apparatus includes a liquid disperser and a gas disperser, the liquid disperser may be adjacent or proximate to the gas disperser (for example, the liquid disperser may be on top of, beneath, or beside the gas disperser). Similarly, if the apparatus includes a liquid treatment disperser and a liquid disperser, the liquid treatment disperser may be adjacent or proximate to the liquid disperser (for example, the liquid disperser may be on top of, beneath, or beside the liquid treatment disperser).

The at least one outlet for exit of electrochemically (or electrolytically) treated liquid may be located in any suitable position in the treatment chamber. However, the at least one outlet especially may be located such that the electrodes are positioned intermediate the at least one outlet and the at least one inlet. In one embodiment, the at least one outlet is located in or is positioned adjacent the second wall of the treatment chamber.

In a first example, the at least one outlet may include at least two outlets, especially two outlets. The at least two outlets may include at least one floc outlet for exit of floc, and at least one liquid outlet for exit of electrochemically treated liquid. This arrangement may be particularly advantageous when the liquid substantially ascends as it passes through the treatment chamber (i.e. so that the at least one outlet is positioned above the plurality of electrodes). The floc outlet may be positioned above the liquid outlet. For the avoidance of doubt, some liquid may exit the treatment chamber at the floc outlet with the floc, and some floc may exit the treatment chamber through the liquid outlet (although substantially all floc especially exits the treatment chamber through the floc outlet).

In this example, the liquid outlet may be positioned relative to the floc outlet in any suitable way. In one embodiment, the floc outlet is positioned above the liquid outlet. The liquid outlet may be in the form of an aperture or passageway extending from a side wall of the treatment chamber. The treatment chamber may include one, two, three, four or five liquid outlets. One or more valves may be associated with the liquid outlets so that each liquid outlet may be selectively closed or partially closed. Advantageously, this may allow adjustment of the liquid flow rate through the treatment chamber. The floc outlet may be a weir or spillway. The spillway may include a baffle (especially an adjustable baffle) which may form the lower lip of the spillway. The adjustable baffle may be raised or lowered to adjust the separation of the floc from the electrochemically treated liquid. The adjustable baffle may be a plate. The apparatus may include one, two, three or four floc outlets, especially on different sides of the treatment chamber. The floc outlet may be positioned at substantially the intended height of the liquid within the treatment chamber.

In a second example, the at least one outlet is one outlet. In this embodiment the floc may be separated from the treated liquid after the liquid exits the treatment chamber. For example, the apparatus may further include a vessel in fluid communication with the at least one outlet (a defoaming chamber, as discussed below, may be intermediate the at least one outlet and the vessel). Electrochemically treated liquid exiting the liquid outlet may flow to the vessel for separation of the floc from the liquid. In one embodiment, the vessel may be a clarifier for clarifying the liquid. The vessel may include at least one liquid outlet and at least one floc outlet. Features of the liquid outlet and the floc outlet may be as described in the preceding two paragraphs.

The apparatus may also include a floc mover for moving floc, especially on the surface of the liquid in the treatment chamber (or alternatively on the surface of the vessel in fluid communication with the at least one outlet). The floc mover may be configured for moving the floc towards the at least one floc outlet, and may assist in providing a horizontal flow for the liquid at the top of the treatment chamber (or at the top of the vessel). The floc mover may be a floc skimmer. The floc mover may be positioned substantially above or below the surface of the liquid in the treatment chamber.

The floc mover may include at least one floc driver for driving the floc towards the at least one floc outlet, and especially a plurality of floc drivers (these may be in the form of a paddle or projection). The at least one floc driver may be mounted to or mounted relative to a belt, strap, chain or cable. The belt, strap, chain or cable may be turned by a belt drive. The belt drive may be partly flexible. The belt drive may include at least one wheel, especially at least two wheels, more especially two wheels. The at least one wheel may include teeth, and may be in the form of a cog or sprocket.

A separator may be in fluid communication with the floc outlet to separate floc from the liquid. The separated floc may be disposed of, further treated, or otherwise used. The separated liquid may be combined with the liquid exiting the treatment chamber (or vessel) via the liquid outlet; returned to the treatment chamber for further treatment; or diverted elsewhere (for example by the use of a float or sensor actuated submersible sludge pump) for further treatment, or release to the environment.

The separator may be in the form of a filter. In one embodiment, the filter may be a filtration bag, especially a filtration bag made of a polymeric material, more especially a filtration bag having woven polymeric fibres which trap some or substantially all of the solids and permit the free flow of separated liquid.

The apparatus may also include a defoamer. The defoamer may be for decreasing the volume of foam (or bubbles) after the electrochemical treatment. During electrochemical treatment foam is frequently generated from, for example, gas bubbles generated at the cathode. As these bubbles pass through the liquid they can generate foam which can be difficult to manage and can cause overflowing in liquids high in organic compounds (such as carrageenan, xanthate or guar derived vegetable gums). The defoamer may include one or more nozzles for spraying liquid onto the foam. As the liquid is sprayed onto the foam, the liquid droplets pierce the foam, releasing the trapped gas and decreasing the foam volume. The nozzle may be adjustable to modify the velocity of the sprayed liquid and the size of the sprayed liquid droplets. Advantageously, the properties of the foam produced in the electrochemical treatment may vary depending on the composition of the liquid, and an adjustable nozzle may allow for effective defoaming for a variety of liquid types. For example, if guar gum is present in the liquid during electrochemical treatment then the foam created may have very elastic bubbles, which requires larger droplets and/or a higher velocity to penetrate. The apparatus may include one, or a plurality of defoamers. The nozzle may produce a jet, or produce a mist. The liquid sprayed by the nozzle may be electrochemically treated liquid from the treatment chamber. The defoamer may include a pump for pumping the liquid through the nozzles.

The defoamer may be positioned above the surface of the treatment chamber (or vessel) to defoam floc on the surface of the liquid. The defoamer may also be present in a defoaming chamber (the apparatus may include a defoaming chamber which includes a defoamer). In one embodiment, the apparatus may further include a defoaming chamber (or a defoaming vessel which defines a defoaming chamber). Liquid exiting the treatment chamber through the at least one outlet may flow to the defoaming chamber. The liquid exiting the treatment chamber may pass through the defoaming chamber to an outlet at the base of the defoaming chamber. One, or a plurality of defoamers may be positioned (especially vertically positioned) within the defoaming chamber to spray liquid on foam passing (or falling) through the chamber. The defoaming chamber may also include one or more (especially one or two) flow diverters. The flow diverters may be positioned within the defoaming chamber to divert the flow of liquid to thereby increase the liberation of gas from the liquid. The flow diverters may be a plate, especially a substantially vertically mounted plate within the defoaming chamber.

At least a first flow diverter may provide a weir inside the defoaming chamber. A second flow diverter may be positioned intermediate said first flow diverter and the inlet to the defoaming chamber (which may be the outlet of the treatment chamber). The second flow diverter may provide an underflow weir (under which the fluid passing through the defoaming chamber passes). The bottom of the second flow diverter may extend lower than the top of the first flow diverter. The first and/or second flow diverter may be substantially vertical. The first and/or second flow diverter may be a wall or plate. Advantageously, the first and second flow diverters may trap foam entering the defoaming chamber between the second flow diverter and the defoaming chamber inlet. Fluid entering the defoaming chamber may fall onto the trapped foam to assist in decomposing the foam.

The defoaming chamber may include an outlet for exit of defoamed liquid. Said defoaming chamber outlet may be located at the base of the defoaming chamber.

Advantageously, during an electrochemical treatment gases such as hydrogen may evolve at the electrodes, with the amount observed depending on the liquid composition. These gases have the potential to produce foams which (in the case of a treatment chamber without a lid) has the potential to overflow. Furthermore, if foam is present in the fluid introduced into a pump it can create difficulties due to the trapped gas within the foam (for example creating air locks). The use of a defoaming chamber may ameliorate these possibilities.

The plurality of electrodes may be selected from the group consisting of an anode, a cathode and an electrical conductor. In use, the apparatus includes at least one anode and at least one cathode. However, the electrodes may all be of similar structure and only become an anode, a cathode or an electrical conductor by virtue of the power connected to the electrode (or lack thereof in the case of an electrical conductor). Each said at least one electrical conductor may be positioned between or intermediate at least one anode and at least one cathode. In one embodiment, the plurality of electrodes includes at least one anode, at least one cathode and at least one electrical conductor, wherein said at least one electrical conductor is positioned intermediate said at least one cathode and said at least one anode.

As used herein, the term "electrical conductor" refers to an electrode which is not intended to accept power from a power source external to the treatment chamber. The electrical conductor may obtain an electrolytic charge from the electron flow in an electric field contained within the vessel in which it resides.

The apparatus may include from 10 to 1000 electrodes; especially from 20 to 500 electrodes; more especially from 30 to 250 electrodes; most especially from 40 to 100 electrodes.

In one embodiment, from 2 to 12 electrodes in the apparatus are connected to a power source; especially from 2 to 10 or from 2 to 8 electrodes in the apparatus are connected to a power source; more especially from 2 to 6 or from 2 to 4 electrodes in the apparatus are connected to a power source; most especially three electrodes in the apparatus are connected to a power source. If three electrodes in the apparatus are connected to a power source, the two terminal electrodes (i.e. at each end of the plurality of electrodes) will have the same polarity (i.e. either an anode or a cathode) and an electrode intermediate the terminal electrodes (especially substantially equidistant between the terminal electrodes) will have the opposite polarity (i.e. either an anode or a cathode). The remaining electrodes in the plurality of electrodes will be electrical conductors. In one embodiment, the apparatus is configured so that from 5% to 25% of the electrodes in the apparatus are anodes or cathodes; especially from 8% to 20% of the electrodes in the apparatus are anodes or cathodes; more especially from 10% to 20% of the electrodes in the apparatus are anodes or cathodes or from 10% to 15% of the electrodes in the apparatus are anodes or cathodes. In another embodiment, the apparatus is configured so that from 0.5% to 25% of the electrodes in the apparatus are anodes or cathodes; especially from 0.5% to 15% of the electrodes in the apparatus are anodes or cathodes; more especially from 0.5% to 10% of the electrodes in the apparatus are anodes or cathodes or from 0.5% to 5% of the electrodes in the apparatus are anodes or cathodes. In one embodiment, about 2.5% of the electrodes in the apparatus are anodes or cathodes.

Each electrode, a set of electrodes, or the plurality of electrodes may be replaceable and/or removable. For example, the electrodes may be removable from the treatment chamber by means of an overhead gantry. The electrodes may be removed for temporary storage as a set (for example in horizontal racks above the unit), or can be replaced individually such as when an electrode loses its anodic potential through diminished surface area, for example by corrosion.

Each electrode may be of any suitable shape, although certain shapes facilitate easy removal from the treatment chamber. For example, each electrode may be curved or planar, especially planar. Each electrode may also be, for example, of square, rectangular, trapezoidal, rhomboid, or polygonal shape; especially of rectangular or square shape. Each electrode may also be of solid construction, or may include a plurality of apertures. Each electrode may be especially of solid construction. In one embodiment, each electrode is a plate. In another embodiment, a said electrode or a portion of the plurality of electrodes may be of circular, ovoid, or elliptical cross section. In this embodiment, the electrodes in the portion of the plurality of electrodes may be positioned so that one electrode is inside the adjacent electrode. For example, a portion of the plurality of electrodes may be concentrically positioned (especially when said electrodes are cylindrical in shape).

Each electrode may be made of any suitable material. Exemplary materials are discussed above, and may also include aluminium, iron, steel, stainless steel, steel alloy (including mild carbon steel), magnesium, titanium and carbon. In another embodiment, each electrode may be made of an alloy of or containing a material selected from the group consisting of: aluminium, iron, steel, magnesium, titanium and carbon. Each electrode may be selected depending upon the liquid to be treated, the contaminants in the liquid, the floc to be created and the relative cost of the various metallic electrodes at the time. Each said electrode within the apparatus may be the same or different, and may include the same metal or different metals (for example depending on the desired performance). A said or each electrode may also include one or more treatment agents for release during the electrochemical treatment. A said or each electrode may also include one or more treatment agents to catalyse specific reactions, especially oxidative reactions, during the electrochemical treatment.

The electrodes may be positionable above or below the level of the liquid in the treatment chamber. However, the electrodes are especially positionable below the level of the liquid in the treatment chamber. If the liquid substantially ascends as it passes through the treatment chamber, this arrangement may advantageously not impede liquid or floc horizontal flow at the surface of the liquid.

The electrodes may be positionable within the reaction chamber at any suitable angle. For example, the electrodes or a portion of the electrodes (such as an upper portion) may be angled from a vertical plane (obliquely configured) or a plane perpendicular to the first wall of the treatment chamber. The electrodes may be positioned substantially vertically or at an angle of from 10 to 30 degrees from the vertical or a plane perpendicular to the first wall of the treatment chamber, especially at an angle of 10 to 15 degrees or about 15 degrees from the vertical or a plane perpendicular to the first wall of the treatment chamber. In one example, the electrodes or a portion of the electrodes (such as an upper portion or portion proximate to the at least one outlet) may be positioned at an angle of from 5 to 40 degrees from the vertical or a plane perpendicular to the first wall of the treatment chamber, especially from 5 to 35 degrees from the vertical or a plane perpendicular to the first wall of the treatment chamber, more especially from 10 to 30, 10 to 15 or 15 to 30 degrees from the vertical or a plane perpendicular to the first wall of the treatment chamber. In other examples, the electrodes or a portion of the electrodes (such as an upper portion or portion proximate to the at least one outlet) may be positioned at less than 40 degrees from the vertical or a plane perpendicular to the first wall of the treatment chamber, more especially less than 35, 30, 25, 20, 15, 10 or 5 degrees from the vertical or a plane perpendicular to the first wall of the treatment chamber. In further examples, the electrodes or a portion of the electrodes (such as an upper portion or portion proximate to the at least one outlet) may be positioned at greater than 5, 10, 15, 20, 25, 30 and 35 degrees from the vertical or a plane perpendicular to the first wall of the treatment chamber. In other embodiments, the electrodes may be substantially vertical (or in a vertical plane) or substantially in a plane perpendicular to the first wall of the treatment chamber. The inventors have found that different liquids react differently to different electrode angles. For the avoidance of doubt, as used herein if the first wall includes a trough or a channel then the phrase "a plane perpendicular to the first wall of the treatment chamber" refers to a plane perpendicular to the base of the trough or channel.

When the liquid substantially ascends through the treatment chamber, positioning the electrodes within the treatment chamber at an angle may result in a number of advantages. First, positioning the electrodes at an angle may mean that the liquid flows against the electrodes as it rises through the treatment chamber (also gases may travel against the electrode as the gas rises through the treatment chamber). This may assist, for example, in reductive processes within the treatment chamber or may assist in preventing build-up of material (such as floc) on the electrodes. This may be especially advantageous when the polarity of the electrode, particularly a cathode, can be reversed during the passage of a reductive gas along or over its surface.

Secondly, positioning the electrodes at an angle results in a horizontal movement being applied to the liquid as it travels through the treatment chamber. This can assist in directing the liquid through the at least one outlet, and especially floc through the floc outlet. In one example, the horizontal or essentially tangential movement applied to particles suspended or dispersed within the liquid forces any coagulated sediment or floc away from the treatment chamber thereby providing a clear disposal path for the floc from the treatment chamber.

Thirdly, positioning the electrodes at an angle may assist in agglomerating floc. For example, as liquid rises through the treatment chamber, the floc may flow against the electrodes. This means that floc is more concentrated against the electrodes which assist in further agglomeration. In an exemplary embodiment, if the floc includes oil particles, the rising oil particles may be coalesced into larger droplets as a result of partial entrainment by friction beneath the electrodes. This does not generally occur when the plates are in a vertical configuration, and in this exemplary embodiment the dissolved or emulsified oil particles in the liquid may contact the underside of the electrodes where they accumulate and combine with other forming oil particles at the charged interface until such time as a larger (coalesced) droplet forms which then floats to the surface aided by the predominantly diagonal and vertical (but tangential to the droplet) liquid flow.

Each electrode may be of any suitable thickness, for example from 1 mm to 20 mm thick, especially from 1 mm to 10 mm thick, more especially from 1 mm to 5 mm thick, most especially about 3 mm thick. In some embodiments, each electrode is less than 20 mm thick, especially less than 19, 18, 17, 16, 15, 14, 13, 12, 11, 10, 9, 8, 7, 6, 5, 4, 3 or 2 mm thick. In other embodiments, each electrode is greater than 0.5 mm thick, especially greater than 1, 2, 3, 4, 5, 6, 7, 8, 9, 10, 11, 12, 13, 14, 15, 16, 17, 18 or 19 mm thick. In a further embodiment, thickness of the electrode may be a range in which the upper and lower limits are as previously described. In one embodiment, the electrodes are from 1 mm to 10 mm thick, especially about 3 mm thick.

The electrodes may be spaced at any suitable distance. For example, the electrodes may be (especially on average) from 1 mm to 150 mm apart, especially from 1 mm to 100 mm apart or from 1 mm to 50 mm apart, more especially from 1 mm to 10 mm apart. The electrodes may be (especially on average) from 1 mm to 5 mm apart, or from 1.5 mm to 4.5 mm apart; more especially about 3 mm apart. In some embodiments, the electrodes are (especially on average) less than 150 mm apart, especially less than 140, 130, 120, 110, 100, 90, 80, 70, 60, 50, 40, 30, 25, 20, 15, 10, 9, 8, 7, 6, 5, 4 or 3 mm apart. In other embodiments, the electrodes are (especially on average) greater than 1, 2, 3, 4, 5, 6, 7, 8, 9, 10, 15, 20, 25, 30, 40, 50, 60, 70, 80, 90, 100, 110, 120, 130 or 150 mm apart. The electrodes may also be a range apart in which the upper and lower limits are as previously described. When the treatment chamber includes more than 2 electrodes, each electrode may be the same distance apart or different distances apart.

The electrodes may be held apart in any suitable way. For example, the treatment chamber may include guides for holding the electrodes in position. In one embodiment, the guides may be grooves or slots positioned in opposite walls of the treatment chamber. The guides may be made from a high-density, electrically insulating polymeric material, such as HDPE or PVC, or a material as discussed below for the electrode holder.

In one embodiment, the electrodes are from 1 mm to 10 mm thick, more especially from 1 mm to 5 mm thick; and the electrodes are from 1 mm to 10 mm apart, more especially from 1 mm to 5 mm apart. Using thinner electrodes positioned close together enables a greater number of electrodes to be positioned within the treatment chamber. This increases the surface area of the electrodes in contact with the liquid, which may enhance the electrochemical treatment of the liquid.

To improve fluid flow, the electrodes may have a tapered lower edge or edge proximate to the at least one inlet. The lower edge (or edge proximate to the at least one inlet) of the electrodes may be tapered to an angle of about 4, 5, 6, 7, 8, 9, 10, 11, 12, 13, 14, 15, 16, 17, 18, 19 or 20 degrees relative to the longitudinal axis of the electrode. The taper may extend less than 40%, 30%, 20%, 15%, 10%, 9%, 8%, 7%, 6%, 5%, 4% or 3% of the length of the electrode. The lower edge of the electrode or edge proximate to the at least one inlet may be tapered on one or more sides, such as two opposed longitudinal sides, more especially one longitudinal side. If the lower edge of the electrode or edge proximate to the at least one inlet is tapered on more than one side, then the taper on each side may be the same or different.

The apparatus may also include at least one non-conductive element positioned within the treatment chamber. The non-conductive element may alter the electrical field (amperage and voltage) within the treatment chamber. The position, shape and configuration of the non-conductive element may be as described above for the electrodes. However, the non-conductive element is made of a material that does not conduct electricity, such as, for example, a material selected from the group consisting of: a polymer plastic (such as polyvinyl chloride (PVC), high density polyethylene (HDPE), low density polyethylene (LDPE), acrylonitrile butadiene styrene (ABS), polypropylene (PP)); a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix, or a combination of the aforementioned materials. In one embodiment the apparatus does not include any non-conductive elements.

The apparatus may further include at least one electrode holder for holding a plurality of electrodes, especially such that the plurality of electrodes are positioned (especially releasably engaged) within the treatment chamber. The at least one electrode holder may be positionable within the treatment chamber. The treatment chamber may be configured to engage (especially releasably engage) with the at least one electrode holder; especially with at least one electrode holder holding a plurality of electrodes for electrochemical treatment of the liquid. The treatment chamber may include at least one guide for guiding the electrode holder into position. The treatment chamber may include at least one (or a plurality of) grooves for slidable engagement of the electrode holder in the treatment chamber. The treatment chamber may include at least one power connector for connecting power to the electrode holder or to at least one electrode held by the electrode holder. The treatment chamber may include a plurality of power connectors (for example of the same or different polarity) for connecting power to each electrode holder or to electrodes held by the electrode holder.

The treatment chamber may include at least one power connector for connecting power to the electrode holder, to thereby power at least one of the electrodes held by the electrode holder. For each electrode holder, the treatment chamber may include at least one power connector for connecting power to at least one anode in the electrode holder (especially one or two power connectors) and at least one power connector for connecting power to at least one cathode (especially one or two power connectors) in the electrode holder.

In a first exemplary embodiment, the at least one power connector may be located on a wall of the treatment chamber (especially a side wall or the first wall), especially in a groove in which the electrode holder may be slideably engaged. Only one wall of the treatment chamber may include a power connector for each electrode holder. The at least one power connector may be made of a metal, especially bronze.

In a second exemplary embodiment, the treatment chamber includes at least one power connector that is adapted to contact the working face of at least one (for example one or two) electrodes. As used herein, the term "working face" refers to the surface of the electrode that contacts the liquid during the electrochemical treatment. In this embodiment, at least one (especially one or two) power connectors may be positioned adjacent one or more side walls of the treatment chamber, especially one or more side walls parallel to the working face of the electrodes. At least one power connector may be positioned between electrode holders in the treatment chamber. At least one power connector may be positioned intermediate two electrode holders, and the at least one power connector may be positioned intermediate to the working face of a terminal electrode of each electrode holder (in this case, one power connector may power one electrode in each electrode holder. In this case, the at least one power connector may be housed within a power connector housing located intermediate two electrode holders). In this embodiment, the at least one power connector may include a biasing mechanism for biasing the power connector against an electrode. The biasing mechanism may include a compression spring. The at least one power connector may be made of a metal, especially a resilient metal, such as steel, more especially stainless steel, most especially spring steel. Advantageously, the use of a biasing mechanism in the power connector may improve the contact between the electrode and the power connector, assist in holding the electrode holder in place, and avoid the need for screwed connectors when replacing electrode holders. In one embodiment, the power connector may traverse a wall of the treatment chamber (especially a side wall) to provide a tab for connection to a power source (possibly via the current controller, as described further below). The at least one power connector may have or include a corrugated shape.

The treatment chamber may be configured to releasably engage with from 1 to 100 electrode holders, especially from 2 to 50 electrode holders, more especially from 2 to 40, from 2 to 30, from 2 to 20, or from 2 to 10 electrode holders.

Each said electrode holder may include a frame, and the frame may include a handle and at least two side walls. The handles of the electrode holders, once placed in the treatment chamber, may form the lid of the treatment chamber. The electrode holder handles may sealingly abut each other in the treatment chamber. The frame may also include a flow aligner (or a segment of a flow aligner). In one embodiment, the flow aligner is a wall defining a plurality of apertures for passage of the liquid, and wherein the treatment chamber includes a shelf upon which the electrode holder rests when the electrode holder is releasably engaged with the treatment chamber. The frame may be substantially U-shaped, with the base of the "U" forming the handle and the sides of the "U" forming the side walls. Alternatively, the frame may be of substantially square or rectangular-shaped, with two opposite side walls of the square/rectangle forming the side walls of the frame, and the other opposed sides forming a flow aligner and a handle. The electrode holder may be in the form of a cartridge. Accordingly, each said electrode holder (or at least one said electrode holder) may include a flow aligner, as described above. The flow aligner may be positioned between the electrodes and the at least one inlet. The electrode holder handle may include an electrode holder remover (such as a strap (or strap loop), especially a cable, string or thread) to assist in removing the electrode holder from the treatment chamber.

The electrode holder, especially the at least two side walls of the electrode holder may be configured to releasably engage with the treatment chamber. The electrode holder may be engageable with the treatment chamber (especially such that the plurality of electrodes are positioned or releasably engaged within the treatment chamber). The electrode holder (especially the at least two side walls) may be slideably engageable with the treatment chamber. The electrode holder (especially the at least two side walls) may be releasably engageable in the treatment chamber by friction, by a clamp, or by another suitable fastener. In another embodiment, the treatment chamber may include a shelf upon which the electrode holder rests when in position.

In one embodiment, the treatment chamber or the electrode holder may include a clamp for releasably clamping the electrode holder in position. The electrode holder (especially at least one of the at least two side walls or the side of the holder proximate to the first wall of the treatment chamber) may be configured to accept power, especially from a wall of the treatment chamber. The electrode holder (especially at least one of the at least two side walls) may be configured to supply power along a longitudinal edge of at least one electrode held by the electrode holder. The treatment chamber may also be configured to provide power longitudinally along the working face of at least one electrode. Providing power along a longitudinal edge of at least one electrode, or longitudinally along the working face of at least one electrode, may provide superior flow of power than if power was only supplied to the at least one electrode at a single point.

The electrode holder may include a power connector for connecting with a power connector from the treatment chamber. If present, power connectors in the electrode holder and the treatment chamber may connect in any suitable way. For example, the two power connectors may connect by way of abutting surfaces or projections, or by way of a male-female connection.

The electrode holder may hold a plurality of electrodes. The electrodes within the electrode holder may be replaceable and/or removable. In one embodiment, the electrodes within the electrode holder may not be replaceable and/or removable. The electrode holder may include slots machined to enable the electrodes to slide in and out of the electrode holder as required. This may enable replacement of the electrodes within the electrode holder whilst the apparatus is in operation. The electrodes, properties of the electrodes, orientation of the electrodes, and the relationship between two electrodes (e.g. the distance between electrodes) in the electrode holder may be as described above. For the avoidance of doubt, the electrode holder may also include at least one non-conductive element. Therefore, the electrode holder may hold one or more electrodes and one or more non-conductive elements.

Any suitable number of electrodes may be held by the electrode holder. In one embodiment, the electrode holder may hold from 3 to 100 electrodes; especially from 3 to 50 electrodes; more especially from 3 to 25 electrodes; most especially from 5 to 15 electrodes or from 8 to 15 electrodes, about 10 electrodes or about 13 electrodes. In one embodiment, the electrode holder holds at least 3, 4, 5, 6, 7, 8, 9 or 10 electrodes. In another embodiment, the electrode holder holds less than 100, 90, 80, 70, 80, 70, 60, 50, 40, 30, 20 or 15 electrodes.

The electrode holder or the electrodes within the electrode holder may be positionable within the treatment chamber at any suitable angle. The orientation of the electrode holder may be as described above for the angle of electrodes within the treatment chamber.

In one embodiment, the electrode holder may be positionable substantially vertically within the treatment chamber. This may be particularly advantageous if the liquid substantially ascends through the treatment chamber. In this embodiment, the electrodes may be held substantially vertically by the electrode holder, or the electrodes may be held at an angle from the vertical by the electrode holder. In another embodiment, the electrode holder is positionable at an angle within the treatment chamber.

The electrodes within the electrode holder may be positionable in the same plane as the electrode holder, or the electrodes may be positionable at an angle relative to the longitudinal plane of the electrode holder. For example, the electrodes may be positionable at an angle of from 0-20 degrees from the longitudinal plane of the electrode holder, more especially from 0-15 degrees or from 0-10 degrees, most especially from 0-5 degrees or 0-3 degrees or 0 degrees from the longitudinal plane of the electrode holder.

The electrode holder advantageously may allow for the easy and rapid exchange of electrodes in the apparatus. The electrode holder may overcome the delays inherent in changing individual electrodes within the reaction chamber and may be particularly advantageous in areas of low head height.

The frame of the electrode holder may be made of any suitable material, but especially may be made of a non-conductive material. The frame of the electrode holder may be made of the materials discussed above for the treatment chamber. The frame of the electrode holder may be especially made from a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; or a polymer plastic such as high density polyethylene (HDPE), polyethylene (PE), polyethylene terephthalate (PET) or polyvinyl chloride (PVC); a phenolic polymer plastic; or a carbon fibre insulated using a polymer plastic or a composite material.

The electrode holder may be removable from the treatment chamber by way of a removal device (especially a lifting device which lifts the electrode holder from the treatment chamber). In one example, the lifting device may lift the electrode holder substantially vertically before allowing for horizontal movement of the electrode holder above the apparatus. The lifting device may be slideably mounted on at least one (especially two) rails. In one embodiment, the electrode holder may be removable using an overhead gantry.

The apparatus may further include a liquid pump for pumping liquid to be treated through the at least one inlet for entry of a liquid to be treated, and/or at least one treatment agent pump (which may be a liquid pump and/or a gas pump) for pumping the treatment agent through the at least one treatment inlet. Said pump may be a variable speed pump. Any suitable pump may be used. For example, the gas pump may be an entrained air pump or a centrifugal, diaphragm, peristaltic, geared or similar pump. A liquid pump may or may not be necessary, depending on the pressure of the liquid delivered to the treatment chamber. However, a liquid pump, particularly a geared or diaphragm pump, may be advantageous as this may permit greater control over the liquid flow rates within the treatment chamber.

The apparatus may further include one or more sensors for sensing: flow velocity through the treatment chamber; volume of liquid in the treatment chamber (including the liquid height, especially when the liquid substantially ascends through the treatment chamber); formation of products in the treatment chamber or exiting the treatment chamber (including gases, especially explosive gases); presence of contaminants in the treatment chamber or exiting the treatment chamber; passivating accumulations on one or more electrodes; and the conductivity of the liquid in the treatment chamber.

In one embodiment, the apparatus includes a system for regulating the electrochemical treatment. The system may be automated and include one or more sensors as outlined in the preceding paragraph and one or more devices for regulating the electrochemical treatment, wherein the one or more devices are in communication with the one or more sensors to thereby automate the treatment. The system may be controlled by a controller (such as a programmable logic controller (PLC)). The one or more devices may include at least one selected from the group consisting of: a pump (especially a variable speed pump) for regulating the flow of liquid into the treatment chamber; a current controller for controlling the electrical current to the electrodes (especially for controlling the polarity of the current and its reversal to thereby provide cathodes and anodes, and/or the voltage of the current); treatment enhancer applicator for applying a treatment enhancer to the treatment chamber (for example, an electromagnetic radiation source or a sonic generator); a valve for draining the treatment chamber (and optionally a pump in fluid communication with the valve); a treatment agent applicator for applying one or more treatment agents to the treatment chamber (this may include a treatment agent pump); fluid jets (including liquid and gas jets) for reducing passivating accumulations on the electrodes (the fluid jets may be high-pressure fluid jets); an electrode holder remover and inserter; and an electrode plate remover and inserter.

As outlined above, the current controller may control the polarity of the current and its reversal to thereby provide cathodes and anodes. In one embodiment the polarity of the electrodes is reversed during the electrochemical treatment. Any suitable electrical current may be applied to the plurality of electrodes. The polarity of the electrodes may advantageously be alternated to thereby reduce passivating accumulations on the electrodes and create a reversible electrical field within the treatment chamber. The polarity switching of the electrodes may allow specific chemical reactions to be delayed or accelerated as required. During the electrochemical treatment the anodes typically are sacrificial and gradually reduce in size. In contrast the cathodes typically undergo passivation and accumulate matter on their surfaces. By regularly reversing the polarity of the current flowing to the electrodes the same electrode will successively function as a cathode and an anode. In this way the passivating surface of the cathode becomes the eroding surface of the anode, which reduces passivating accumulations on the electrode and slows the reduction in size of the electrode. In one embodiment, the current source applied to the apparatus is direct current, but due to the alternating polarity of the current by the current controller, the current applied to the electrodes is alternating current. In other words, the current applied to the plurality of electrodes may be a direct current of adjustable frequency of alternation. The current controller may also modify the sinewave ramping angles during the electrochemical treatment, and/or modify the rate of current application to the electrodes during the electrochemical treatment.

Accordingly, the current controller may control the frequency of current reversal to the electrodes. The current controller may also control the relative proportion of cathodes and anodes in the electrochemical apparatus. Control of the relative proportion and hence surface area of cathodes and anodes may be advantageous, as this will alter the chemistry of the electrochemical treatment. For example, if the total surface area of the anodes exceeds (especially by a significant degree) the surface area of the cathodes then an oxidising environment is created within the treatment chamber. Alternatively, if the total surface area of the cathodes exceeds (especially by a significant degree) the surface area of the anodes, then a reducing environment is created within the treatment chamber. The electrical current controller may apply a voltage to the treatment chamber to apply an effective voltage to each cell of from 0.1 to 50 V; especially from 0.1 to 40 V, from 0.5 to 30 V, or from 0.5 to 20 V; more especially from 1 to 10 V or from 1 to 5 V or from 2 to 4 V; most especially about 2-3 V or about 3 V (the "effective voltage to each cell" is the voltage between two adjacent electrodes in the treatment chamber).

The inventors have found that the effective voltage to each cell may be adjusted by adjusting the voltage applied to the electrodes by the electrical current controller, by adjusting the number of electrodes connected to an electrical current, by positioning a non-conductive element within the treatment chamber, and/or by altering the number of electrodes in the treatment chamber (for example using an electrode holder remover and inserter, and/or an electrode plate remover and inserter). The electrical current may be provided by a voltage source. In one embodiment, the apparatus further includes a voltage source. The conductivity of the liquid in the treatment chamber may vary, and this conductivity may affect the extent and type of reactions occurring in the treatment chamber during the electrochemical treatment. For example, the electrochemical treatment may provide the same (or similar) effect when treating a highly conductive liquid with fewer electrodes, as when treating a poorly conductive liquid with a greater number of electrodes. A sensor for sensing the conductivity of the liquid in the treatment chamber may be in communication (such as via a PLC) with the current controller, an electrode holder remover and inserter, and/or an electrode plate remover and inserter to thereby control the effective voltage to each cell (this may occur in an automated manner).

In another aspect, the present disclosure relates to an electrode holder for an electrochemical liquid treatment apparatus, wherein the electrode holder is configured for holding a plurality of electrodes and to engage (especially releasably engage) with an electrochemical treatment chamber (especially the treatment chamber of the apparatus of the ninth aspect of the present disclosure). In one embodiment of this aspect, the present disclosure provides an electrode holder for an electrochemical liquid treatment apparatus, the electrode holder holding a plurality of electrodes and being configured to releasably engage with a treatment chamber of the electrochemical liquid treatment apparatus, wherein said electrode holder includes a flow aligner for aligning the flow of the liquid between the electrodes. In one embodiment, the flow aligner is for distributing the liquid between the electrodes. In another embodiment, the flow aligner is a wall defining a plurality of apertures for passage of the liquid.

The electrode holder may include a plurality of electrodes. The electrode holder may be in the form of a cartridge. The electrode holder may be slideably engageable with the treatment chamber. The electrode holder may be configured to accept power from a wall of the treatment chamber. The electrode holder may be configured to supply power along a longitudinal edge of at least one electrode held by the electrode holder. The electrode holder may be configured so that power is applied to the working face of at least one electrode in the electrode holder. Features of the electrode holder of this aspect of the present disclosure may be as described for the electrode holder above.

The electrode holder may further include a flow aligner, for aligning the flow of the liquid between the electrodes or distributing the flow of liquid between the electrodes. The flow aligner may be as described above. The flow aligner may be in the form of at least one (especially a plurality of) baffles or baffle walls extending beneath the electrodes. The at least one baffle or baffle wall may extend substantially vertically beneath the electrodes. The at least one baffle or baffle wall may extend along substantially the same longitudinal axis as the electrodes. The at least one baffle or baffle wall may be positioned transversely or substantially perpendicularly to the electrodes. The flow aligner may also be a wall or partition defining a plurality of apertures for passage of the liquid.

The electrode holder or the electrodes within the electrode holder may be positionable within the treatment chamber at any suitable angle, especially at an angle of from 10 to 30 degrees from the vertical, more especially at an angle of 10 to 15 degrees or about 15 degrees from the vertical. The electrodes within the electrode holder may be from 1 mm to 10 mm apart, especially about 3 mm apart. The electrodes within the electrode holder may be replaceable and/or removable. Features of the electrodes in the electrode holder may be as defined for the electrodes described above.

In another aspect the present disclosure relates to an electrochemical liquid treatment apparatus, the apparatus including a treatment chamber including at least one inlet for entry of a liquid to be treated, and at least one outlet for exit of electrochemically treated liquid, wherein the treatment chamber is configured to accommodate a plurality of electrodes. In one embodiment of this aspect, the apparatus further includes a plurality of electrodes positioned within the treatment chamber for electrochemical treatment of the liquid. The plurality of electrodes may be removable from the treatment chamber. Features of this aspect of the present disclosure may be as described above.

In one embodiment, there is provided an electrochemical liquid treatment apparatus, the apparatus including a treatment chamber containing at least one inlet for entry of a liquid to be treated, and including at least one outlet for exit of electrochemically treated liquid, wherein the treatment chamber is configured to releasably engage with at least one electrode holder holding a plurality of electrodes for electrolytic treatment of the liquid, wherein said electrode holder includes a flow aligner for aligning the flow of the liquid between the electrodes, and wherein when the electrode holder is releasably engaged with the treatment chamber said flow aligner is positioned intermediate the at least one inlet and the electrodes.

In a further aspect, the present disclosure relates to a method of electrochemically treating a liquid, the method including the steps of:

introducing a liquid to be treated into the electrochemical fluid treatment apparatus;

applying a voltage to at least two of the plurality of electrodes to provide at least one cathode and at least one anode to thereby electrochemically treat the liquid; and removing electrochemically treated liquid from the apparatus.

The method of this aspect may also include the step of generating floc as the liquid is electrochemically treated, and removing floc from the apparatus. The method may also include the step of introducing at least one treatment agent into the apparatus (for example a treatment agent as described above), especially in which the treatment agent is a gas or an oxidant or reductant. The method may also include the step of applying a treatment enhancer to the treatment chamber. In a further embodiment, the method includes the step of reversing the polarity of the at least one cathode and the at least one anode during the electrochemical treatment. The method of this aspect may be a method of electrolytically treating a liquid. The aspects of the disclosure defined above (relating to methods of treating fluid mixture, or to method of electrochemically treating an aqueous solution) may include features of method of the aspect of the present disclosure discussed in this paragraph and the preceding paragraph. Further features of the aspect of the present disclosure described in this paragraph and the preceding paragraph may be as described above (especially in relation to the features of the apparatus of the present disclosure).

In one embodiment, the present disclosure relates to a method of electrochemically treating a liquid, the method including the steps of:

(i) introducing the liquid into an electrochemical treatment apparatus, the apparatus including a treatment chamber including at least one inlet for entry of a liquid to be treated, and at least one outlet for exit of electrochemically treated liquid, and a plurality of electrodes positioned within the treatment chamber for electrochemical treatment of the liquid;

(ii) introducing at least one treatment agent into the apparatus;

(iii) applying a voltage to at least two of said plurality of electrodes to provide at least one cathode and at least one anode to thereby electrochemically treat the liquid; and (iv) removing electrochemically treated liquid from the apparatus.

In a further aspect, the present disclosure relates to a method of inserting or removing an electrode holder holding a plurality of electrodes (as provided herein) into the apparatus (as provided herein).

BRIEF DESCRIPTION OF DRAWINGS

Examples of the invention will now be described by way of example with reference to the accompanying figures, in which:

FIG. 13 is a top view of the electrochemical/electrolytic liquid treatment apparatus in the system of FIGS. 11 and 12;

FIG. 14 is a side view of the electrochemical/electrolytic liquid treatment apparatus of FIG. 13;

FIG. 15 is a perspective view of the electrochemical/electrolytic liquid treatment apparatus of FIG. 13;

FIG. 20 is a perspective view of a fourth example electrochemical/electrolytic liquid treatment apparatus;

FIG. 21 is cross sectional view of the apparatus of FIG. 20, through the liquid entry point and defoaming chamber outlet;

FIG. 23 is a perspective view of the electrode holder in the apparatus of FIG. 20;

FIG. 24 is a bottom perspective view of the electrode holder of FIG. 23;

FIG. 25 is a cross sectional view through the electrode holder of FIG. 23;

FIG. 29 is a perspective view of the apparatus of FIG. 20 with the electrode holder partly removed; and FIG. 30 is a cross sectional view through the treatment chamber and electrode holder of FIG. 20 with the electrode holder partly removed;

Figure 1:
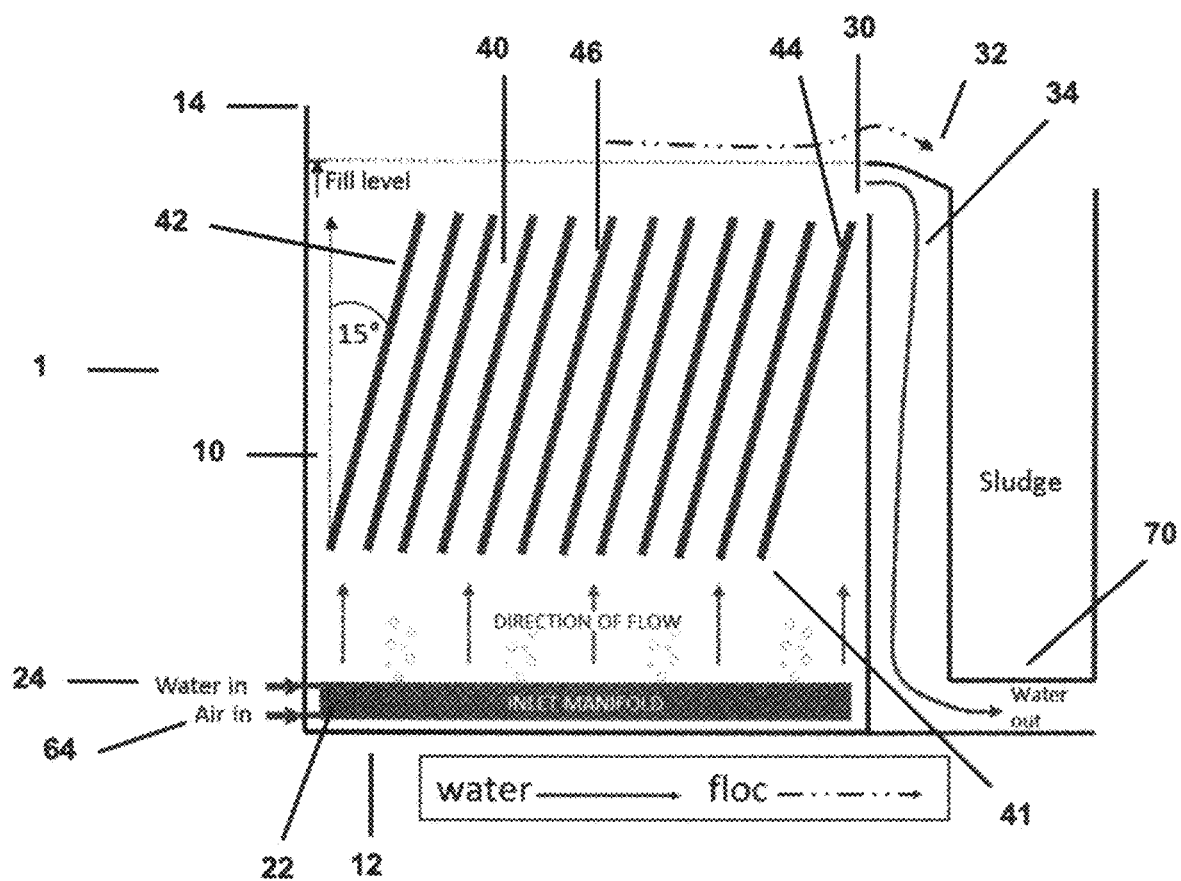
FIG. 1 is a side view of a first example electrochemical liquid treatment apparatus.

Preferred features, embodiments and variations of the invention may be discerned from the following Description which provides sufficient information for those skilled in the art to perform the invention. The following Description is not to be regarded as limiting the scope of the preceding Summary of the Invention in any way.

DESCRIPTION OF EMBODIMENTS

Embodiments of the invention will now be described with reference to FIGS. 1 to 38. In the figures, like reference numerals refer to like features.

Figure 34:
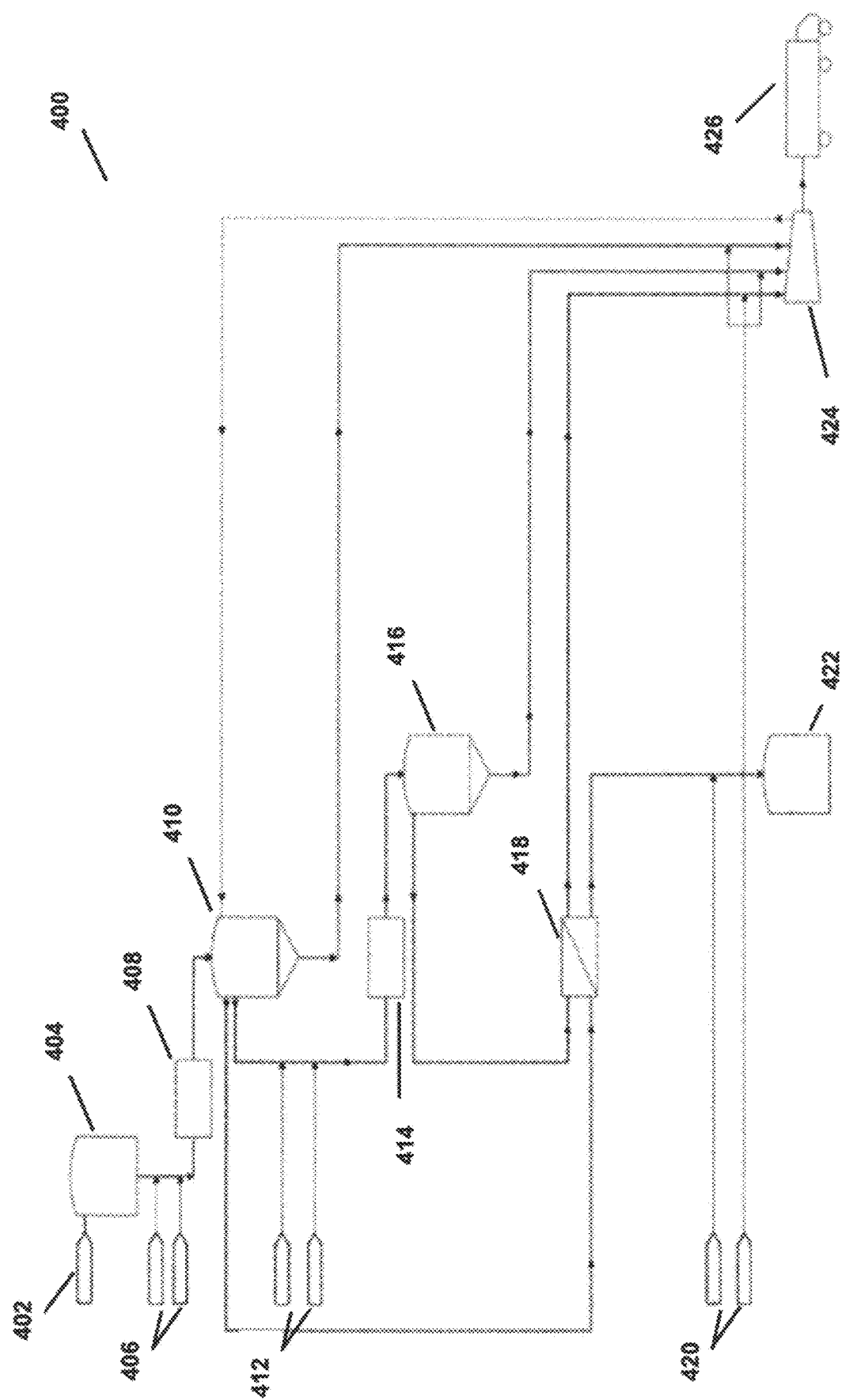
FIG. 34 is a process flow diagram for liquid to be treated.

FIG. 34 provides an exemplary process flow diagram. In this figure, a fluid mixture enters fluid treatment plant or system 400 at 402. The fluid mixture may first enter fluid storage 404. In the fluid storage 404 the composition of the fluid may be assessed, which may affect how the fluid is to be treated. The fluid mixture then exits fluid storage 404, treatment agents are added 406, and the fluid mixture is subjected to the first electrochemical treatment step at first electrochemical treatment apparatus 408. If the fluid is frac flow-back water, at this step the hydrophobic phase is separated from the aqueous phase, and cross-linking agents are decomposed.

After the first electrochemical treatment step is complete, the fluid flows to a first clarifier 410. Solid residue from the first clarifier 410 then flows to a dewatering apparatus 424. Hydrophobic matter from the first clarifier 410 may be removed (not shown in FIG. 34). Supernatant from the first clarifier 410 exits the clarifier 410, treatment agents are added 412, and the supernatant is subjected to the second electrochemical treatment step at second electrochemical treatment apparatus 414. If the original fluid was frac flow-back water, the second electrochemical treatment step may allow removal of aqueous contaminants from the aqueous solution.

After the second electrochemical treatment step, the aqueous solution flows to a second clarifier 416. Solid residue from the second clarifier 416 flows to the dewatering apparatus 424, whereas supernatant is filtered at filters 418. If desired, the supernatant from the first clarifier 410 may flow directly to the filters 418. Further treatment agents or additives may be added to the retentate and permeate from the filters 420, and permeate from the filters 418 may flow to a further fluid storage 422 for disposal, and retentate from the filters 418 may flow to dewatering apparatus 424. The solid residue is dewatered at the dewatering apparatus 424, after which the dewatered solid residue is transported away for disposal 426.

If desired, the plant or system 400 may be configured to allow the two electrochemical treatment apparatuses 408 and 414 to operate in parallel rather than in series. If these apparatuses 408 and 414 operate in parallel (which may be advantageous for produced water, for example), then both apparatuses 408 and 414 may be for performing the first electrochemical treatment step or the second electrochemical treatment step. Similarly, various steps in the method or components of the plant or system 400 may be omitted, including first clarifier 410, second clarifier 416, filters 418 and fluid storages 404 and 422.

Figure 35:
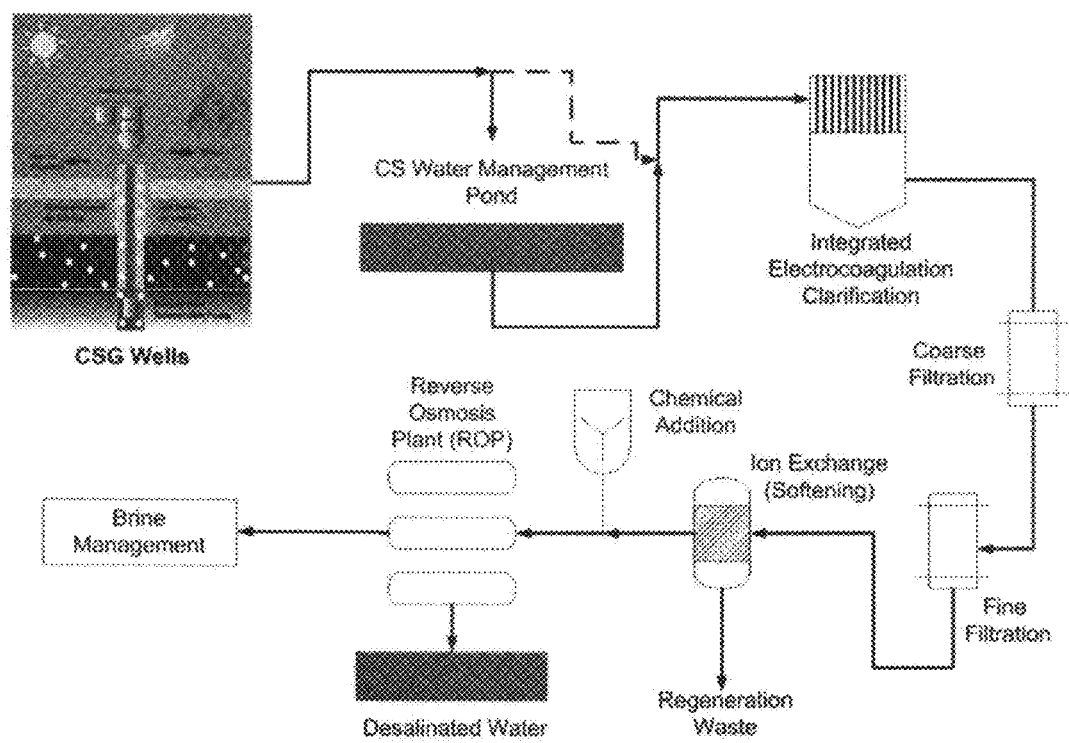
FIG. 35 is a further process flow diagram for treatment of produced water from a coal seam gas well.

A further process is illustrated in FIG. 35. This process is intended for treatment of produced water from a coal seam gas well. As shown in the figure, produced water from the well first flows to a coal seam water management pond. Next, the produced water flows to an electrochemical treatment apparatus (in which the first or second electrochemical treatment step occurs), after which it is clarified. The electrochemically treated liquid is then subjected to coarse and then fine filtration before being subjected to filtration through an ion exchange media. The filtered liquid then flows to a reverse osmosis plant where is it filtered to produce desalinated water.

Exemplary electrochemical apparatuses and systems which may be used in any of the electrochemical treatment steps as described above are now discussed with reference to FIGS. 1 to 33. For the avoidance of doubt, the various treatment agents and treatment conditions discussed below may be applied to the first and second electrochemical treatment steps described above (where appropriate).

FIGS. 1 to 7 illustrate three different electrochemical fluid or liquid treatment apparatuses 1. Each apparatus 1 includes a treatment chamber 10 having at least one inlet 20 for entry of a fluid or liquid to be treated and at least one outlet 30 for exit of electrochemically treated fluid or liquid. Positioned within the treatment chamber 10 are a plurality of electrodes 40. The plurality of electrodes include at least one cathode 42 and at least one anode 44.

In an electrochemical (especially electrocoagulation) process, a fluid being treated flows past an electric field generated between an anode 44 and a cathode 42. Metal ions may be generated at the anode 44, along with production of hydroxyl ions (or radicals) and possibly sulfate ions (or radicals) at the cathode 42. Gases may also be formed, such as hydrogen gas. These ionic species (and gases) may result in chemical modification of contaminants in the liquid (such as through oxidation), as well as destabilisation of electrical charges holding contaminants in the liquid (i.e. reduction of the net surface charge of the contaminants, which thereby reduces repulsive charges). This latter effect may allow the contaminant particles to move closer together and allow aggregation (through, for example, van der Waals forces), and aggregation may also be aided by the presence of gelatinous polymeric metal hydroxides in the solution.

The apparatus 1 of the present disclosure may be used (or be configured) to remove, immobilise, oxidise or reduce contaminants in or from a liquid. Contaminants may be selected from one or more of the group consisting of: metals (including transition and heavy metals), salts, solids, pathogens (including bacteria, protozoa, viruses and other organisms including algae), amphoteric species, colloids (organic and inorganic), suspended solids, organic chemicals, oils (such as in droplet and emulsified forms), refractory organics and various other undesirable substances. The contaminants are typically removed from the liquid in the floc. The contaminants may also include an aqueous contaminant, as described above.

As used herein, the term "floc" relates to any coagulated, precipitated matter or sludge (which, for example, may be solid or gelatinous in form, or may be or include oils) produced during the electrochemical treatment. The process of electrochemical treatment to form the floc causes impurities in the liquid (especially water) to be easily removable or separable from the floc.

The application of an electrical field between the electrodes 40 (between the at least one cathode 42 and the at least one anode 44) in the treatment chamber 10 may result in the creation of highly charged polymeric metal hydroxide species (these are typically created at the at least one anode 44). These species typically neutralise the electrostatic charges on contaminants in the liquid (such as suspended solids or oil droplets) and facilitate their coagulation or agglomeration and resultant separation from the liquid. In prior art apparatuses, electrochemical treatment typically results in the precipitation of certain metals, salts and amphoteric species as coagulated particles within the apparatus and especially on the surface of the electrodes 40. This surface fouling or passivation of the electrodes 40 is a significant disadvantage of prior art apparatuses.

In one embodiment, the liquid rises (or ascends) as it travels through the treatment chamber 10. In a further embodiment, the liquid obliquely rises as it travels through the treatment chamber 10.

The treatment chamber 10 may be of any suitable shape. In FIGS. 1, 3 to 5 and 7, the treatment chamber 10 has a square cross-section, but the chamber 10 also may be, for example, of circular, ovoid, elliptical, polygonal or rectangular cross-section. The treatment chamber 10 typically has a base 12, a top or lid 14 and one or more side walls. In one embodiment, the treatment chamber 10 may be cylindrical, especially a pipe.

The base 12 of the treatment chamber 10 illustrated in FIGS. 1, 3 to 5 and 7 is flat or planar, but the base 12 may also be of any suitable shape, for example to accommodate other components of a liquid (or fluid) treatment system. Similarly, the top 14 of the treatment chamber 10 illustrated in FIGS. 1, 3 to 5 and 7 is open, but the treatment chamber 10 may be fully or partially closed or be closable with a lid. If the chamber 10 is closed or closable, then the top 14 or lid of the chamber 10 may include a vent or other outlet for exit of gases which evolve during the electrocoagulation process. In a further embodiment, the top 14 of the treatment chamber 10 is of the same dimensions as the base 12.

The treatment chamber 10 may be of any suitable size. In one embodiment, the treatment chamber 10 accommodates from 125 kL to 500 kL of liquid, especially about 250 kL. The apparatus 1 may be configured for a liquid flow rate of at least 10 L/s, especially about 23 L/s. The residence time of the liquid in the treatment chamber 10 may be less than 2 minutes, especially about 30 seconds.

Figure 2:
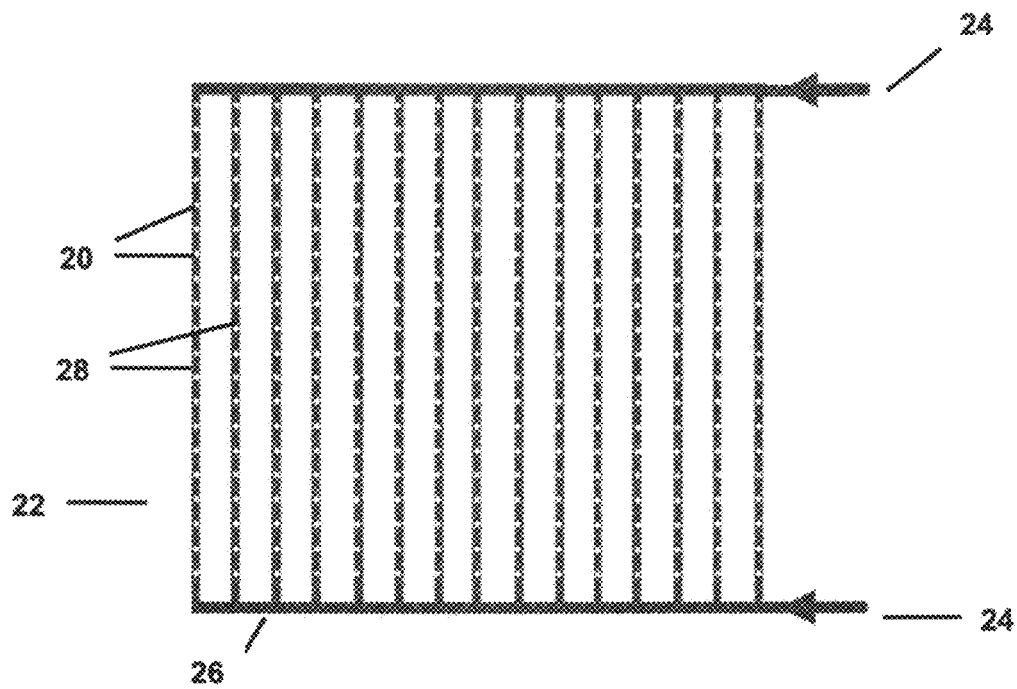
FIG. 2 is a top view of a liquid disperser for use in the first example apparatus.

An exemplary disperser 22 is illustrated in FIG. 2 (in the form of a liquid manifold). In this disperser there are two liquid (or fluid) entry points 24 in fluid communication with two longitudinal liquid passageways 26. Between the two longitudinal liquid passageways 26 extend a plurality of transverse liquid passageways 28. Each of the transverse liquid passageways include a plurality of inlets 20. In an alternative exemplary embodiment, the disperser may include one liquid entry point 24 in fluid communication with one transverse liquid passageway 28. A plurality of longitudinal liquid passageways 26 may then be in fluid communication with, and extend from the transverse liquid passageway 28. Each longitudinal liquid passageway 26 may include a plurality of inlets 20 to the treatment chamber 10. There may be one, two, three, four, five, six, seven, eight, nine, ten or more than ten longitudinal liquid passageways 26 and/or transverse liquid passageways 28.

The disperser 22 may further include a diffuser, for evenly distributing the liquid exiting the disperser 22. A diffuser may further improve the movement of the liquid to be treated into the treatment chamber 10. For example, when a liquid enters the disperser the pressure may be higher at the liquid entry point 24 than at a position on the disperser 22 furthest from the liquid entry point 24. To counter this, one solution may be to vary the size of the inlet 20 openings, so that the inlet 20 openings are larger at the liquid entry point 24 end of the disperser 22, and the inlet 20 openings are smaller at the position on the disperser 22 furthest from the liquid entry point 24.

The at least one inlet 20 and/or disperser 22 may be positioned at any suitable point or points in the treatment chamber 10. In FIGS. 1, 3, 4 and 7 the at least one inlet 20 and/or disperser 22 is positioned beneath the electrodes 40, especially so that the liquid substantially rises as it travels through the treatment chamber 10. In one embodiment, the disperser 22 is integral with the base 12 of the treatment chamber 10. In another embodiment, the disperser 22 is removable from the treatment chamber 10.

At least one treatment agent may be used to assist in the treatment of the liquid. The at least one treatment agent may be a fluid (including a gas or a liquid) or a solid. The at least one treatment agent may be an oxidant or reductant.

The at least one treatment agent may be for reaction with certain contaminants in the liquid to be treated, may be used to adjust the properties of the liquid being treated (for example to adjust the pH of the liquid), or may be for adjusting the properties of the floc (for example the agglomeration, viscosity or flowability of the floc).

The at least one treatment agent may be a gas (which may be inert, an oxidant or a reductant, for example). The gas may be advantageously used to improve or increase the liquid flow velocity between the electrodes and/or to increase or improve the reaction of components within the liquid. The gas may, in particular, create favourable conditions at the face of the electrodes 40 wherein reduction or oxidation processes can be better controlled by the presence of gaseous reactants, which can include either reactive or inert gaseous reactants.

Increasing the liquid flow velocity between the electrodes 40 may be advantageous for several reasons. First, increased liquid flow velocity between the electrodes 40 may reduce the accumulation of dangerous gases, such as hydrogen, chlorine and hydrogen sulfide at the electrodes 40. Although such gases are typically formed in the electrocoagulation process, in the absence of high current densities the formation rate of such gases is usually so low that poor clearance of these gases occurs. The addition of a buoyant gas to the treatment chamber 10 improves the clearance of such dangerous gases.

A second and related advantage of increasing the liquid flow velocity between the electrodes 40 is that passivation of the at least one cathode 42 may be reduced, as higher liquid flow rates decreases the potential for material build-up (such as floc) on the at least one cathode 42.

A third advantage of increasing the liquid flow velocity between the electrodes 40 is that the liquid is more likely to push any floc (including, for example, coalescing oil droplets) being formed to the top 14 of the treatment chamber 10, where the floc may be efficiently removed or recovered for further processing or sale. This prevents the floc from settling on the base 12 of the treatment chamber 10.

The gas introduced to the treatment chamber 10 may also be used to contribute to chemical reactions occurring within the treatment chamber 10, allowing for the formation of additional compounds to assist in treatment or purification of the liquid. For example, and as discussed above, the gas selected may be used as an oxidant or a reductant. Specific types of gases may be selected for removal of targeted ionic species.

Examples of gases that may be used in the apparatus 1 include one or more of the group consisting of: air, hydrogen, oxygen, ozone, carbon monoxide, carbon dioxide, sulphur dioxide, hydrogen sulfide, nitrogen, chlorine, fluorine, chlorine dioxide, ammonia, or a combination thereof; especially hydrogen, hydrogen sulfide, ozone, chlorine, carbon monoxide, air, carbon dioxide, or a combination thereof; more especially air, carbon dioxide, hydrogen sulfide, ozone, hydrogen, carbon monoxide, or a combination thereof. The gas may be especially known for its ability to display enhanced reactivity in an electric field with ionic species present in such water and wastewater systems. The gas may be a buoyant gas.

A plurality of treatment agents may enter the treatment chamber 10, such as an inert gas and an oxidant or reductant.

The at least one treatment agent may be introduced into the treatment chamber 10 in any suitable way. For example, if the treatment agent is a solid, the solid may be added directly to the treatment chamber 10, such as by dropping the solid into the treatment chamber 10 at the top 14 of the treatment chamber 10. In another example, the at least one treatment agent (which may be a solid, liquid or gas) may be mixed with the liquid to be treated before the liquid enters the treatment chamber. If the at least one treatment agent is a solid, the solid treatment agent may be dissolved in the liquid to be treated, or a suspension or colloid may be formed. If the at least one treatment agent is a gas, the gas treatment agent may be added to, or dissolved within, the liquid to be treated (for example this may be achieved under pressure). The added gas may form microbubbles in the treatment chamber 10 (for example in suspension as the pressure is progressively reduced), and these microbubbles may rise through the treatment chamber 10. As the microbubbles contact the electrodes 40, turbulent mixing conditions may be provided, along with a reducing or oxidative environment as required. The microbubbles may entrain materials forming at the electrodes 40 so as to keep the electrodes 40 clear of reaction products or may for example provide gases for reductive or oxidative processes at the face or reactive surface of the electrodes 40. In one embodiment, the apparatus 1 includes a mixer in fluid communication with the at least one inlet for a liquid to be treated 20, wherein the mixer is for mixing at least one treatment agent (which may be a liquid, gas or solid) with the liquid to be treated, before the liquid to be treated passes through the at least one inlet 20.

If the at least one treatment agent is a solid or a fluid, the at least one treatment agent may enter the treatment chamber 10 through at least one treatment inlet for entry to the treatment chamber 10 of the at least one treatment agent. Therefore, the treatment chamber 10 may further include at least one treatment inlet for entry of a treatment agent for assisting in the treatment of the liquid. The treatment chamber 10 may include at least one treatment inlet (or a plurality of treatment inlets in fluid communication with each other) for each or each mixture of treatment agents. Advantageously, the at least one treatment inlet may allow for further control over the rate of addition or concentration of the at least one treatment agent within the treatment chamber 10 (and if the at least one treatment agent is an oxidant or reductant, for example, the at least one treatment inlet may allow control over the rate at which electrochemical oxidation or reduction reactions may occur). The at least one treatment agent may, for example, be mixed with a liquid (such as a portion of the liquid to be treated) before it passes through the at least one treatment inlet. The at least one treatment agent may be mixed with the liquid as discussed in the previous paragraph before it passes through the at least one treatment inlet.

In one embodiment, the at least one treatment inlet is a plurality of treatment inlets for dispersing the treatment agent into the treatment chamber 10, especially for evenly dispersing the treatment agent throughout the treatment chamber 10. The treatment chamber 10 may include at least 10 treatment inlets, especially at least 15 inlets, more especially at least 20 inlets, and most especially at least 30 inlets.

Advantageously, by using a plurality of inlets for entry of a treatment agent, the treatment agent may evenly enter the treatment chamber 10. This may permit a consistent concentration and/or distribution of the treatment agent in the liquid below the electrodes 40 or in the liquid before the treatment agent is proximate to the electrodes 40, which in turn may allow for improved reaction of the liquid to be treated. When the treatment agent is a gas, a plurality of inlets for a gas treatment agent may improve even fluid flow throughout the treatment chamber 10 and may maximise efficient contact between the electrodes 40 positioned within the treatment chamber 10 and the liquid being treated. A plurality of inlets for a gas treatment agent may also improve the distribution of the gas within the liquid being treated, which in turn may improve the effect of the gas in chemical/electrochemical reactions within the treatment chamber 10 (for example, when the gas is an oxidant or reductant, the performance of the apparatus 1 in treatment, separation or recovery of contaminants may be improved).

The at least one treatment inlet may be at least one fluid treatment inlet (the fluid may include gases and liquids, and for example, the liquids may include suspended solids). For avoidance of doubt, the term "fluid treatment inlet" does not mean that the treatment agent is in fluid form (although it may be), only that a fluid at least including the treatment agent passes through the fluid treatment inlet. The at least one fluid treatment inlet may be in the form of a fluid treatment disperser. The at least one fluid treatment inlet may be at least one liquid treatment inlet (again, the term "liquid treatment inlet" means that a liquid at least including the treatment agent passes through the liquid treatment inlet). The at least one liquid treatment inlet may be in the form of a liquid treatment disperser. The liquid treatment disperser may be as described above for the liquid disperser.

The at least one treatment inlet may be an inlet for a gas treatment agent (i.e. a gas inlet 60). The treatment chamber 10 may include a gas disperser 62, especially in the form of a gas manifold, the gas disperser 62 having a plurality of gas inlets 60 to the treatment chamber 10.

Figure 6:
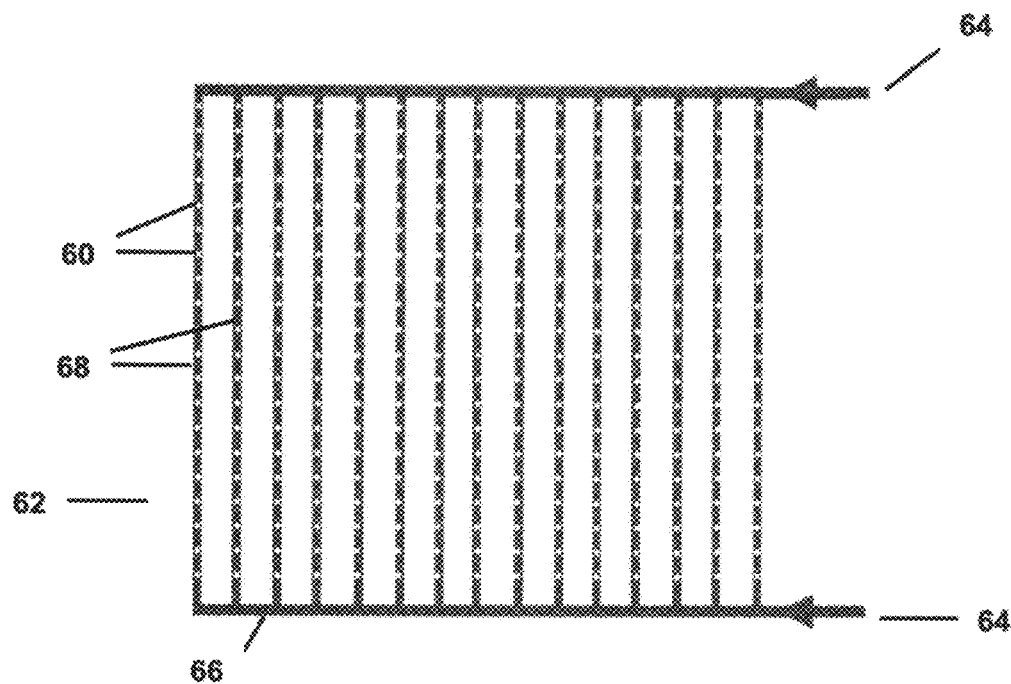
FIG. 6 is a top view of a gas disperser for use in the first example apparatus.

An exemplary gas disperser 62 is illustrated in FIG. 6, in the form of a gas manifold. In this disperser there are two gas entry points 64 in gaseous communication with two longitudinal gas passageways 66. Between the two longitudinal gas passageways 66 extend a plurality of transverse gas passageways 68. At least one or each of the transverse gas passageways include a plurality of gas inlets 60. In an alternative exemplary embodiment, the gas disperser 62 may include one gas entry point 64 in gaseous communication with one transverse gas passageway 68. A plurality of longitudinal gas passageways 66 may then be in gaseous communication with, and extend from the transverse gas passageway 68. Each longitudinal gas passageway 66 may include a plurality of gas inlets 60. There may be one, two, three, four, five, six, seven, eight, nine, ten or more than ten longitudinal gas passageways 66 and/or transverse gas passageways 68.

The at least one treatment inlet may be positioned at any suitable point or points in the treatment chamber 10. In one embodiment, the at least one treatment inlet is positioned beneath the electrodes 40 (especially so that the treatment agent substantially rises as it travels through the treatment chamber 10).

In further embodiments, the apparatus 1 may include a liquid pump for pumping liquid to be treated through the at least one liquid inlet 20, and/or at least one treatment agent pump (which may be a liquid pump and/or a gas pump) for pumping the treatment agent through the at least one treatment inlet.

The at least one outlet 30 may be positioned above the electrodes 40 (especially at the top 14 of the treatment chamber 10), especially so that the liquid substantially rises as it travels through the treatment chamber 10. In one embodiment, the at least one outlet 30 includes a floc outlet 32 for exit of floc, and/or a liquid outlet 34 for exit of electrochemically treated liquid. The floc outlet 32 may be positioned above the liquid outlet 34. For the avoidance of doubt, some liquid may exit the treatment chamber 10 at the floc outlet 32 with the floc, and some floc may exit the treatment chamber 10 through the liquid outlet 34 (although substantially all floc especially exits the treatment chamber 10 through the floc outlet 32).

The liquid outlet 34 may be positioned in any suitable way within the treatment chamber 10, provided that substantially no floc is able to exit the treatment chamber 10 through the liquid outlet 34. In the embodiment illustrated in FIGS. 1, 3 to 5 and 7, the liquid outlet 34 is positioned directly beneath the floc outlet 32. However, this need not be the case. The liquid outlet 34 may be positioned, for example, lower in the treatment chamber 10, such as below the top of the electrodes 40.

The liquid outlet 34 may be in the form of an aperture or passageway extending from the side wall of the treatment chamber 10 (as illustrated in FIGS. 1, 3 to 5 and 7). The treatment chamber 10 may include one, two, three, four or five liquid outlets 34. One or more valves may be associated with the liquid outlets 34 so that each liquid outlet 34 may be selectively closed or partially closed. This would allow for adjustment of the liquid flow rate through the treatment chamber 10.

In the embodiment illustrated in FIGS. 1, 3 to 5 and 7, the floc outlet 32 is in the form of a weir or spillway. The floc outlet 32 may be positioned above the liquid outlet 34. The floc outlet 32 may be positioned above the electrodes 40. The at least one inlet 20 is also provided in a disperser 22 positioned beneath the electrodes 40. This arrangement results in the liquid rising past the plurality of electrodes 40 within the treatment chamber 10 when the apparatus 1 is in operation. Furthermore, the electrodes 40 are positioned beneath the liquid level within the treatment chamber 10. This means that once the liquid being treated passes above the electrodes, the liquid moves horizontally in the direction of the weir. By virtue of the design of the apparatus 1 illustrated in the Figures, floc collects on the surface of the liquid which allows substantially all floc to exit the treatment chamber 10 over the weir or spillway. Therefore, in another embodiment, the at least one outlet 30 is positioned in the upper portion of the treatment chamber 10, and the at least one inlet 20 is positioned in the lower portion of the treatment chamber 10. In one embodiment, the at least one outlet 30 is positioned at a different height to the at least one inlet 20 in the treatment chamber 10 (this arrangement may avoid overly turbulent flow of the liquid through the apparatus).

Advantageously, the apparatus 1 of the present disclosure may allow substantially all coagulated floc to rise to the surface of the liquid, where the floc can be separated after passing through the floc outlet 32. This is in marked difference to many existing electrochemical liquid treatment apparatuses, in which floc often settles at the bottom of the apparatus, where it needs to be removed via a drain.

In one example, the apparatus 1 includes at least one floc outlet 32, especially in the form of a weir or spillway. In other examples, the apparatus 1 includes two, three or four floc outlets 32, especially in the form of a weir or spillway. In a further example, there may be a floc outlet 32 on each side of the treatment chamber 10 (again, especially in the form or a weir or spillway). The floc outlet 32 may include an adjustable baffle, which may be in the form of a plate. The adjustable baffle may form the lower lip of a weir or spillway, and the baffle may be raised or lowered to adjust the separation of the floc from the electrochemically treated liquid. For example, by raising the baffle typically less electrochemically treated liquid would pass through the floc outlet 32.

Figure 7:
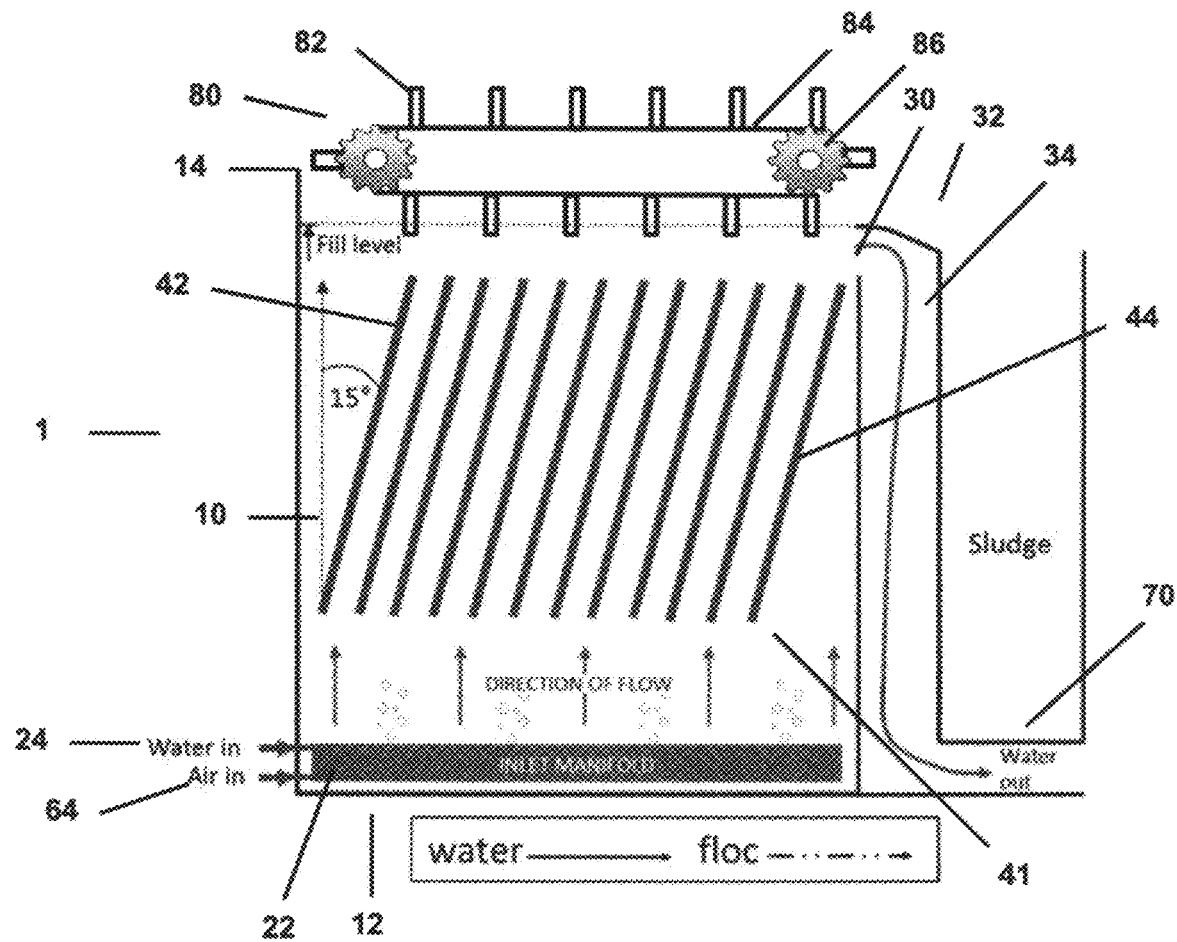
FIG. 7 is a side view of a third example electrochemical liquid treatment apparatus.

The apparatus 1 may also include a floc mover 80 (especially in the form of a floc skimmer as illustrated in FIG. 7) for moving floc, especially on the surface of the liquid in the treatment chamber 10. The floc mover 80 may be configured to move floc towards the at least one floc outlet 32, and may assist in providing a horizontal flow for the liquid at the top 14 of the treatment chamber 10, especially on the surface of the liquid in the treatment chamber 10. The floc mover 80 may be positioned substantially above or below the surface of the liquid in the treatment chamber 10, especially substantially above the surface of the liquid. An exemplary floc mover 80 is illustrated in FIG. 7. This floc mover 80 includes a plurality of floc drivers 82 mounted to a belt, strap, chain or cable 84, which is turned by wheels 86. As the wheels 86 turn, floc rising to the surface of the liquid is skimmed and moved towards and through the at least one floc outlet 32.

The floc outlet 32 may be especially at the top 14 of the treatment chamber 10, and may be especially positioned substantially at the intended height of the liquid within the treatment chamber 10.

A separator 70 may be positioned in fluid communication with the floc outlet 32 to separate floc from the liquid. The separated floc may be disposed of, further treated, or otherwise used. The separated liquid may be combined with the liquid exiting the treatment chamber 10 via the liquid outlet 34; returned to the treatment chamber 10 for further treatment; or diverted elsewhere (for example by the use of a float or sensor actuated submersible sludge pump) for further treatment or release to the environment.

The separator 70 may be in the form of a filter. In one embodiment, the filter may be a filtration bag, especially a filtration bag made of a polymeric material, more especially a filtration bag having woven polymeric fibres which trap the solids and permit the free flow of separated liquid.

The plurality of electrodes 40 may be selected from the group consisting of an anode 44, a cathode 42 and an electrical conductor 46; especially at least one anode 44, at least one cathode 42 and at least one electrical conductor 46, wherein said at least one electrical conductor 46 is positioned intermediate said at least one cathode 42 and said at least one anode 44.

In use, the apparatus includes at least one anode 44 and at least one cathode 42. However, the electrodes 40 may all be of similar structure and only become an anode 44, a cathode 42 or an electrical conductor 46 by virtue of the power connected to the electrode 40 (or lack thereof in the case of an electrical conductor 46; the electrical conductor 46 is not intended to accept power from a power source external to the treatment chamber 10. However, due to the electrical current resulting from the application of power to the anode 44 and cathode 42 and the movement of ions in the liquid, when the apparatus 1 is in use the at least one electrical conductor 46 will carry charge). The at least one electrical conductor 46 is especially positioned between at least one anode 44 and at least one cathode 42.

In one embodiment, from 2 to 12 electrodes 40 in the apparatus 1 are connected to a power source; especially from 2 to 10 or from 2 to 8 electrodes 40 in the apparatus 1 are connected to a power source; more especially from 2 to 6 or from 2 to 4 electrodes 40 in the apparatus 1 are connected to a power source; most especially three electrodes 40 in the apparatus 1 are connected to a power source. If three electrodes 40 in the apparatus 1 are connected to a power source, the two terminal electrodes (i.e. at each end of the plurality of electrodes 40) will have the same polarity (i.e. either an anode 44 or a cathode 42) and an electrode 40 intermediate the terminal electrodes 40 (especially substantially equidistant between the terminal electrodes 40) will have the opposite polarity (i.e. either an anode 44 or a cathode 42). The remaining electrodes 40 in the plurality of electrodes 40 will be electrical conductors 46. The apparatus 1 may include from 10 to 1000 electrodes 40; especially from 20 to 500 electrodes 40; more especially from 30 to 250 electrodes 40; most especially from 40 to 100 electrodes 40.

The electrodes 40 may be replaceable and/or removable. For example, the electrodes 40 may be removable from the treatment chamber 10 by means of an overhead gantry. The electrodes 40 may be removed for temporary storage as a set (for example in horizontal racks above the unit), or can be replaced individually such as when an electrode 40 loses its anodic potential through corrosion.

Each electrode 40 may be of any suitable shape, although certain shapes facilitate easy removal from the treatment chamber 10. For example, each electrode 40 may be curved or planar, especially planar (as in the embodiment exemplified in FIGS. 1, 3-5 and 7). Each electrode 40 may also be, for example, of square, rectangular, trapezoidal, rhomboid, or polygonal shape; especially of rectangular or square shape. Each electrode 40 may also be of solid construction, or may include a plurality of apertures. Each electrode 40 may be especially of solid construction. In one embodiment, each electrode 40 is a plate.

Each electrode 40 may be made of any suitable material. Exemplary materials include aluminium, iron, steel, stainless steel, steel alloy (including mild carbon steel), magnesium, titanium and carbon. In another embodiment, each electrode may be made of an alloy of or containing a material selected from the group consisting of: aluminium, iron, steel, magnesium, titanium and carbon. Each electrode 40 may be selected depending upon the liquid to be treated, the contaminants in the liquid, the floc to be created and the relative cost of the various metallic electrodes at the time. Each said electrode 40 within the apparatus 1 may be the same or different, and may include the same metal or different metals (for example depending on the desired performance).

The electrodes 40 may be positionable above or below the level of the liquid in the treatment chamber 10. However, the electrodes 40 are especially positionable below the level of the liquid in the treatment chamber 10 so as not to impede any liquid or floc horizontal flow at the surface of the liquid.

The electrodes 40 may be positionable within the reaction chamber at any suitable angle. For example, the plurality of electrodes 40 positioned within the treatment chamber 10 may be angled from a vertical plane. In another example, the electrodes 40 or a portion of the electrodes 40 (such as an upper portion) may be angled from a vertical plane (obliquely configured). In the example illustrated in FIGS. 1, 3, 4 and 7 the electrodes 40 are positioned at an angle of about 15 degrees to the vertical. In other examples, the electrodes 40 or a portion of the electrodes 40 (such as an upper portion) may be positioned at an angle of from 5 to 40 degrees from the vertical, especially from 5 to 35 degrees from the vertical, more especially from 10 to 30, 10 to 15 or 15 to 30 degrees from the vertical. In other examples, the electrodes 40 or a portion of the electrodes 40 (such as an upper portion) may be positioned at less than 40 degrees from the vertical, more especially less than 35, 30, 25, 20, 15, 10 or 5 degrees from the vertical. In further examples, the electrodes 40 or a portion of the electrodes 40 (such as an upper portion) may be positioned at greater than 5, 10, 15, 20, 25, 30 and 35 degrees from the vertical. The electrodes may be positioned at an angle of about 15 degrees from the vertical. In other embodiments, the electrodes 40 may be positioned substantially vertically (or in a vertical plane). The inventors have found that different liquids react differently to different electrode angles 40.

Positioning the electrodes 40 within the treatment chamber 10 at an angle may result in a number of advantages. First, positioning the electrodes 40 at an angle may mean that the liquid flows against the electrodes 40 as it rises through the treatment chamber 10 (also gases may travel against the electrode 40 as the gas rises through the treatment chamber 10). This assists in preventing build-up of material (such as floc) on the electrodes 40.

Secondly, positioning the electrodes 40 at an angle results in a horizontal movement being applied to the liquid as it travels through the treatment chamber 10. This can assist in directing the liquid through the at least one outlet 30, and especially floc through the floc outlet 32. In one example, the horizontal movement applied to the liquid forces any coagulated sediment or floc away from the treatment chamber 10 thereby providing a clear disposal path for the floc from the treatment chamber 10.

Thirdly, positioning the electrodes 40 at an angle may assist in agglomerating floc. For example, as liquid rises through the treatment chamber 10, the floc may flow against the electrodes 40. This means that floc is more concentrated against the electrodes 40 which assist in agglomeration. In an exemplary embodiment, if the floc includes oil particles, the rising oil particles may be coalesced into larger droplets as a result of entrainment beneath the electrodes 40. This does not generally occur when the plates are in a vertical configuration, and in this exemplary embodiment the dissolved or emulsified oil particles in the liquid may contact the underside of the electrodes 40 where they accumulate and combine with other forming oil particles at the charged interface until such time as a larger (coalesced) droplet forms which then floats to the surface aided by the predominantly diagonal and vertical liquid flow.

In one embodiment of the present disclosure, the floc is or includes hydrocarbon (or oil) particles. In one example, during electrochemical treatment the coalesced hydrocarbons (or oils) rise to the surface of the liquid and is evacuated from the treatment chamber 10 by means of a horizontal flow imparted by a combination of the natural buoyancy of the oil droplet, the lower density or specific gravity of the entrained oil droplet and the angled electrodes 40. In a further example, during electrochemical treatment the coalescing oil droplets forming beneath the electrodes 40 are forced to the surface with an additional flow of gas and, combined with the horizontal flow imparted by the angled electrodes 40, are cleared from the treatment chamber 10. In another example, during electrochemical treatment the coalesced hydrocarbon droplets are forced to the surface of the liquid via the forced, circulating flow of liquid and a horizontal moment imparted on the liquid via the angle of the electrodes 40.

Each electrode 40 may also be of any suitable thickness, for example from 1 mm to 20 mm thick, especially from 1 mm to 10 mm thick, more especially from 1 mm to 5 mm thick, most especially about 3 mm thick. In some embodiments, each electrode 40 is less than 20 mm thick, especially less than 19, 18, 17, 16, 15, 14, 13, 12, 11, 10, 9, 8, 7, 6, 5, 4, 3 or 2 mm thick. In other embodiments, each electrode 40 is greater than 0.5 mm thick, especially greater than 1, 2, 3, 4, 5, 6, 7, 8, 9, 10, 11, 12, 13, 14, 15, 16, 17, 18 or 19 mm thick. In a further embodiment, the thickness of the electrode 40 may be a range in which the upper and lower limits are as previously described.

The electrodes 40 may be spaced at any suitable distance. For example, the electrodes 40 may be from 1 mm to 150 mm apart, especially from 1 mm to 100 mm apart or from 1 mm to 50 mm apart, more especially from 1 mm to 10 mm apart. The electrodes 40 may be from 1 mm to 5 mm apart, more especially about 3 mm apart. In some embodiments, the electrodes 40 are less than 150 mm apart, especially less than 140, 130, 120, 110, 100, 90, 80, 70, 60, 50, 40, 30, 25, 20, 15, 10, 9, 8, 7, 6, 5, 4 or 3 mm apart. In other embodiments, the electrodes 40 are greater than 1, 2, 3, 4, 5, 6, 7, 8, 9, 10, 15, 20, 25, 30, 40, 50, 60, 70, 80, 90, 100, 110, 120, 130 or 150 mm apart. The electrodes 40 may also be a range apart in which the upper and lower limits are as previously described. When the treatment chamber includes more than 2 electrodes, each electrode 40 may be the same distance apart or different distances apart. The electrodes 40 may be held apart in any suitable way. For example, the treatment chamber 10 may include guides for holding the electrodes 40 in position. In one embodiment, the guides may be grooves or slots positioned in opposite walls of the treatment chamber 10. The guides may be made from a high-density, electrically insulating polymeric material, such as HDPE or PVC, or a material as discussed below for the electrode holder 100.

In one embodiment, the electrodes 40 are from 1 mm to 10 mm thick, more especially from 1 mm to 5 mm thick; and the electrodes 40 are from 1 mm to 10 mm apart, more especially from 1 mm to 5 mm apart. Using thinner electrodes 40 positioned close together enables a greater number of electrodes 40 to be positioned within the treatment chamber 10. This increases the surface area of the electrodes 40 in contact with the liquid, which may enhance the electrochemical treatment of the liquid.

To improve fluid flow, the electrodes 40 may have a tapered lower edge 41. The lower edge 41 of the electrodes 40 may be tapered to an angle of about 4, 5, 6, 7, 8, 9, 10, 11, 12, 13, 14, 15, 16, 17, 18, 19 or 20 degrees relative to the longitudinal axis of the electrode. The taper may extend less than 40%, 30%, 20%, 15%, 10%, 9%, 8%, 7%, 6%, 5%, 4% or 3% of the length of the electrode 40. The lower edge 41 of the electrode 40 may be tapered on one or more sides, such as two opposed longitudinal sides, more especially one longitudinal side. If the lower edge 41 of the electrode 40 is tapered on more than one side, then the taper on each side may be the same or different.

Any suitable electrical current may be applied to the plurality of electrodes 40. However, the current applied to the plurality of electrodes 40 may especially be a direct current of adjustable frequency of alternation. This means that the electrodes 40 functioning as the at least one cathode 42 and the at least one anode 44 may switch during the electrochemical treatment. This enables the electrodes 40 to create a reversible electrical field within the treatment chamber 10, which may assist the electrodes 40 in remaining clear of debris or reaction products that might otherwise inhibit the electrochemical treatment by electro passivation. The polarity switching of the electrodes 40 may allow specific chemical reactions to be delayed or accelerated as required. Therefore, in one embodiment the polarity of the electrodes 40 is reversed during the electrochemical treatment.

In a further embodiment, the voltage and amperage of the electrical field within the treatment chamber 10 may be adjusted as necessary by placing selected electrodes 40 in electrical contact with a voltage source. The voltage source may be a separate, proprietary manufactured transformer.

The apparatus 1 may also include at least one non-conductive element positioned within the treatment chamber 10. This non-conductive element may be used to alter the electrical field (amperage and voltage) within the treatment chamber 10. The position, shape and configuration of the non-conductive element may be as described above for the electrodes 40. However, the non-conductive element is made of a material that does not conduct electricity, such as, for example, a material selected from the group consisting of: a polymer plastic (such as polyvinyl chloride (PVC), high density polyethylene (HDPE), low density polyethylene (LDPE), acrylonitrile butadiene styrene (ABS), polypropylene (PP)); a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix, or a combination of the aforementioned materials. In one embodiment the apparatus 1 does not include any non-conductive elements.

The apparatus 1 may further include a flow aligner 90 for aligning the flow of the liquid between the electrodes 40, the flow aligner being positioned or positionable within the treatment chamber 10. A flow aligner 90 may be advantageous as the liquid beneath the electrodes 40 in the treatment chamber may especially be turbulent. The flow aligner 90 may assist the liquid in moving substantially along the same longitudinal axis as the plurality of electrodes 40, which in turn may improve the reaction between the liquid to be treated and the electrodes 40.

The flow aligner 90 may be in the form of at least one (especially a plurality of) baffles or baffle walls 92 extending beneath the electrodes 40. The at least one baffle or baffle wall 92 may extend substantially vertically beneath the electrodes 40. The at least one baffle or baffle wall 92 may extend along substantially the same longitudinal axis as the electrodes 40. The at least one baffle or baffle wall 92 may be positioned transversely or substantially perpendicularly to the electrodes 40. The flow aligner 90 may integrally formed with the treatment chamber 10, or may be removable and/or replaceable. Each baffle or baffle wall 92 may be in the form of a plate. Each baffle or baffle wall 92 may be from 20 mm to 500 mm long, especially from 50 mm to 250 mm long or from 60 mm to 150 mm long, more especially from 80 mm to 120 mm long, most especially about 100 mm long.

The flow aligner 90 may be made of any suitable material, but especially may be made of a non-conductive material. The flow aligner 90 may be made of the materials discussed above for the treatment chamber 10. The flow aligner 90 may be especially made from a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; a polymer plastic such as high density polyethylene (HDPE), polyethylene (PE), polyethylene terephthalate (PET), polyvinyl chloride (PVC); a phenolic polymer plastic; or be fabricated from a number of composite materials including carbon fibre (for example a carbon fibre insulated using a polymer plastic or a composite material) and variations thereof.

The treatment chamber 10 may be configured to releasably engage with at least one electrode holder 100 holding a plurality of electrodes 40 for electrochemical treatment of the liquid. The treatment chamber 10 may include at least one guide for guiding the electrode holder 100 into position. The treatment chamber 10 may include at least one (or a plurality of) grooves for slidable engagement of the electrode holder 100 in the treatment chamber. The treatment chamber 10 may include at least one power connector for connecting power to the electrode holder, to thereby power at least one of the electrodes 40 held by the electrode holder. The treatment chamber 10 may include a plurality of power connectors (for example of different polarity) for connecting power to each electrode holder. For example, if the apparatus 1 includes one electrode holder 100, then the treatment chamber 10 may include at least one power connector for connecting power to at least one anode 44 (especially one or two power connectors) and at least one power connector for connecting power to at least one cathode 46 (especially one or two power connectors). The at least one power connector may be located on a wall of the treatment chamber, especially in a groove in which the electrode holder 100 may be slideably engaged. In one embodiment, only one wall of the treatment chamber 10 includes a power connector for each electrode holder 100.

The treatment chamber may be configured to releasably engage with from 1 to 100 electrode holders 100, especially from 2 to 50 electrode holders 100, more especially from 2 to 40, from 2 to 30, from 2 to 20, or from 2 to 10 electrode holders 100.

Figure 8:
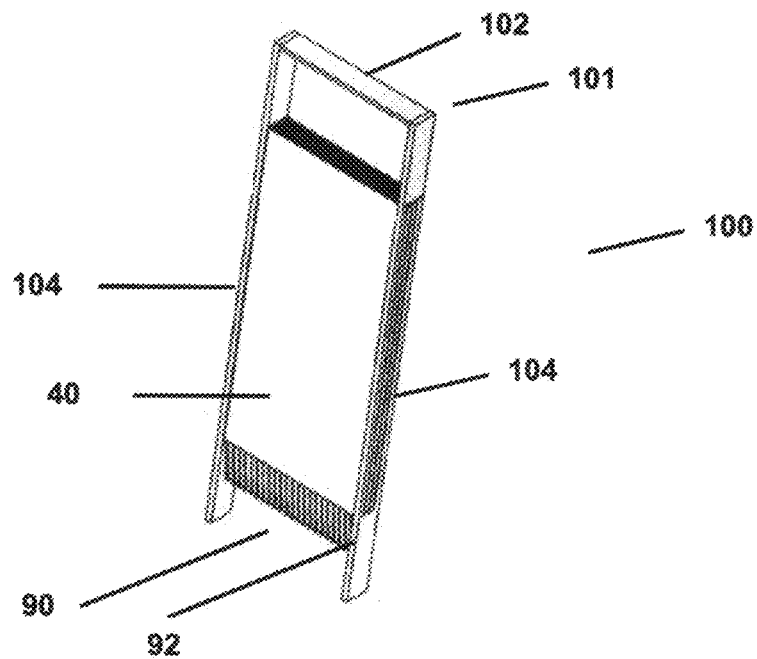
FIG. 8 is a perspective view of an example electrode holder.
Figure 9:
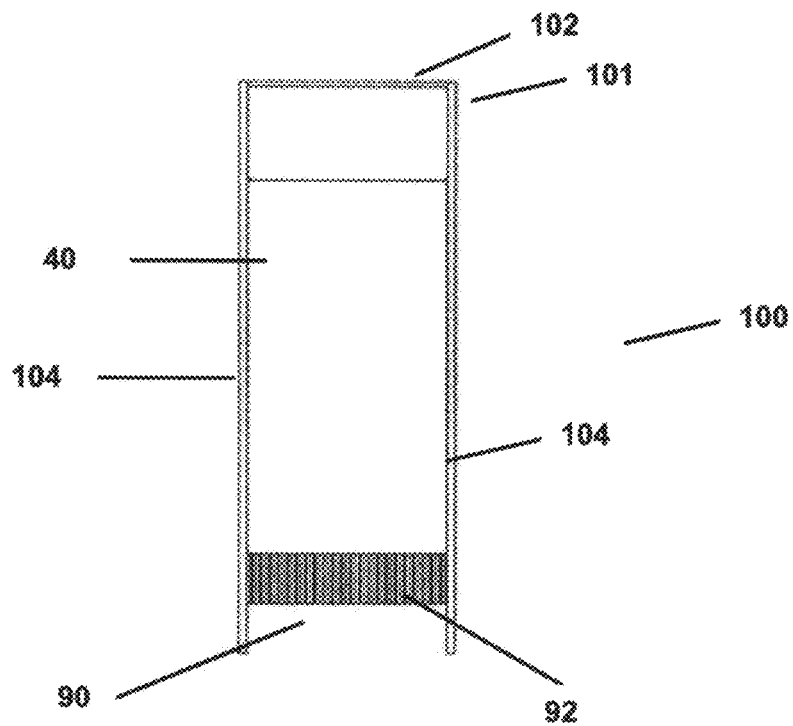
FIG. 9 is a front view of the example electrode holder of FIG. 8.
Figure 10:
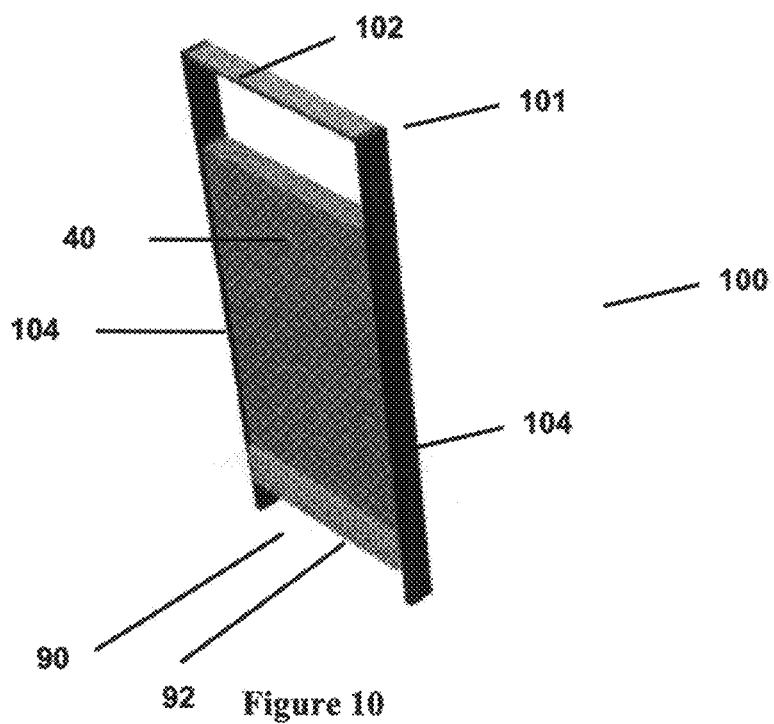
FIG. 10 is a perspective view of the example electrode holder of FIG. 8.

The apparatus 1 may further include an electrode holder 100 (an exemplary electrode holder 100 is illustrated in FIGS. 8 to 10). The electrode holder 100 may include a frame 101, and the frame 101 may include a handle 102 and at least two side walls 104. The frame 101 may be substantially U-shaped, with the base of the "U" forming the handle 102 and the sides of the "U" forming the side walls 104. The electrode holder 100 may be in the form of a cartridge.

The electrode holder 100, especially the at least two side walls 104 of the electrode holder 104, may be configured to releasably engage with the treatment chamber 10. The electrode holder 100 (especially the at least two side walls 104) may be slidably engageable with the treatment chamber 10. The electrode holder 100 (especially the at least two side walls 104) may be releasably engageable in the treatment chamber 10 by friction, by a clamp, or by another suitable fastener. In one example, the treatment chamber 10 or the electrode holder 100 may include a clamp for releasably clamping the electrode holder 100 in position. The electrode holder 100 (especially at least one of the at least two side walls 104) may be configured to accept power, especially from the wall of the treatment chamber 10, more especially by way of a power connector located in the electrode holder 100 (especially a side wall 104 of the electrode holder 100). The electrode holder 100 (especially at least one of the at least two side walls 104) may be configured to supply power along a longitudinal edge of at least one electrode 40 held by the electrode holder. Providing power along a longitudinal edge of at least one electrode 40 may provide superior flow of power than if power was only supplied to the at least one electrode 40 at a single point.

Power connectors in the electrode holder 100 and the treatment chamber 10 may connect in any suitable way. For example, the two power connectors may connect by way of abutting surfaces or projections, or by way of a male-female connection.

The electrode holder 100 may hold a plurality of electrodes 40. The electrodes 40 within the electrode holder 100 may be replaceable and/or removable. In one embodiment, the electrodes 40 within the electrode holder 100 may not be replaceable and/or removable. The electrode holder 100 may include slots machined to enable the electrodes 40 to slide in and out of the electrode holder 100 as required. This may enable replacement of the electrodes 40 within the electrode holder 100 whilst the machine continues to operate with a prior electrode holder 100. The electrodes 40 may be as described above. Furthermore, the spacings between the electrodes in the electrode holder 100 may be as described above for the spacings for the electrodes 40 in the treatment chamber 10.

The electrode holder 100 may include a flow aligner 90, as described above. The flow aligner 90 may be positioned opposite to the handle 102, beneath the electrodes 40.

Any suitable number of electrodes 40 may be held by the electrode holder 100. In one embodiment, the electrode holder may hold from 3 to 100 electrodes 40; especially from 3 to 50 electrodes 40; more especially from 3 to 25 electrodes 40; most especially from 5 to 15 electrodes 40 or about 10 electrodes 40. In one embodiment, the electrode holder 100 holds at least 3, 4, 5, 6, 7, 8, 9 or 10 electrodes 40. In another embodiment, the electrode holder 100 holds less than 100, 90, 80, 70, 80, 70, 60, 50, 40, 30, 20 or 15 electrodes 40.

The electrode holder 100 or the electrodes 40 within the electrode holder 100 may be positionable within the treatment chamber 10 at any suitable angle. In one embodiment, the electrode holder 100 is positionable substantially vertically within the treatment chamber 10. In this embodiment, the electrodes 40 may be held substantially vertically by the electrode holder 100, or the electrodes 40 may be held at an angle from the vertical by the electrode holder 100. In another embodiment, the electrode holder is positionable at an angle within the treatment chamber 10. In this embodiment, the electrodes 40 may be held substantially vertically by the electrode holder 100 (i.e. the longitudinal axis of the electrodes 40 held by the electrode holder 100 may be substantially the same as the longitudinal axis of the electrode holder 100). Alternatively in this embodiment, the electrodes 40 may be held at angle within the electrode holder 100. The angle of the electrode holder 100, or the angle of the electrodes 40 within the electrode holder 100 may be as described above for the angle of the electrodes 40 within the treatment chamber 10. For example, the electrodes 40 within the electrode holder 100 may be held at an angle of from 10 to 30 degrees from the vertical, especially at an angle of 10 to 15 degrees or about 15 degrees from the vertical. In another example, the electrode holder 100 may be held at an angle of from 10 to 30 degrees from the vertical, especially at an angle of 10 to 15 degrees or about 15 degrees from the vertical. The electrodes 40 within the electrode holder 100 may be from 1 mm to 10 mm apart, especially about 3 mm apart. The electrodes 40 within the electrode holder 100 may be replaceable and/or removable.

The electrode holder 100 advantageously may allow for the easy and rapid exchange of electrodes 40 in the apparatus 1. The electrode holder 100 may overcome the delays inherent in changing individual electrodes 40 within the reaction chamber and may be particularly advantageous in areas of low head height.

The frame of the electrode holder 100 may be made of any suitable material, but especially may be made of a non-conductive material. The frame of the electrode holder 100 may be made of the materials discussed above for the treatment chamber 10. The frame of the electrode holder 100 may be especially made from a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; or a polymer plastic such as high density polyethylene (HDPE), polyethylene (PE), polyethylene terephthalate (PET) or polyvinyl chloride (PVC); a phenolic polymer plastic; or a carbon fibre insulated using a polymer plastic or a composite material.

The electrode holder 100 may be removable by way of a lifting device which lifts the electrode holder 100 substantially vertically before allowing for horizontal movement of the electrode holder 100 above the apparatus 1. The lifting device may be slideably mounted on at least one (especially two) rails. In one embodiment, the electrode holder 100 may be removable using an overhead gantry.

In a further embodiment, the apparatus 1 may include a current controller for controlling the amperage and voltage applied to the at least one anode 44 and the at least one cathode 42.

Figure 3:
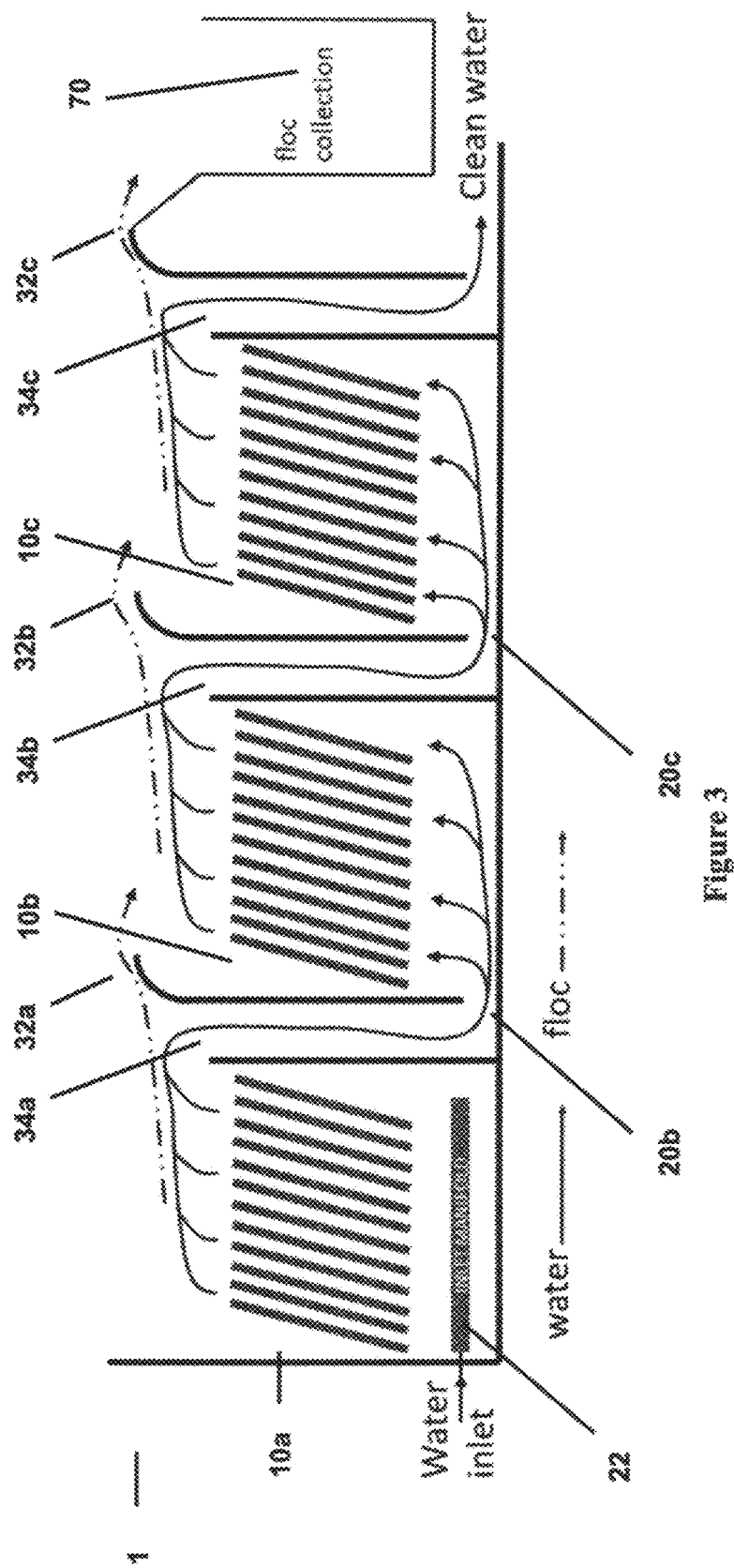
FIG. 3 is a side view of a second example electrochemical liquid treatment apparatus.
Figure 4:
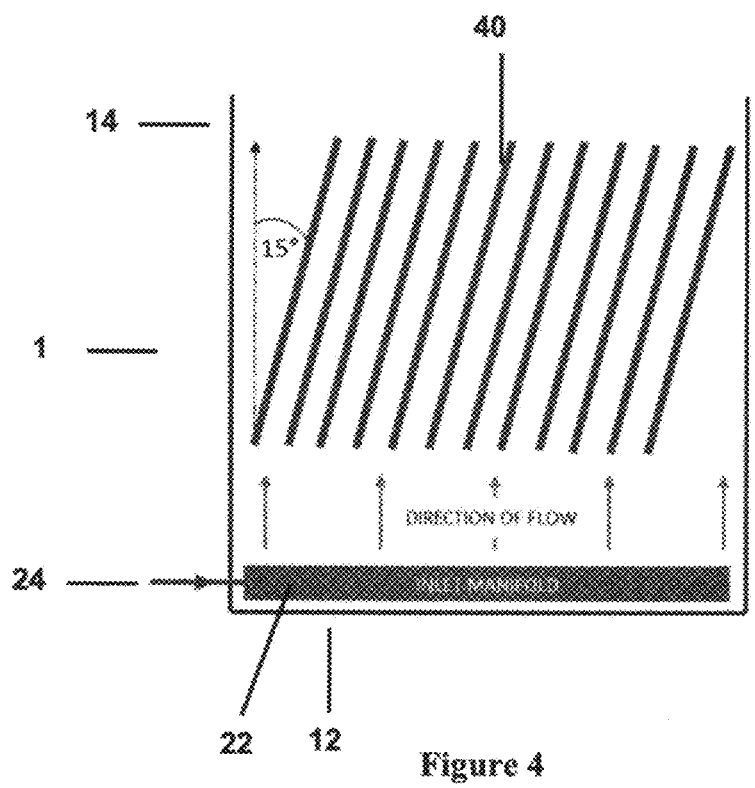
FIG. 4 is a side view of one treatment chamber in the second example electrochemical liquid treatment apparatus.
Figure 5:
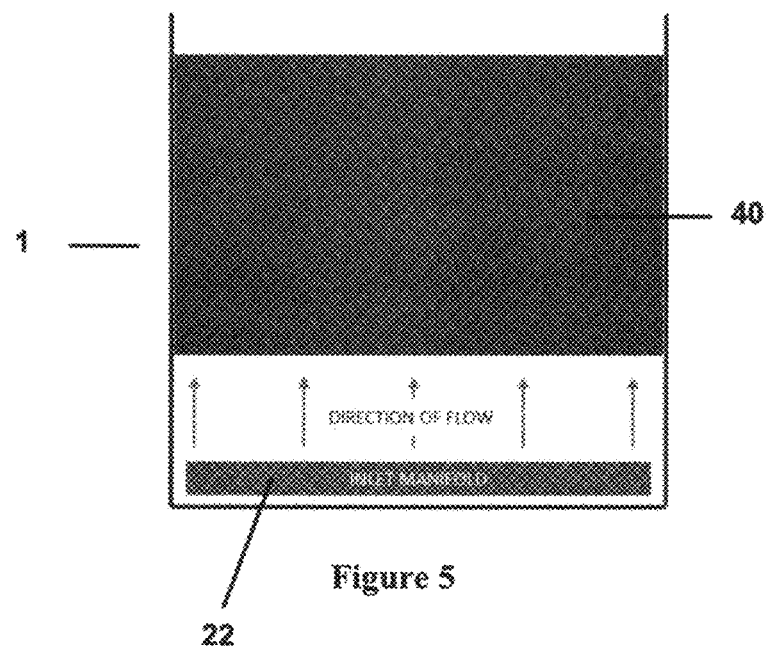
FIG. 5 is a front view of the second example electrochemical liquid treatment apparatus.

In a further embodiment, the apparatus 1 may include a plurality of treatment chambers 10. Each said treatment chamber 10 may include at least one inlet 20 for entry of a liquid to be treated, and at least one outlet 30 for exit of electrochemically treated liquid; and a plurality of electrodes 40 positioned within the treatment chamber 10 for electrochemical treatment of the liquid. In one example, the apparatus 1 may include at least a first and a second treatment chamber 10a, 10b, and the apparatus 1 may be configured so that liquid from said at least one outlet 34a of the first treatment chamber 10a flows into said at least one inlet 20b of the second treatment chamber 10b. The apparatus 1 of FIG. 3 is configured so that liquid from the liquid outlet 34a of a first treatment chamber 10a flows into the inlet 20b of a second treatment chamber 10b. Following this, the liquid from the liquid outlet 34b of the second treatment chamber 10b flows into the inlet 20c of a third treatment chamber 10c. The floc produced flows over successive floc outlets 32a, 32b, 32c until it passes to filter 70 for collection.

In another embodiment, the floc exiting a first treatment chamber 10a through a floc outlet 32a is diverted so that this floc does not travel to the second treatment chamber 10b, and similarly the floc exiting the second treatment chamber 10b through a floc outlet 32b is diverted so that this floc does not travel to the third treatment chamber 10c. However, in this embodiment the liquid from the liquid outlet 34a of a first treatment chamber 10a flows into the inlet 20b of a second treatment chamber 10b, and the liquid from the liquid outlet 34b of the second treatment chamber 10b flows into the inlet 20c of a third treatment chamber 10c.

The apparatus 1 may include a pretreater positioned prior to, and in fluid communication with the liquid inlet 20. The pretreater may be, for example, a filter to remove larger particulate solids from the fluid stream that could lodge between the electrodes and disrupt liquid flows or otherwise impede with the functioning of the device. However, such pretreatment is typically not necessary.

When the apparatus 1 is used, the liquid to be treated enters the treatment chamber 10 through the at least one inlet 20 and a voltage is applied to the plurality of electrodes 40 (especially to provide at least one anode 44 and at least one cathode 42), to thereby electrochemically treat the liquid. Floc may be generated as the liquid is electrochemically treated, and the floc may rise to the surface of the liquid. The floc may exit the treatment chamber 10 at the floc outlet 32 (for subsequent separation of the floc from liquid, such as by filtering) and the electrochemically treated liquid may exit the treatment chamber 10 at the liquid outlet 34. A treatment agent may be introduced into the treatment chamber 10 during the electrochemical treatment. A treatment enhancer may be applied to the treatment chamber 10 during the electrochemical treatment.

The apparatus 1 may be operable at any suitable temperature and pressure. However, the apparatus 1 is especially operable at atmospheric temperature and pressure. In another embodiment, the apparatus 1 is operable at greater than atmospheric pressure, or less than atmospheric pressure, as defined elsewhere in the specification.

The apparatus 1 of the present disclosure may also form one component of a larger water treatment system.

Figure 11:
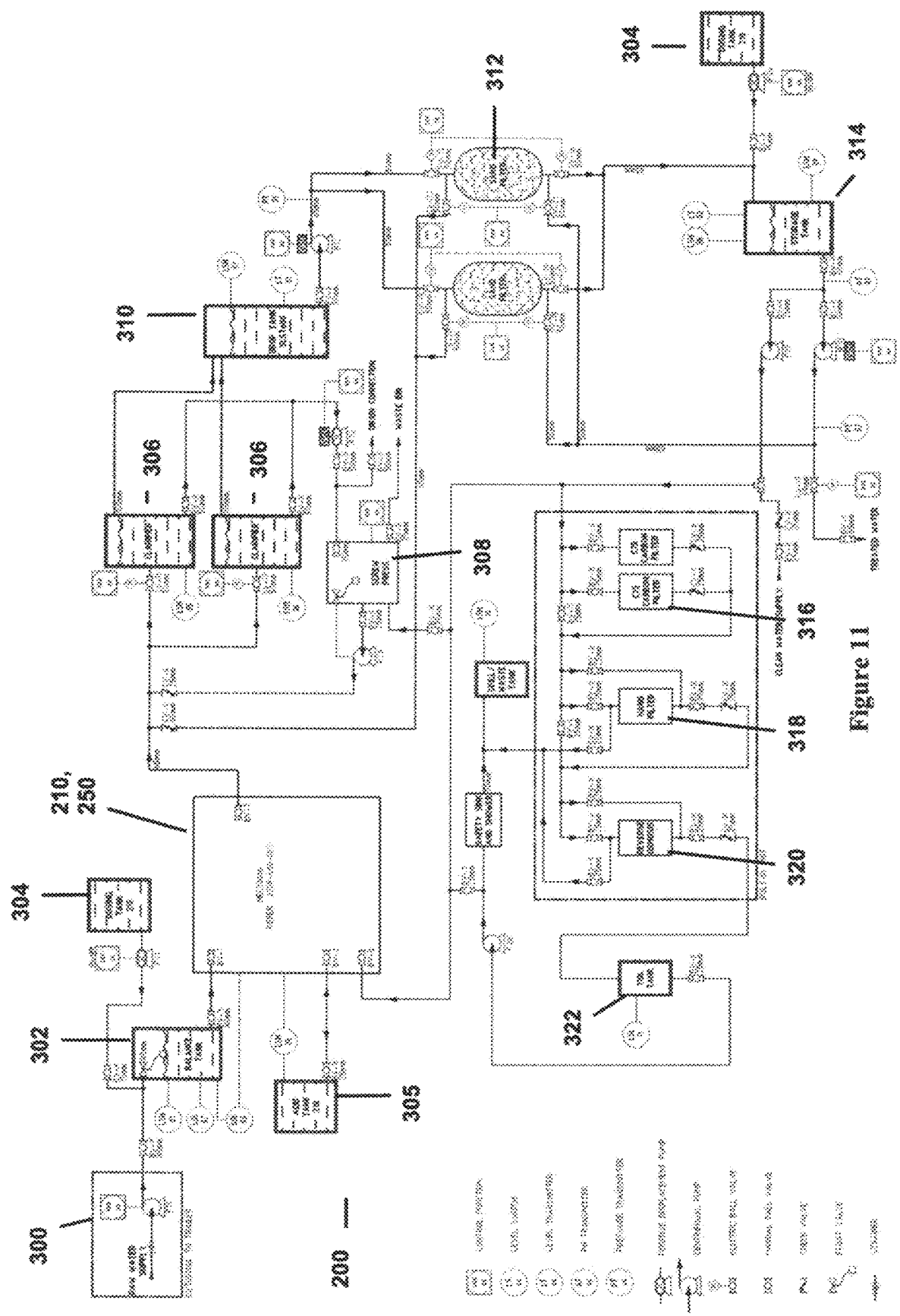
FIG. 11 is a process flow diagram of a water treatment system including an electrochemical/electrolytic liquid treatment apparatus (HEC20016)
Figure 12:
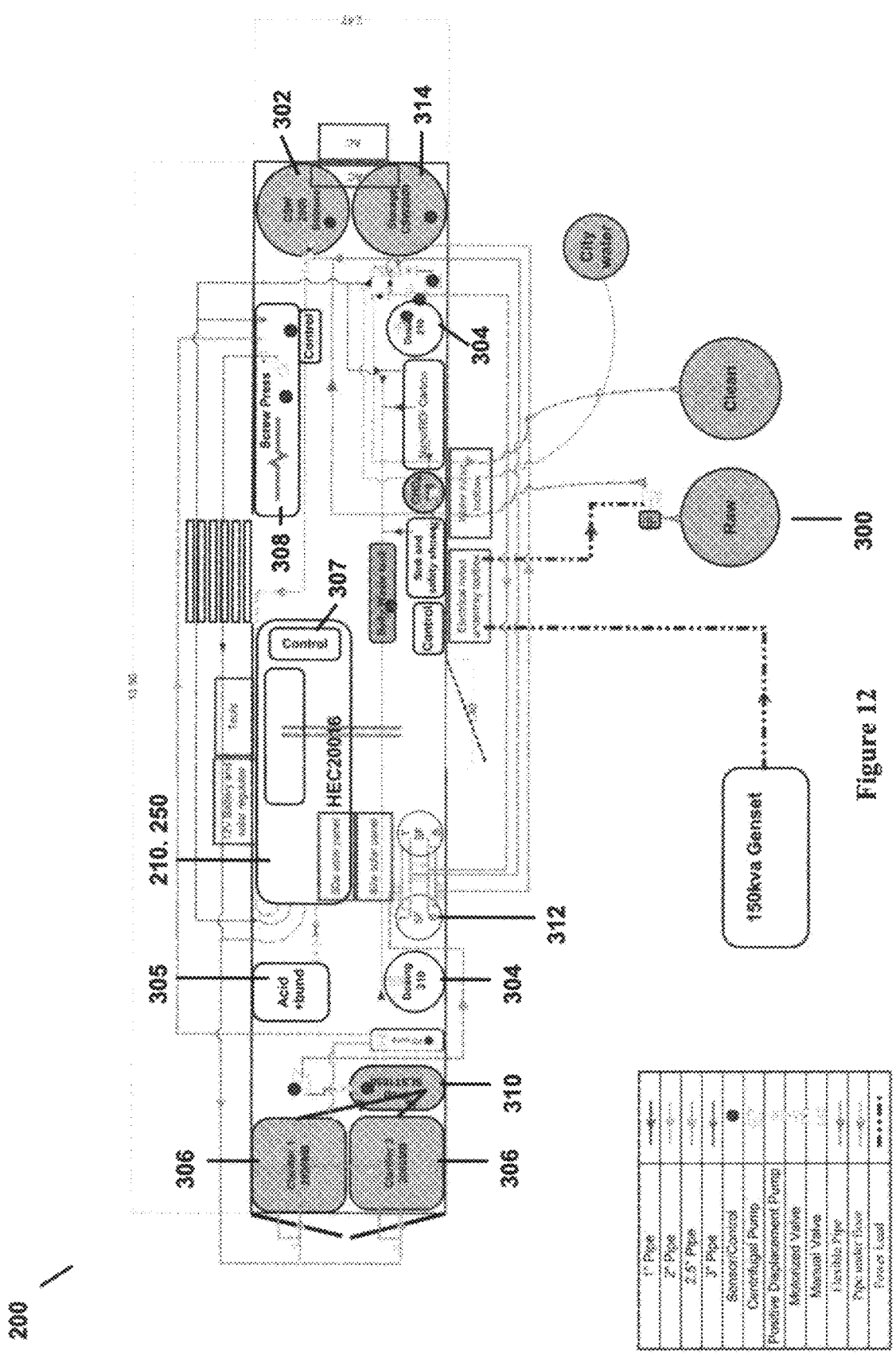
FIG. 12 is a top view of the layout of a trailer including the water treatment system of FIG. 11.
Figure 16:
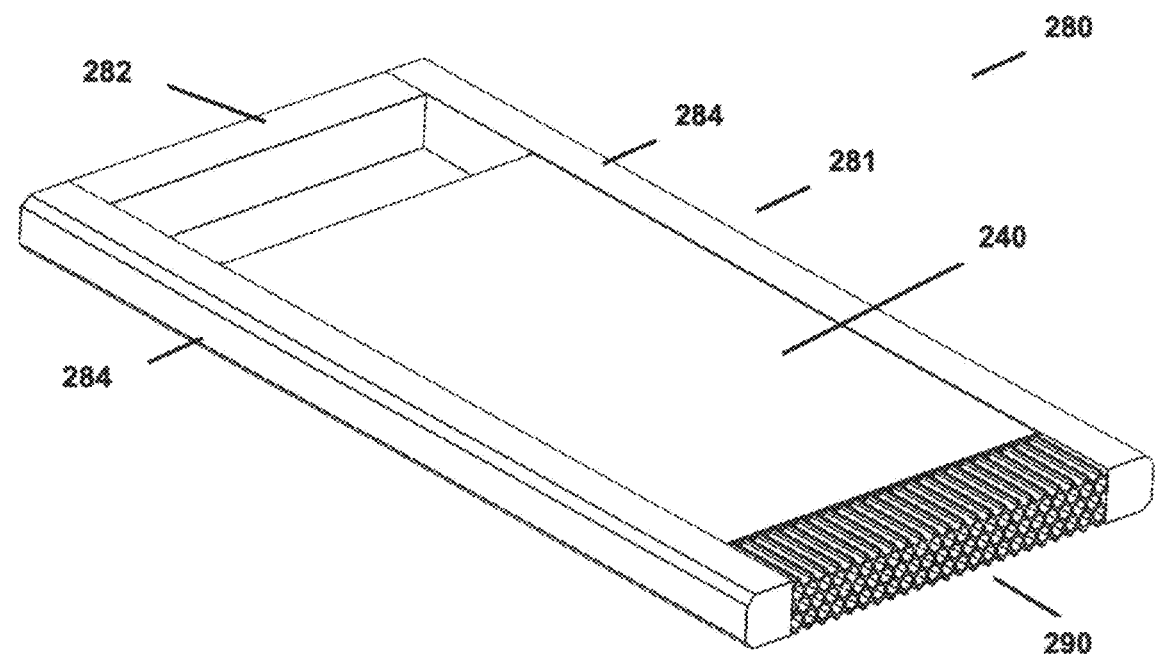
FIG. 16 is a perspective view of a second example electrode holder.
Figure 17:
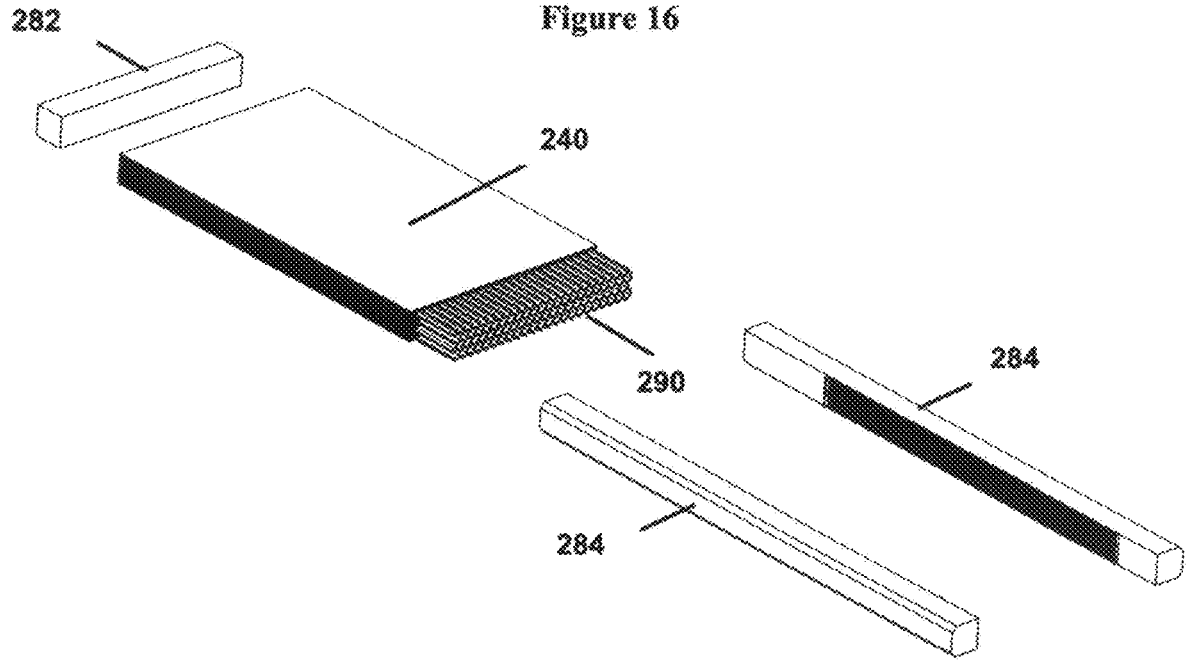
FIG. 17 is an exploded perspective view of the electrode holder of FIG. 16.

FIGS. 11 to 15 describe a water treatment system 200 and components thereof in the form of a trailer. FIGS. 11 to 15 illustrate a water treatment system 200 including an electrochemical fluid treatment apparatus 201. The water treatment system 200 may be suitable for use in the methods described above. In FIGS. 11 and 12, the treatment chamber 210 and defoaming chamber 250 are provided within the component labelled HEC20016 (this component is illustrated, for example, in FIGS. 13-15 and 31-33).

As shown in FIG. 11, raw fluid (such as water) 300 external to the trailer is supplied to a balance tank 302 using a centrifugal pump. At least one treatment agent (stored in a dosing tank 304) may be added to the fluid flowing to the balance tank 302 using a positive displacement pump. Manual ball valves are in the conduit between the raw water 300 and balance tank 302 (80 mm manual ball valve), and between the conduit between the dosing tank 304 and the balance tank 302 (15 mm manual ball valve). The balance tank includes an 80 mm float valve, as well as a level switch.

The fluid then flows through ball valves (the first of which is an 80 mm valve) to the treatment chamber 210 where electrochemical treatment occurs. The pH of the fluid during the electrochemical treatment may be controlled by the introduction of an acid from acid tank 305. The electrochemically treated fluid then flows to the defoaming chamber 250. The electrochemical process may be controlled via a system for regulating the electrochemical treatment (which includes a controller (PLC) 307). Electrochemically treated fluid then flows to clarifiers 306 (which have a level switch) through a 65 mm conduit and 50 mm electric ball valves.

Clarified fluid (and floc) may exit the clarifiers 306 via 50 mm ball valves before passing through a positive displacement pump and then to successive 50 mm ball valves to a drain connection. Alternatively, the clarified fluid (and floc) from the clarifiers 306 may pass to a screw press 308 having a float valve. Pressed floc exits the screw press through a 25 mm ball valve to a waste bin. Fluid exiting the screw press 306 passes through a 25 mm ball valve to centrifugal pump, and then through a 25 mm check valve before passing back to clarifiers 306.

Clarified fluid may be passed from clarifiers 306 via a 100 mm conduit to a drop tank 310 (in which the tank has a level transmitter and a level switch). Fluid exiting drop tank 310 passes through a centrifugal pump and then to sand filters 312 (for separation of floc from the fluid) or optionally back through clarifiers 306 by way of 50 mm ball vales and 65 mm check valve. After sand filtration the fluid may be passed to a storage tank 314 (where is it optionally treated by a treatment agent (stored in a dosing tank 304, in which the treatment agent may be pumped into the storage tank 314 by way of a positive displacement pump)), passing through 50 mm ball valves and a 65 mm conduit. From storage tank 314 the treated fluid may pass through 80 mm ball valves and centrifugal pump before being released. Alternatively, fluid from the storage tank 314 may pass through ball valves (80 mm and 25 mm), through centrifugal pump and then to: (i) further components of a filtration system, including a carbon filter 316, nanofilter 318, and reverse osmosis system 320; (ii) screw press 308; or (iii) treatment chamber 210 and defoaming chamber 250. The filtered fluid may pass to a storage tank 322 before re-electrochemical treatment or disposal. In FIGS. 11 and 12, the electrochemical fluid treatment apparatus 201 includes balance tank 302, acid tank 305, dosing tank 304, treatment chamber 210, defoaming chamber 250, and clarifiers 306. As illustrated in FIGS. 11 to 15, there are various pumps 324 and valves associated with the system 200 and apparatus 201.

The system 200 illustrated in FIGS. 11 to 13 may be configured so that after electrochemically treated fluid exits clarifier 306, the clarified fluid then undergoes a further electrochemical treatment step, passing through a further treatment chamber 210, defoaming chamber 250 and clarifier 306.

Figure 31:
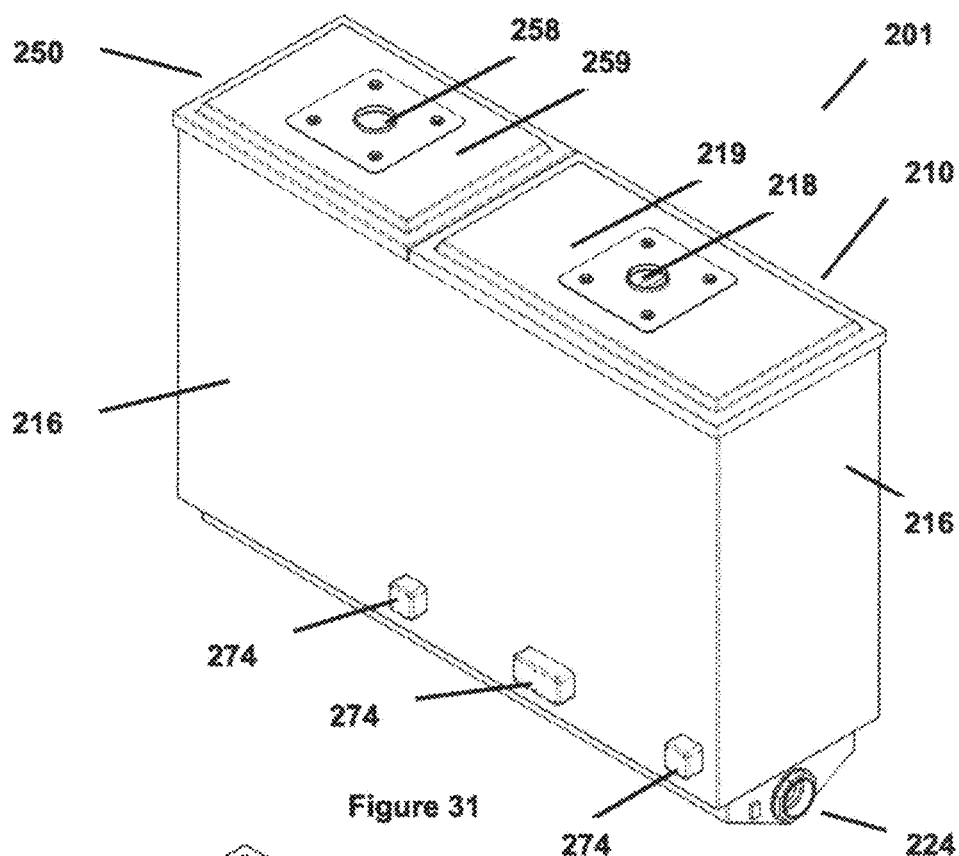
FIG. 31 is a perspective view of a fifth example electrochemical/electrolytic liquid treatment apparatus.
Figure 32:
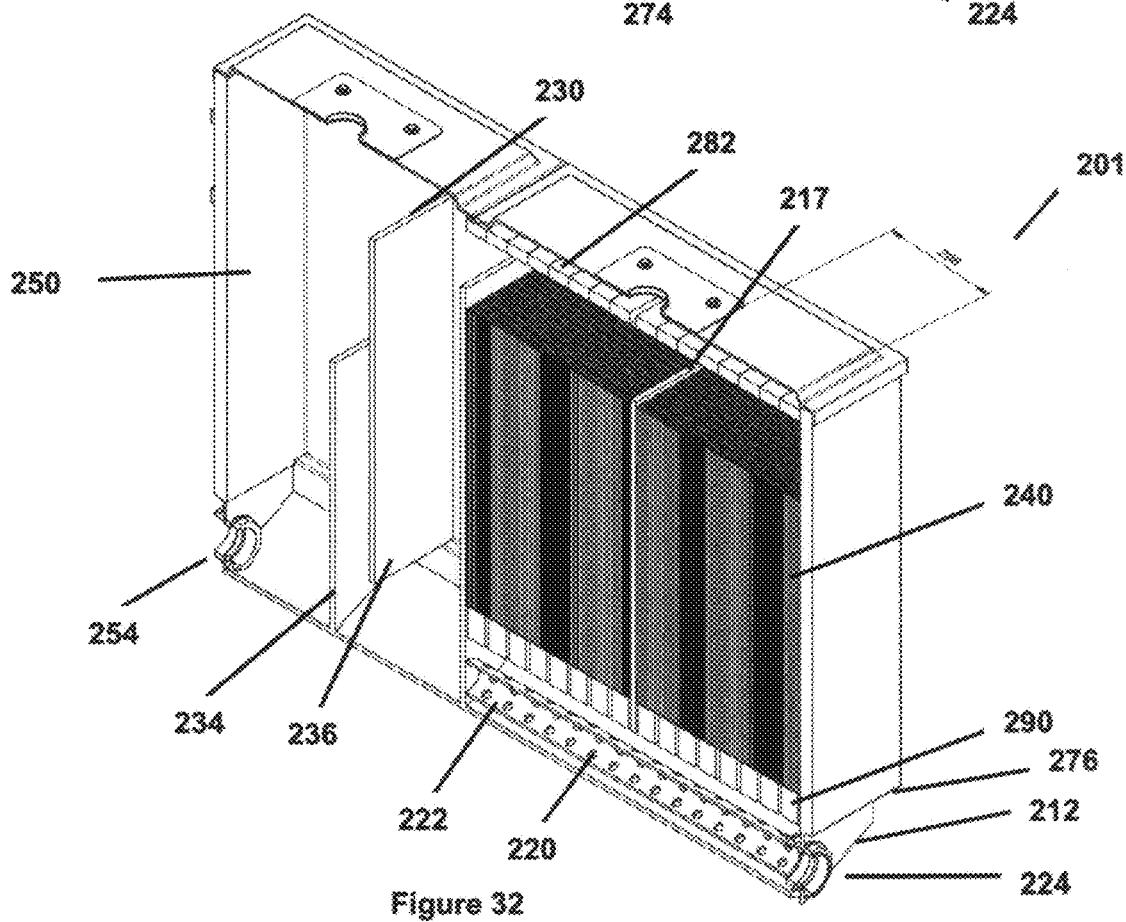
FIG. 32 is a cross sectional view of the apparatus of FIG. 31.
Figure 33:
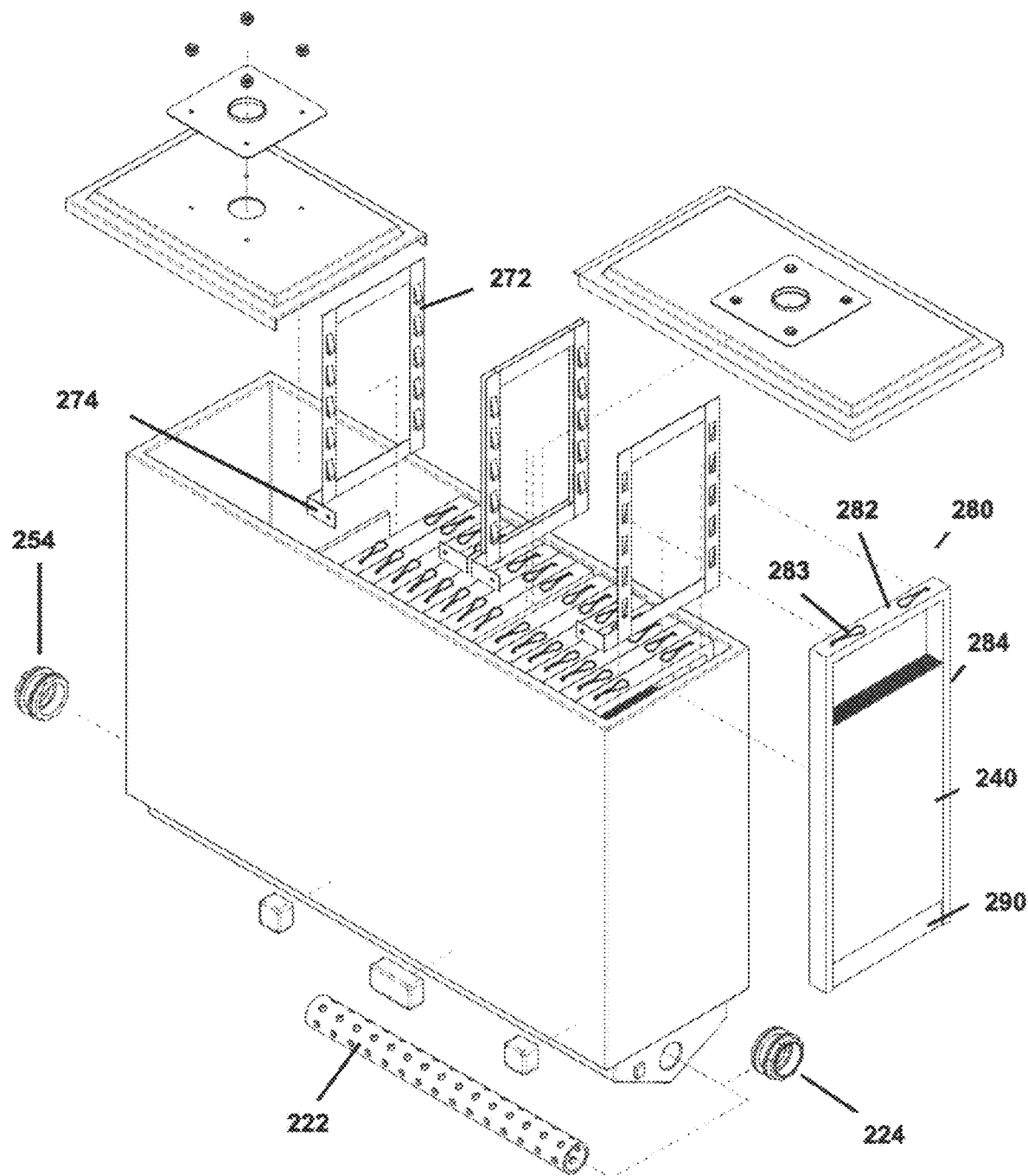
FIG. 33 is an exploded perspective view of the apparatus of FIG. 31.

Three example treatment chambers 210, electrode holders 280, and defoaming chambers 250 are illustrated in FIGS. 16 to 33; a first at FIGS. 16-19, a second at FIGS. 20-30, and a third at FIGS. 31-33. The treatment chamber 210 illustrated in FIGS. 20-22 and 26-30 is capable of only accommodating one electrode holder 280. The treatment chamber 210 illustrated in FIGS. 16-19 is capable of accommodating 10 electrode holders 280, and the treatment chamber 210 illustrated in FIGS. 31-33 is capable of accommodating 16 electrode holders 280. The electrode holders 280 illustrated in FIGS. 16 and 17 and 31-33 are each capable of holding 10 electrodes 240, whereas the electrode holder 280 illustrated in FIGS. 20-25, 29 and 30 is capable of holding 13 electrodes 240. The treatment chamber 210, defoaming chamber 250 and electrode holders 280 in the treatment system 200 illustrated in FIGS. 11-15 is of similar design to those in FIGS. 16-33. However, in the treatment system 200 of FIGS. 11-15, the treatment chamber 210 is capable of accommodating 400 electrodes (which equates to between 30 and 40 electrode holders 280) or the treatment chamber 210 is capable of accommodating 160 electrodes (equating to 16 electrode holders 280). In one embodiment, the treatment chamber 210, defoaming chamber 250 and electrode holders 280 in the treatment system 200 illustrated in FIGS. 11-15 is the treatment chamber 210, defoaming chamber 250 and electrode holders 280 illustrated in FIGS. 31-33. Context permitting, the apparatus 201 of FIGS. 11 to 33 may be used in the same manner, and for the same fluids, as for description above for FIGS. 1-10.

The treatment chamber 210 in the apparatus 201 of FIGS. 11-15 and 31-33 is about 500 L, and can accept a fluid flow rate of about 14 L/second. The residence time of the fluid in the treatment chamber 210 in the apparatus 201 of FIGS. 11-15 and 31-33 is typically about 30 s.

Figure 18:
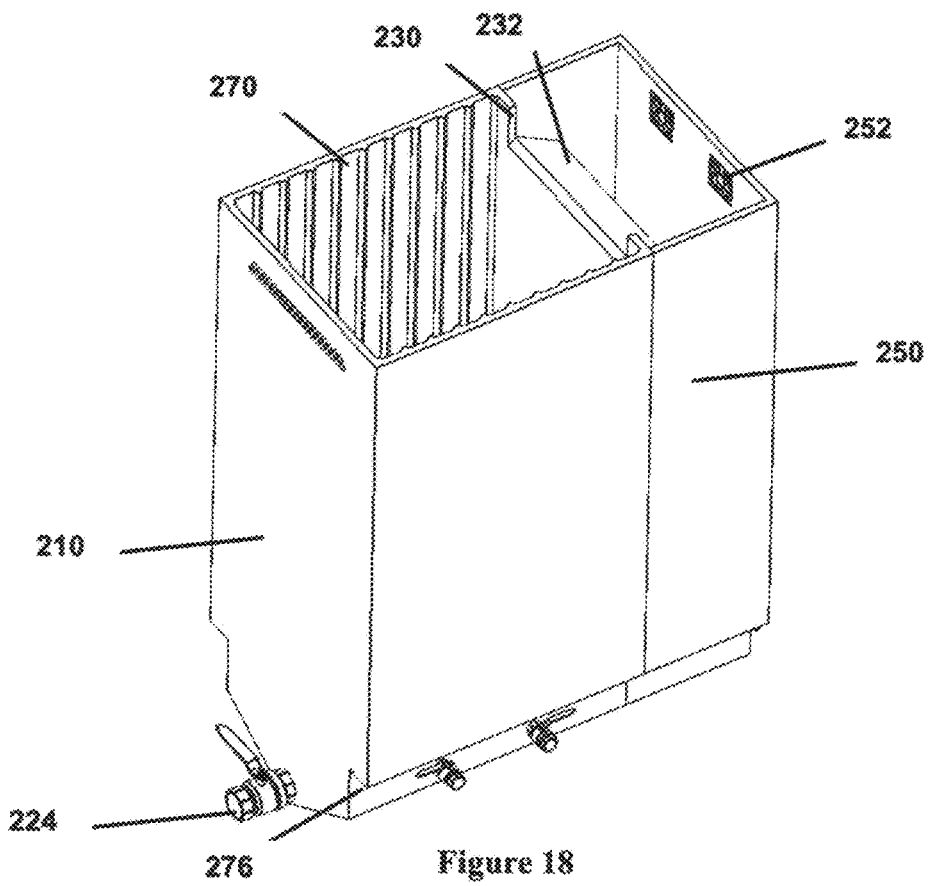
FIG. 18 is a perspective view of an exemplary treatment chamber and defoaming chamber.
Figure 19:
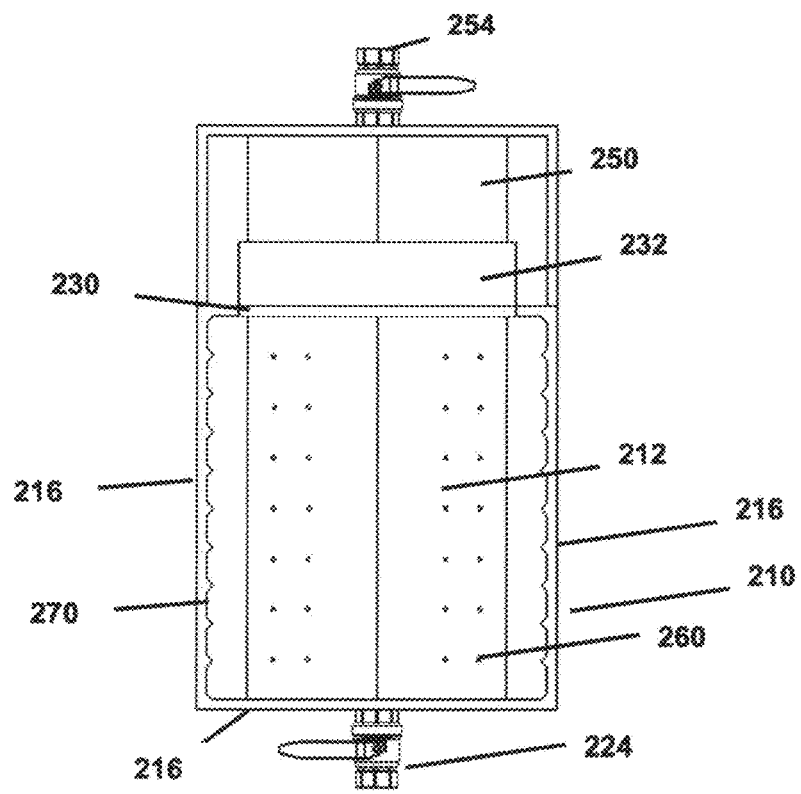
FIG. 19 is a top view of the treatment chamber and defoaming chamber of FIG. 18.
Figure 22:
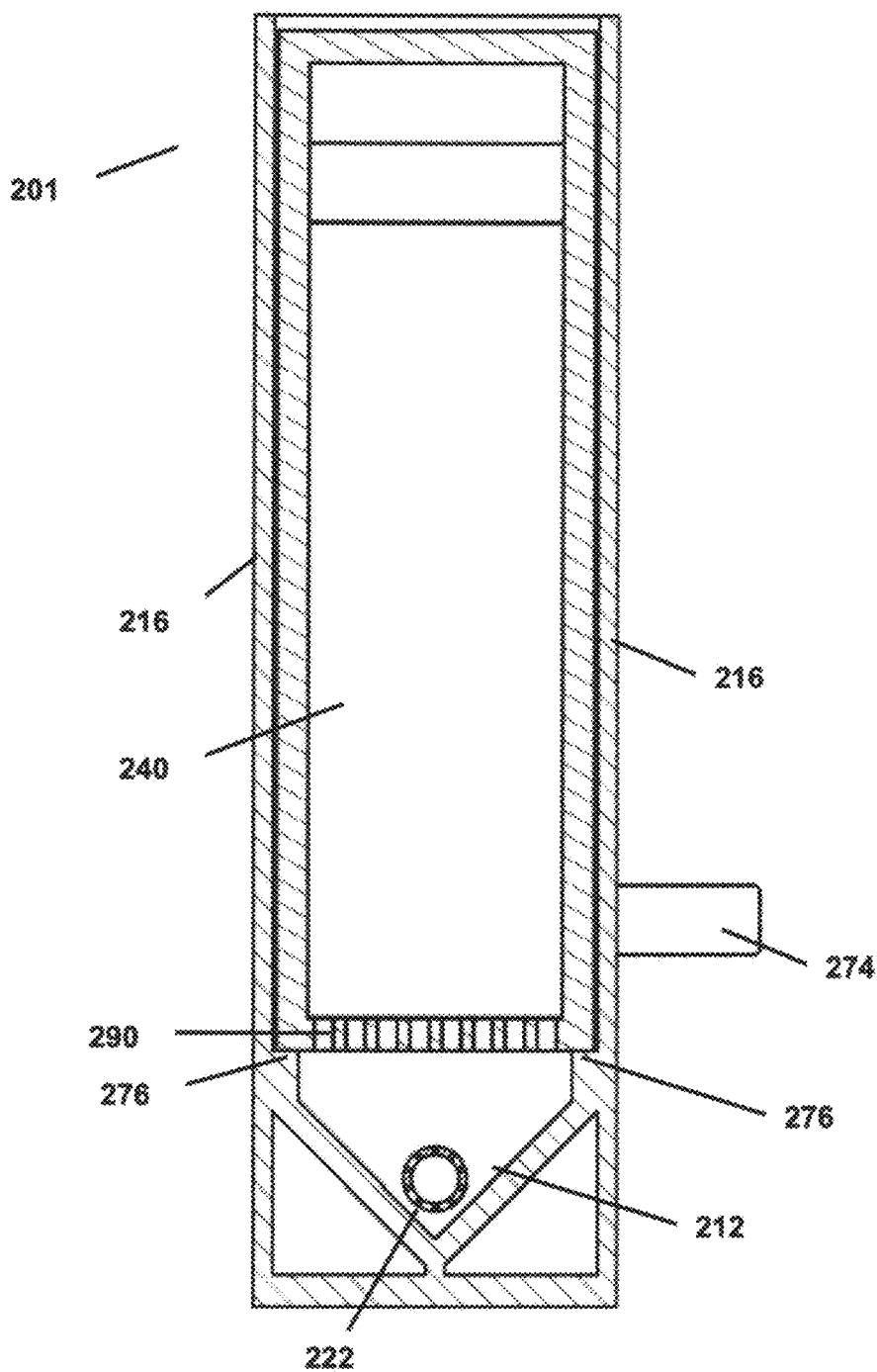
FIG. 22 is a cross sectional view of the apparatus of FIG. 20, through the treatment chamber.
Figure 26:
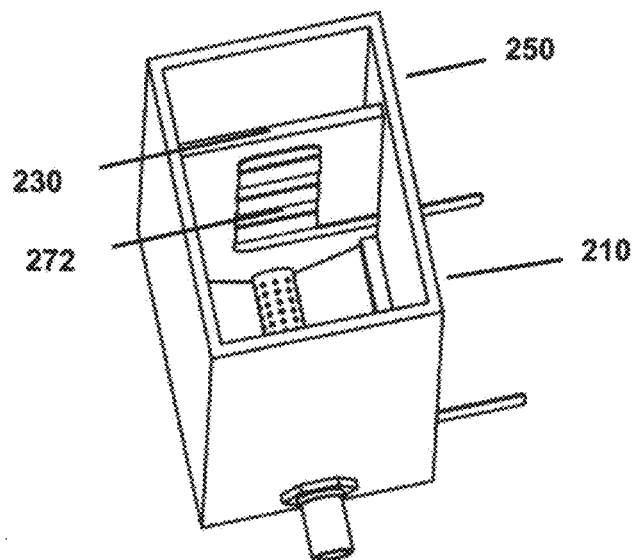
FIG. 26 is a top perspective view of the treatment chamber and defoaming chamber in the apparatus of FIG. 20.
Figure 27:
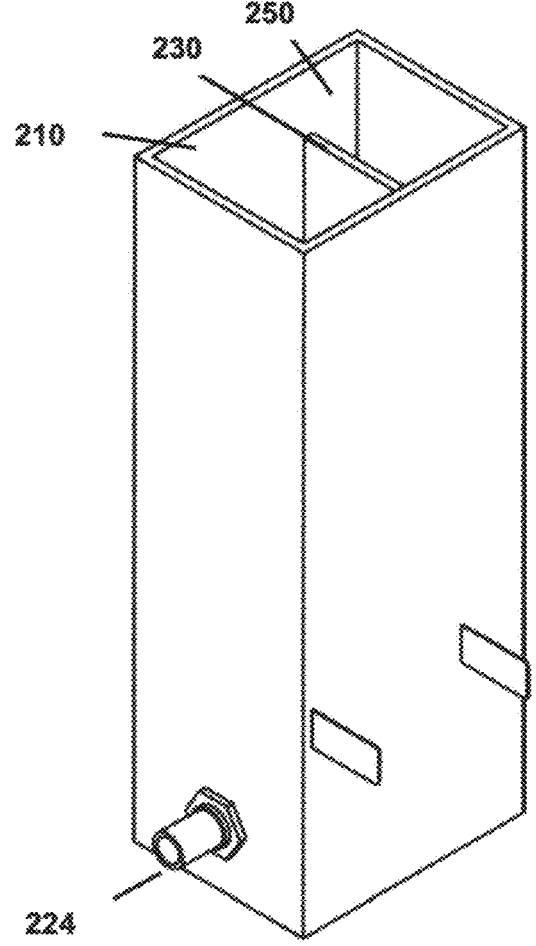
FIG. 27 is a perspective view of the treatment chamber and defoaming chamber of FIG. 26.
Figure 28:
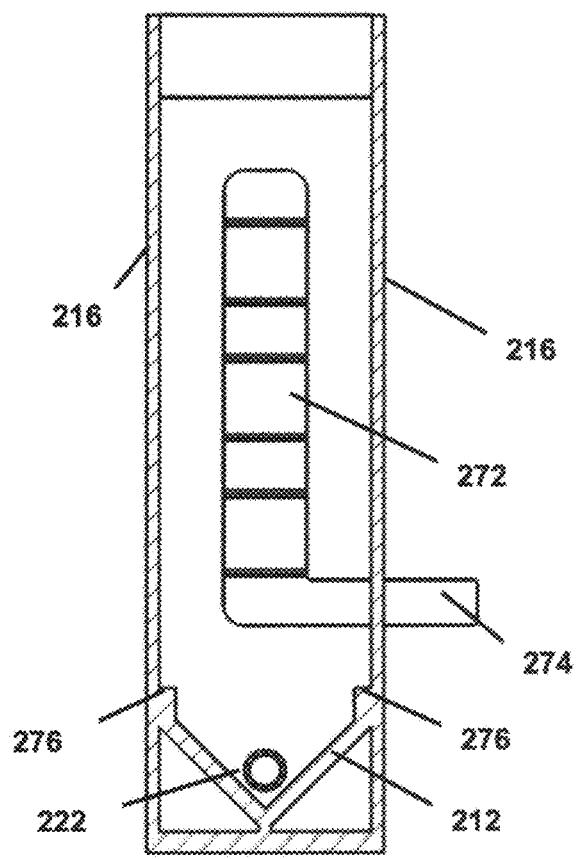
FIG. 28 is a cross sectional view through the treatment chamber of FIG. 26.

The treatment chamber 210 in FIGS. 18 and 19 is about 220 L, and can accept a fluid flow rate of about 5 L/second. The residence time of the fluid in the treatment chamber 210 of FIGS. 11-15 is typically about 30 s.

The treatment chamber 210 in FIGS. 20-22 and 27-30 is about 1 L, and can accept a fluid flow rate of about 2 L/minute. The residence time of the fluid in the treatment chamber 210 of FIGS. 20-22 and 27-30 is typically about 30 s.

The apparatuses 201 illustrated in FIGS. 11-30 are configured to operate at atmospheric temperature and pressure. The apparatus 201 illustrated in FIGS. 31-33 may be configured to operate at atmospheric temperature and pressure, or at reduced or elevated pressures (by applying suction or pressure at ports 218 and 258).

In the examples of FIGS. 11-33, the apparatus 201 is configured so that the fluid rises (or ascends) as it passes through the treatment chamber 210. As illustrated in FIGS. 18-22 and 27-33, the treatment chamber 210 includes a base 212 (or first wall), and four side walls 216.

In FIGS. 18-22 and 27-30 the treatment chamber does not include a second wall (or lid), although a lid may be formed by the handle(s) of the electrode holders 280 (see FIGS. 20 and 21 for example). However, in FIGS. 31-33 the treatment chamber 210 and defoaming chamber 250 include a lid 219, 259. The lids 219, 259 include ports 218, 258 as discussed above. The ports 218, 258 may be for extracting gas.

The treatment chambers 210 in FIGS. 18-33 are generally of substantially rectangular (or square) cross section. Each side wall 216 is planar. However, the bases 212 include a trough or channel and are substantially V-shaped.

The treatment chambers 210 include a disperser 222, and the disperser 222 includes a tube with one fluid entry point 224 and a plurality of inlets 220. The disperser 222 illustrated in the apparatuses 201 of FIGS. 20-33 is a tube perforated along its length to provide a plurality of inlets 220 into the treatment chamber 210 (see FIGS. 21 and 33 in particular). A similar disperser 222 is used in the treatment chamber 210 of FIGS. 18 and 19. The disperser 222 is positioned within the trough or channel in the base 212.

The apparatuses 201 further include a flow aligner 290. The flow aligner 290 is connected to the electrode holders 280 (see FIGS. 16, 17, 23-24, 32 and 33). The flow aligner 290 is in the form of a wall or partition defining a plurality of apertures for passage of the fluid. In use, fluid flows (or is pumped) through the inlets 220 into the lower portion of the treatment chamber 210. The rate at which the fluid flows through the inlets 220 is set so that the fluid pressure on the side of the flow aligner 290 proximate to the at least one inlet is greater than the fluid pressure on the side of the flow aligner 290 proximate to the electrodes 240. The inventors have advantageously found that the combination of the pressure differential across the flow aligner 290 and the consistently spaced and sized apertures across the flow aligner 290 provides an even flow of fluid between the electrodes 240, minimising so-called "dead spots" in between the electrodes 240.

The flow aligner 290 in the apparatuses 201 of FIGS. 11-19 and 31-33 is segmented (with one segment per electrode holder 280). When the electrode holders 280 are in position in the treatment chamber 210, each flow aligner 290 segment is in close proximity with the adjoining segment, so that the electrode holders 280 collectively form the flow aligner 290.

The flow aligner 290 in FIGS. 16, 17 and 31-33 have polygonal (hexagonal) apertures, and the flow aligner 290 in FIGS. 20 to 25, 29 and 30 have ovoid apertures.

The apparatus 201 may be configured to electrochemically treat the fluid in the presence of at least one treatment enhancer or at least one treatment agent. The at least one treatment enhancer is capable of penetrating a solid wall of the treatment chamber, and consequently the at least one treatment enhancer (such as ultraviolet radiation, microwave radiation or ultrasonic waves) may be applied to a side wall 216 of the treatment chamber 210. The at least one treatment agent may enter the treatment chamber 210 through at least one treatment inlet, such as through a gas inlet 260 (see FIG. 19). The gas inlets 260 may be part of a gas disperser, which may be integral with the base 212 of the treatment chamber 210. The types and function of such gases may be as previously described. Alternatively, the at least one treatment inlet may be mixed with the fluid to be treated before the fluid enters the treatment chamber 210. As illustrated in FIG. 11, in the illustrated system 200 the dosing tank 304 may include a treatment agent which is mixed with the fluid in balance tank 302 before the fluid enters the treatment chamber. Also, at least one treatment agent may be added to the fluid entering the storage tank 314 after electrochemical treatment from dosing tank 304. Furthermore, in FIG. 11 at least one treatment agent (in the form of a pH modifier (an acid)) may be added to the treatment chamber 210 during the electrochemical treatment from acid tank 305.

The treatment chamber 210 also includes at least one outlet 230 for exit of electrochemically treated fluid. In the apparatuses 201 of FIGS. 18, 22 and 27-33 the at least one outlet 230 is one outlet. As shown in FIGS. 18, 19, 21 and 32, in these apparatuses 201 the outlet 230 is positioned so that the electrodes 240 are configured to be positioned intermediate the at least one inlet 220, and the at least one outlet 230, and the at least one inlet 220 is positioned in a lower portion of the treatment chamber 210 and the at least one outlet 230 is positioned in an upper portion of the treatment chamber 230.

In the apparatuses 201 of FIGS. 18-22 and 27-33 the at least one outlet 230 is in the form of a weir or spillway. The outlet 230 is positioned at the intended height of liquid in the treatment chamber 210. In the apparatuses 201 of FIGS. 18-22 and 27-33, after exiting the treatment chamber 210 at outlet 230, the liquid passes to a defoaming chamber 250.

In the apparatus 201 of FIGS. 18 and 19, the outlet 230 is in association with a flow diverter 232 in the defoaming chamber 250 over which the electrochemically treated liquid (and floc) flows as it exits the treatment chamber 210. In FIGS. 18 and 19, the flow diverter 232 extends the weir or spillway formed by the outlet 230. The flow diverter 232 is intended to divert the flow of electrochemically treated liquid to thereby increase the liberation of gas from the liquid. As illustrated in FIG. 18 the defoaming chamber 250 may include at least one defoamer 252. The defoamer 252 may include one or more nozzles for spraying liquid onto the foam. The sprayed liquid is intended to penetrate the foam bubbles to thereby release the gas trapped in the foam. The liquid exits the defoaming chamber 250 through an outlet 254 at the base of the chamber 250.

In the apparatus 201 of FIGS. 20-22 and 27-30, the defoaming chamber 250 does not include a defoamer 252. After flowing through outlet 230, the liquid descends through defoaming chamber 250 and then through an outlet 254 at the base of the chamber 250.

In the apparatus 201 of FIGS. 31-33, the defoaming chamber 250 includes a first flow diverter 234 and a second flow diverter 236. The first flow diverter 234 provides a weir inside the defoaming chamber 250. The second flow diverter 236 provides an underflow weir (under which fluid passes when flowing through the defoaming chamber 250). The bottom of the second flow diverter 236 extends below than the top of the first flow diverter 234. Both the first and second flow diverters 234, 236 are substantially vertical and are in the form of a wall or plate. In the arrangement illustrated in FIG. 32, electrochemically treated fluid exits the treatment chamber 210 through outlet 230. The fluid then falls into the space between the second flow diverter 236 and the outlet 230, and in use fluid fills this space to at least the height of the first flow diverter 234. As foam floats, the foam is trapped in this space, and the fluid falling into this space over outlet 230 penetrates the foam to thereby release trapped gas. Meanwhile, defoamed fluid passes beneath the second flow diverter 236 and then over the first flow diverter 234 before exiting the defoaming chamber 250 through outlet 254.

In FIGS. 11 and 12, after exiting the defoaming chamber 250 the fluid flows to a vessel for separation of the floc from the fluid (clarifier 306). A floc mover 80 (as described above) may be used with the vessel (or clarifier 306) to assist in separating the floc.

In the apparatuses of FIGS. 11-33, the electrodes 240 are added or removed from the treatment chamber 210 via electrode holders 280. In the apparatus 201 of FIGS. 18 and 19 the treatment chamber 210 includes grooves 270 for slideable engagement of the electrode holder 280 in the treatment chamber 210. However, in the apparatus 201 of FIGS. 31-33 no such grooves 270 are present. In the apparatuses 201 of FIGS. 18-22 and 27-33 the treatment chamber 210 also includes a shelf 276 upon which the electrode holders 280 rest when in position.

Within each electrode holder 280 only two or three electrodes 240 may be connected to power (and thereby become anodes and cathodes). The remaining electrodes may all be electrical conductors. In each electrode holder 280 each electrode 240 is substantially planar and is of solid construction. The electrodes 240 may have a tapered lower edge, as previously described. The apparatuses 201 of FIGS. 11-33 are configured so that the electrodes 240 are positionable below the level of the fluid in the treatment chamber 210. The apparatuses 201 of FIGS. 11-33 are configured so that the electrodes 240 are positioned substantially vertically (substantially in a plane perpendicular to the first wall 212) within the treatment chamber 210 (although it may also be advantageous to position the electrodes 240 (or a portion of the electrodes) at an angle as previously described).

As illustrated in FIGS. 16, 17, 23-25 and 33, the electrode holder 280 includes a frame 281, and the frame 281 includes a handle 282 and two side walls 284. The frame 281 is substantially "U" shaped. The frame also includes a flow aligner 290 (or a segment thereof).

The treatment chamber 210 of FIGS. 13-15, 18, 19, 20-22 and 29-33 further includes at least one power connector 272 for connecting power to an electrode holder 280 or to at least one electrode 240 held by the electrode holder 280. In the treatment chamber 210 exemplified in FIGS. 18 and 19, the treatment chamber 210 includes a power connector for each electrode holder 280, and the power connectors extend from the base 212 of the treatment chamber 210 (not shown in the Figures). In this example, the electrode holder 280 includes an electrode holder power connector extending towards the base 212 of the treatment chamber 210. The treatment chamber power connector and electrode holder power connector may be configured for mating arrangement with each other. The power connectors may be made of any suitable material, but in this example may be made of bronze. In the electrode holder 280 of FIGS. 16 and 17, the power flows from the power connector up the side wall(s) 284 of the electrode holder 280 and then to selected electrodes 240.

A different mechanism for connecting power to the electrodes 240 is illustrated in the treatment chamber 210 of FIGS. 20-22 and 26-30. In FIGS. 20-22 and 26-30, the treatment chamber 210 is configured to supply power longitudinally along the working face of at least one electrode 240. In this example, the power connector 272 is adapted to contact the working face of at least one electrode 240. The power connector 272 includes a corrugated spring steel strip. In this example, the power connector 272 also traverses the wall of the treatment chamber 210 to provide a tab 274 for connection to a power source. A similar arrangement may be used with a plurality of electrode holders 280 (such as in the treatment chamber 210 of FIGS. 11-15), as in this case each power connector 272 may be positioned intermediate to the working face of a terminal electrode 240 held by two electrode holders 280. The crests (and troughs) of the power connector 272 may be positioned so that the crests of the power connector 272 contact one terminal electrode 240, and the troughs of the power connector 272 contact the other terminal electrode 240.

A similar mechanism for connecting power to the electrodes 240 is illustrated in the treatment chamber 210 of FIGS. 31-33. In FIGS. 31-33 the treatment chamber 210 is also configured to supply power longitudinally along the working face of at least one electrode 240. However, while the power connector 272 illustrated in FIGS. 20-22 and 27-30 includes one corrugated spring steel strip per electrode 240, in FIGS. 31-33 the power connector 272 includes two corrugated spring steel strips per electrode 240 (see FIG. 33). The treatment chamber 210 in the apparatus 201 of FIGS. 31-33 includes four power connectors 272, and each power connector provides power to only one electrode 240.

In FIGS. 16, 17, 20-25 and 29-33, the electrodes 240 are, on average, 3 mm thick and 3 mm apart. However, alternative thicknesses and distances may also be used in the apparatus 201.

In the apparatus 201 of FIGS. 20-22 and 26-30 two of the 13 electrodes 240 (or about 15% of the electrodes 240) are connected to power. The remaining nine electrodes 240 are all electrical conductors.

In the apparatus 201 of FIGS. 31-33, four of the 160 electrodes 240 (or about 2.5% of the electrodes 240) are connected to power. The remaining 156 electrodes 240 are all electrical conductors.

The treatment chamber 210 in FIGS. 31-33 also includes a divider wall (or plate) 217 positionable between the electrode holders 280. The electrode holders 280 in FIGS. 31 and 33 also include an electrode holder remover 283 (in the form of a cable loop or string) to assist in removing the electrode holder 280 from the treatment chamber 210.

As illustrated in FIGS. 13-15, the apparatus 201 may further include a fluid pump 324 for pumping fluid to be treated through the at least one inlet for entry of a fluid to be treated, and a further pump 324 for pumping fluid from the defoaming chamber 250 (see FIG. 13). In FIG. 13, 326 is a treated water outlet (DN80), 328 is a fresh water inlet (DN25), 330 is a clean in place connection (DN25), 332 is a drain outlet (DN25) and 334 is a raw water inlet (DN80). The power supply to the apparatus 201 of FIGS. 13-15 is 415 V, 50 Hz and 150 A.

The apparatus 201 of FIGS. 11-15 further includes sensors for sensing the level of fluid in the treatment chamber 210, and a variable speed pump 324 to control the flow rate of fluid exiting the treatment chamber 210. The sensors and variable speed pump 324 may form part of a system for regulating the electrochemical treatment, which may be controlled by controller (PLC) 307. The controller 307 may control the polarity of the current and its reversal to thereby switch the electrodes 240 between anodes and cathodes. The controller 307 may also control the sinewave ramping angles during the electrochemical treatment, and/or modify the rate of current application to the electrodes 240 during the electrochemical treatment. Similar components may be used in the apparatuses 201 discussed in FIGS. 18-33.

Any suitable current may be applied to the electrodes 240 during the electrochemical treatment, however the voltage applied to each electrode holder 280 in the treatment chamber 210 in FIGS. 11-33 is typically between about 20 and 45 V, especially about 26 V or about 40 V. The effective voltage to each cell is typically around 2-3 V, especially about 2.6 V or about 3 V. For the apparatus 201 of FIGS. 31-33, the total voltage applied to the treatment chamber 210 may be about 415 V, resulting in an effective voltage to each cell (given there are 160 electrodes 240) of about 2.6 V.

In use, fluid is pumped into the treatment chamber 210 via the at least one inlet 220, and fluid pressure builds beneath flow aligner 290. Fluid passes through the flow aligner 290 and between the electrodes 240 where the fluid is electrochemically treated and floc is generated. The floc and electrochemically treated fluid then flow to the upper portion of the treatment chamber 210, and gas bubbles (from gas inlets 260, for example) may assist in driving the floc and electrochemically treated fluid vertically. The floc and electrochemically treated fluid then pass through the at least one outlet 230 and into the defoaming chamber 250, over/around flow diverter(s) 232 and optionally past defoamers 252. This process leads to defoaming of the floc/electrochemically treated liquid. The floc/electrochemically treated fluid then flows out the outlet 254 in the defoaming chamber 250 and then to a vessel for separation of the floc (e.g. clarifier 306).

Figure 36:
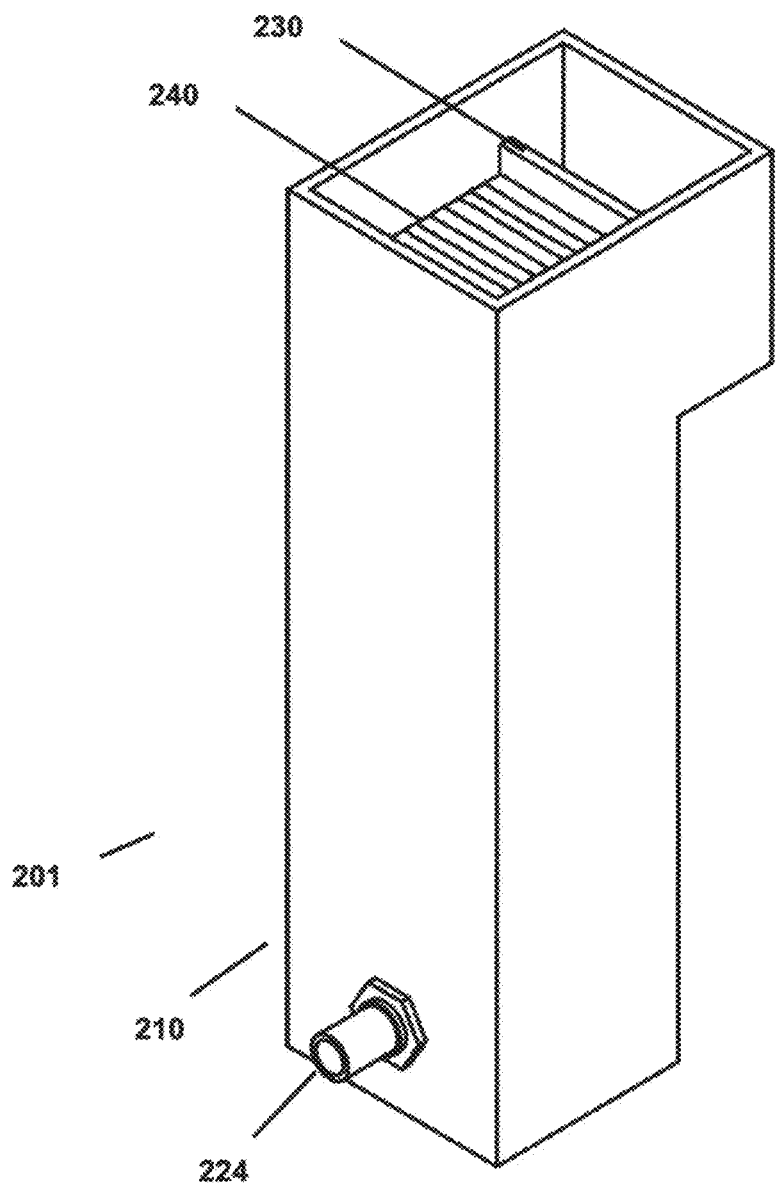
FIG. 36 is a perspective view of a sixth example electrochemical/electrolytic liquid treatment apparatus.
Figures 37, 38:
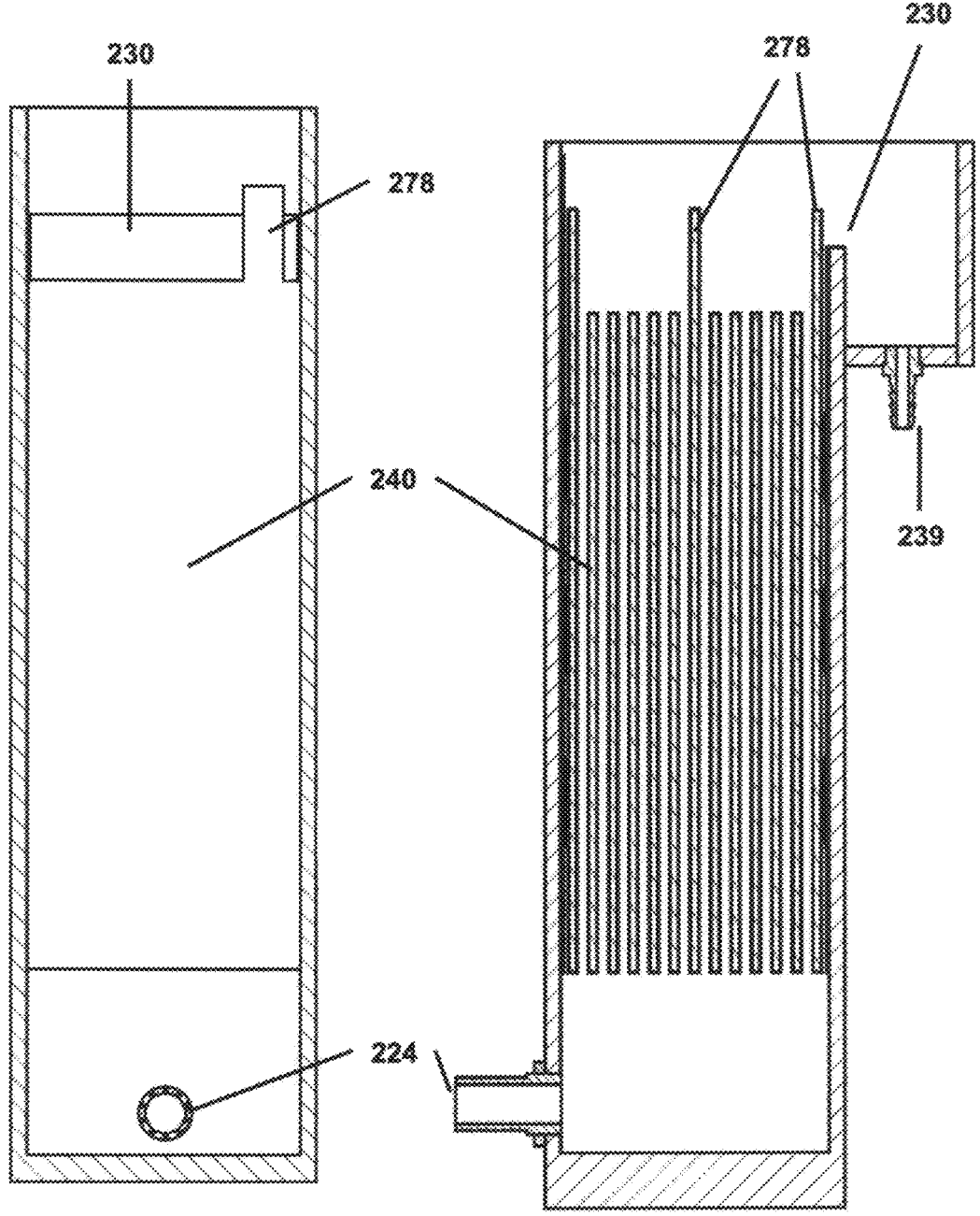
FIG. 37 is a cross sectional view through the apparatus of FIG. 36.
FIG. 38 is a cross sectional view through the apparatus of FIG. 36.

A further apparatus 201 is illustrated in FIGS. 36-38. This apparatus 201 is similar to the apparatuses described, for example at FIGS. 20-30. This apparatus 201 includes a fluid entry point 224 through which fluid enters the treatment chamber 201. The fluid then passes between electrodes 240, which are individually removable. Each or a portion of the electrodes 240 include a vertically extending tab 278 which is located above the fluid level when the apparatus 201 is in use. Power may be connected to the tabs 278 to thereby provide at least one cathode and at least one anode. During electrochemical treatment floc may be created, which together with electrochemically treated liquid flows over outlet 230 and through drain 239.

The apparatus 201 of FIGS. 36-38 may accommodate 13 electrodes 240, of which two or three electrodes 240 are typically connected to power (the remaining electrodes would be electrical conductors). The treatment chamber 210 in FIGS. 36-38 has a capacity of about 1 L, and can accept a fluid flow rate of up to about 2 L/minute. The residence time of the fluid in the treatment chamber 210 of FIGS. 36-38 is typically about 30 s.

EXAMPLES

In examples 1-8, unless otherwise described the following test conditions outlined in Table 1 were used for the electrochemical treatment steps.

TABLE 1

Test Conditions Used for Electrochemical Treatment Steps

| | Value | Units |
|---|---|---|
| Contact Time | 0.5 to 1.0 | min |
| Flow Rate | 1.15 | L/m |
| Initial Voltage | 37.9 | V |
| Number of Electrodes | 13 | |
| Number of Active Electrodes | 12 | |
| Surface Area of One Electrode Face | 150 | cm$^2$ |
| Total Exposed Electrode Area | 3,600 | cm$^2$ |
| Polarity Reversal Period | 30 | s |

For the first electrochemical treatment step, a low current was typically used (1-5 A), and mild steel electrodes. For the second electrochemical treatment step a high current was typically used (8-15 A) and aluminium electrodes. The electrodes in the electrochemical treatment steps were configured to reverse their polarity about every 30 seconds.

Experiments were performed on frac return water (Example 1, Table 2), flowback water (Example 2, Table 3), frac flowback water (Example 3, Table 4), and produced water (Example 4, Table 5). An exemplary landfill waste characterisation is also provided in Example 5 (Table 6). The experiments may be generally performed in accordance with the process flow diagram illustrated in FIG. 34 (the filtration steps in examples 1-5 include first sand or media (such as granular ferric hydroxide and granular activated carbon) filtration, optionally followed by a membrane filtration (ultrafiltration or nano-filtration), optionally followed by reverse osmosis). The solid residue following the first and second clarification steps may be combined for disposal (as shown in the Landfill Waste column). Unless otherwise described, the experiments below were performed using the apparatus 201 illustrated in FIGS. 36-38. However, the experiments may also be performed using any of the apparatuses 201 illustrated in the Figures and discussed above. Typical results are provided below.

Example 1: Frac Return Water

TABLE 2

| | Purification of Frac Return Water | | | | | |
|---|---|---|---|---|---|---|
| Element | Cooper Basin Australia Diluted 2:1 Raw (mg/L) | After first electrochemical treatment step (mg/L) | After second electrochemical treatment step (mg/L) | After filtration (mg/L) | Targets (mg/L) (P) = Preferred | Landfill Waste (mg/kg) |
| Boron | 55 | 40 | 15 | 0.1 | <5 (P) | 1,800 |
| Hydrocarbons | 405 | 5 | 0.1 | 0.01 | <10 (P) | <500 |
| Bacteria | NR | 1 | 0.01 | 0.01 | <100,000 | 0 |
| pH | 7.5 | 8 | 9 | 8 | 6-8 | N/A |
| Temp | NR | Ambient | Ambient | Ambient | 40° F.-100° F. | N/A |
| Chloride | 10,000 | 10,200 | 10,050 | 150 | <15,000 | <50,000 |
| Calcium | 75 | 6 | 2 | 0.1 | <500 | 2,500 |
| Magnesium | 25 | 3 | 1 | 0.1 | 25-500 | 830 |
| Iron | 1 | 2.5 | 1 | 0.1 | <2 (P) | 30 |
| Fluoride | 10 | 8 | 6.4 | 1 | <10 | 300 |
| Phosphate | 1 | 0.8 | 0.65 | 0.1 | <5 | 30 |
| Red. agents | NR | 0 | 2 | 0 | 0 | 0 |
| Sulfates | 100 | 80 | 64 | 1 | <500 (P) | 3,300 |
| TDS | 50,000 | 50,000 | 50,000 | 5 | <50,000 | N/A |
| COD | 3,000 | 1730 | 732 | 1 | <10 | N/A |
| BOD | 630 | 363 | 154 | 0.2 | <10 | N/A |

Example 2: Flowback Water

TABLE 3

Purification of Flowback Water

| Element | Cooper Basin Flowback Raw (mg/L) | After first electrochemical treatment step (mg/L) | After second electrochemical treatment step (mg/L) | After filtration (mg/L) | Targets (mg/L) (P) = Preferred | Landfill Waste (mg/kg) |
|---|---|---|---|---|---|---|
| Boron | 56.3 | 38.9 | 14.7 | 0.1 | <5 (P) | 1,850 |
| Hydrocarbons | NR | 6 | 0.1 | 0.1 | <10 (P) | <500 |
| Bacteria | NR | 1 | 0.01 | 0 | <100,000/mL | 0 |
| pH | 8.1 | 8.5 | 9.1 | 8 | 6-8 | N/A |
| Temp | NR | Ambient | Ambient | Ambient | 40° F.-100° F. | N/A |
| Chloride | 13,560 | 13,720 | 13,400 | 172 | <15,000 | <50,000 |
| Calcium | 199.4 | 18 | 6 | 0.1 | <500 (P) | 6,462 |
| Magnesium | 66.8 | 9 | 3 | 0.3 | 25-500 | 2,011 |
| Iron | 2.4 | 6 | 2.5 | 0.1 | <2 (P) | 75 |
| Fluoride | 10 | 9 | 6.5 | 1.5 | <10 | 291 |
| Phosphate | 1 | 0.9 | 0.7 | 0.1 | <5 | 29 |
| Red. agents | NR | 0 | 2 | 0.5 | 0 | 0 |
| Sulfates | 53.1 | 41.1 | 32.8 | 0.1 | <500 (P) | 2,100 |
| TDS | 24,303 | 24,303 | 24,303 | 2.4 | <50,000 | N/A |
| COD | 2820 | 1613 | 698 | 0.1 | <10 | N/A |
| BOD | 604 | 361 | 155 | 0 | <10 | N/A |

Example 3: Frac Flowback Water

TABLE 4

Purification of Frac Flowback Water

| Element | Cooper Basin Australia Raw (mg/L) | After first electrochemical treatment step (mg/L) | After second electrochemical treatment step (mg/L) | After filtration (mg/L) | Targets (mg/L) (P) = Preferred | Landfill Waste (mg/kg) |
|---|---|---|---|---|---|---|
| Boron | 23.9 | 17 | 6 | 0 | <5 (P) | 794 |
| Hydrocarbons | NR | 7 | 0.2 | 0.1 | <10 (P) | <500 |
| Bacteria | NR | 1 | 0.01 | 0 | <100,000/mL | 0 |
| pH | 7 | 8.5 | 9.1 | 8 | 6-8 | N/A |
| Temp | NR | Ambient | Ambient | Ambient | 400 F.-1000 F. | N/A |
| Chloride | 8,784 | 8,555 | 8,415 | 120 | <15,000 | <50,000 |
| Calcium | 518 | 48 | 15 | 0.3 | <500 (P) | 15,242 |
| Magnesium | 53 | 7 | 3 | 0.2 | 25-500 | 1,756 |
| Iron | 17 | 42 | 17 | 1.1 | <2 (P) | 545 |
| Fluoride | 10 | 9 | 6 | 1.3 | <10 | 279 |
| Phosphate | 1 | 0.8 | 0.7 | 0.1 | <5 | 28 |
| Red. agents | NR | 0 | 2 | 0.5 | 0 | 0 |
| Sulfates | 18 | 14 | 11 | 0 | <500 (P) | 1,009 |
| TDS | 11,694 | 11,694 | 11,694 | 120 | <50,000 | N/A |
| COD | 2,480 | 1412 | 622 | 5 | <10 | N/A |
| BOD | 1090 | 612 | 256 | 2 | <10 | N/A |

Example 4: Produced Water

TABLE 5

Purification of Produced Water

| Element | Produced Water Cooper Basin (Raw) (mg/L) | After first electrochemical treatment step (mg/L) | After second electrochemical treatment step (mg/L) | After filtration (mg/L) | Targets (mg/L) (P) = Preferred | Landfill Waste (mg/kg) |
|---|---|---|---|---|---|---|
| Boron | 5.7 | 4 | 0.1 | 0 | <5 (P) | 190 |
| Hydrocarbons | NR | 8 | 0.1 | 0.1 | <10 (P) | <500 |
| Bacteria | NR | 1 | 0 | 0 | <100,000/mL | 0 |
| pH | 8.02 | 8.5 | 8 | 8 | 6-8 | N/A |
| Temp | NR | Ambient | Ambient | Ambient | 400 F.-1000 F. | N/A |
| Chloride | 7,867 | 7,546 | 7,189 | 105 | <15,000 | <50,000 |
| Calcium | 417 | 30 | 3 | 0.5 | <500 (P) | 13,567 |
| Magnesium | 261 | 29 | 11 | 1 | 25-500 | 8,624 |
| Iron | 2.9 | 7 | <1 | 0.1 | <2 (P) | 82 |
| Fluoride | 10 | 9 | 6.5 | 1.5 | <10 | 288 |
| Phosphate | 1 | 0.8 | 0.7 | 0.1 | <5 | 26 |
| Red. agents | NR | 0 | 0.5 | 0.5 | 0 | 0 |
| Sulfates | 4455 | 3573 | 121 | 12 | <500 (P) | 98,211 |
| TDS | 10,680 | 10,680 | 10,680 | 155 | <50,000 | N/A |
| COD | 50 | 33 | 0.1 | 0 | <10 | N/A |
| BOD | 2 | 1 | 0 | 0 | <10 | N/A |

Example 5: Landfill Waste Characterisation

TABLE 6

Characterisation of Landfill Waste

| Parameter | EPA (S.A.) Target | Exemplary Landfill waste | AS4439 Target | Exemplary Landfill waste TCLP Leachate Test |
|---|---|---|---|---|
| Barium | 300 | 300 | 100 | 21 |
| Benzo(a)pyrene | 1 | <0.1 | 0.001 | — |
| Cadmium | 3 | 2 | 0.5 | — |
| Cobalt | 170 | <20 | — | — |
| Copper | 60 | <40 | 10 | — |
| Lead | 300 | <10 | — | — |
| Manganese | 500 | <300 | — | — |
| Mercury | 1 | <1 | — | — |
| Nickel | 60 | <20 | — | — |
| TPH (C6-C9) | 65 | <1.0 | — | <0.01 |
| TPH (C10-C36) | 1000 | 978 | — | <0.02 |
| Total BTEX | n/r | <2.0 | — | <0.1 |
| Total PAH | 5 | <2.5 | — | <0.1 |
| Zinc | 200 | — | — | <1.0 |

Example 6: Composition of Formation Water

The concentration of components in formation water influences the strategy selected for treatment. Therefore the concentration of various components (analytes) in formation water was determined, and the results are provided below.

TABLE 7

Composition of Formation Water

| Analyte | Test 1 | Test 2 |
|---|---|---|
| pH | 7.84 | 8.1 |
| Temperature | | 21.9 |
| Conductivity (as µS/cm) | 11,370 | 10,700 |
| Heterotrophic Plate Count (22° C.) CFU/mL | 1,500 | 1,700 |
| Heterotrophic Plate Count (36° C.) CFU/mL | | 2,000 |
| Total Organic Carbon (TOC) (mg/L) | <1 | 2 |
| Dissolved Organic Carbon (DOC) (mg/L) | <1 | 1 |
| Turbidity | 1.18 | 0.3 |
| True colour (Pt—Co) | 1.7 | 4 |
| Apparent Colour (Pt—Co) | 22.2 | 5 |
| Total Dissolved Solids (mg/L) | 6145 | 6330 |
| Total Suspended Solids (TSS) mg/L | 28 | <25 |
| Silica as Si (mg/L) (Total) | 6.4 | 7 |
| Silica (Colloidal) | 0.4 | 0.42 |
| Silica (Dissolved) | 6.0 | 6.58 |
| Sodium as Na (mg/L) | 2,468 | 2,240 |
| Potassium as K (mg/L) | 14 | 15 |
| Total Hardness (mg/L as $CaCO_3$) | 340 | 343 |
| Calcium as Ca (mg/L) | 71.4 | 78 |
| Magnesium as Mg (mg/L) | 35.6 | 36 |
| Barium as Ba (mg/L) | 14.0 | 14.2 |
| Strontium as Sr (mg/L) | 17.0 | 17.4 |
| Alkalinity (mg/L as $CaCO_3$) | 420 | 389 |
| Bicarbonate (mg/L as $CaCO_3$) | 420 | 389 |
| Carbonate (mg/L as $CaCO_3$) | 0 | <1 |
| Aluminium as Al (mg/L) | 0.021 | <0.01 |
| Iron (Total) | 2.0 | 2.1 |
| Iron as Fe (mg/L) | 0.008 | |
| Manganese | 0.144 | 0.14 |
| Sulfate (Sulfate) | <1 | <1 |
| Chloride | 3,546 | 3,740 |
| Nitrate (as nitrate) | nd | nd |
| Boron (as mg/L) | 0.8 | 0.62 |
| Fluoride | 2.58 | 1.5 |
| Carbon Dioxide | 350 | 342 |
| Ammonia (as $NH_3$) | 3.6 | 3.49 |
| Total Phosphorus as P (mg/L) | 0.055 | 0.02 |
| Phosphate, dissolved as $PO_4$ (mg/l) | nd | 0.04 |
| Total Nitrogen as N (mg/L) | 3.9 | 3.7 |
| UV 254 nm Absorbance | 0.0071 | |

Example 7: Electrochemical Treatment of Formation Water—Aluminium Electrodes

The formation water outlined in example 6 was subjected to electrochemical treatment. Unless otherwise defined, the conditions for the electrochemical treatment were as outlined above for examples 1-5.

In the present example, aluminium electrodes (including aluminium sacrificial anodes) were used, and the effect of various contact (residence) times was analysed. The results are provided in Table 8.

Example 8: Electrochemical Treatment of Formation Water—Mild Steel Electrodes The formation water outlined in example 6 was subjected to electrochemical treatment. Unless otherwise defined, the conditions for the electrochemical treatment were as outlined above for examples 1-5.

In the present example, mild steel electrodes (including mild steel sacrificial anodes) were used, and the effect of various contact (residence) times was analysed. The results are provided in Table 9.

TABLE 9

Purification of Formation Water using Mild Steel Electrodes

| | Electrodes - Mild Steel | | | |
|---|---|---|---|---|
| Contact Time (s) | 60 | 30 | 10 | 5 |
| Settled Floc volume after 60 minutes (ml) | 1420 | 1300 | 490 | 250 |
| Calcium Removal Efficiency (%) | 84.8 | 74.0 | 40.9 | 32.7 |
| Magnesium Removal Efficiency (%) | 89.7 | 59.8 | 29.9 | 23.3 |
| Barium Removal Efficiency (%) | 69.9 | 54.9 | 25.8 | 25.2 |
| Strontium Removal Efficiency (%) | 52.8 | 36.6 | 11.1 | 10.1 |
| Silica Removal Efficiency (%) | 94.3 | 94.2 | 83.2 | 78.6 |
| Residual Iron or Aluminium in Treated CSG Water (mg/L) | | | | |
| Aluminium | 0.002 | 0.003 | 0.07 | 0 |
| Iron | 0.006 | 0.006 | 0.0 | 0.021 |
| Bulk Solution pH | | | | |
| Initial CSG Water | 8.16 | 8.16 | n.d. | n.d. |
| Treated Effluent | 9.69 | 9.2 | n.d. | n.d. |
| Utility and Material Consumption | | | | |
| Average Voltage (V) | 31.61 | 33.07 | 30 | 36.5 |
| Average Current (A) | 10.08 | 10.59 | 10.92 | 9.3 |
| Flow Rate (L/min) | 1.05 | 1.05 | 4.05 | 8.1 |
| Power Consumption (kWh/kL) | 10.12 | 5.56 | 1.35 | 0.70 |
| Power Cost (A$/kL) | 1.01 | 0.55 | 0.13 | 0.07 |
| Total Volume of Water Treated (L) | 0.0 | 0.0 | 64.7 | 23.7 |
| Total Test time (min) | n.d. | n.d. | 15.98 | 2.92 |

TABLE 8

Purification of Formation Water using Aluminium Electrodes

| | Aluminium electrodes | | | |
|---|---|---|---|---|
| Contact Time (s) | 60 | 30 | 10 | 5 |
| Calcium Removal Efficiency (%) | 45.0 | 31.3 | 28.7 | 11.8 |
| Magnesium Removal Efficiency (%) | 90.9 | 49.3 | 56.2 | 42.9 |
| Barium Removal Efficiency (%) | 35.7 | 44.3 | 46.1 | 33.1 |
| Strontium Removal Efficiency (%) | 36.6 | 34.6 | 24.2 | 17.4 |
| Silica Removal Efficiency (%) | 98.1 | 96.6 | 95.8 | 93.2 |
| Iron Removal Efficiency (%) | nd | nd | 9.1 | 10.0 |
| Aluminium | 3.6 | 3.1 | 3.0 | 0.846 |
| Iron | 0.01 | 0.01 | 0.01 | 0.018 |
| Initial CSG Formation Water pH | 7.74 | 7.74 | 8.01 | n.d. |
| Treated Effluent pH | 8.52 | 8.43 | 8.49 | n.d. |
| Utility and Material Consumption | | | | |
| Contact time | 60 | 30 | 10 | 5 |
| Average Voltage (V) | 28.2 | 32.6 | 30.8 | 30.0 |
| Average Current (A) | 8.95 | 8.73 | 10.7 | 10.7 |
| Flow Rate (L/min) | 1.15 | 1.15 | 4.05 | 8.1 |
| Litres of Water Treated in Single Pass | 0.575 | 0.575 | 0.575 | 0.575 |

Example 9: Purification of Frac Return Water

The results from the treatment of Frac return water is provided in Tables 10A, 10B and 10C. In this treatment the apparatus 201 illustrated in FIGS. 36-38 is used, although it is expected that any of the apparatuses 1, 201 illustrated in FIGS. 1-38 could be used. All electrochemical treatment steps were performed under atmospheric temperature and pressure.

In the method, frac return water is obtained as raw untreated water. This water typically smells strongly of hydrocarbons and other additives which may have become putrescent from anaerobic storage and use.

The frac return water is subjected to a first electrochemical treatment step. This step typically involves a 5 A treatment at 40 V with mild steel (iron) electrodes. This step achieves emulsion breaking and phase separation with recovery of some hydrocarbon content as a floating froth and film. Ferrous sludge typically settles.

The electrochemically treated water is then subjected to a second electrochemical treatment step. This step typically involves a current of 10-15 A at 30-40V using aluminium electrodes and an oxidant to achieve reduction in COD through oxidation of refractory organics. Exemplary oxidants include peroxide, persulfate, permanganate and ozone. The selection of oxidant depends upon the concentration of chloride in the solution. If the concentration of chloride exceeds 10,000 mg/L then a persulfate oxidant is used. Otherwise, any of the above oxidants may be used.

The twice-electrochemically treated liquid is then carbon-filtered to remove low-level residual colouring organics and membrane foulants such as tannins and lignins which colour the water. If water clarity is not critical (such as when the treated water is for re-use in oilfield operations), this step may be omitted.

Following carbon filtering or the second electrochemical treatment step, the solution may be filtered through sand or other media. This achieves final polishing of the water prior to re-use or for membrane filtration.

Nanofiltration may be performed on the sand or media filtered water. However, nano-filtration is only needed when there are stringent discharge standards for Chemical Oxygen Demand (COD). Similarly, nano-filtered water may be passed through a reverse osmosis membrane, but this is only necessary when the total dissolved solids (TDS) and chloride require removal so that the water can be re-used in agriculture or other high-value end uses.

TABLE 10A

Purification of Frac Return Water

| Element | Boron (iron plates) mg/L | Boron (aluminium plates) mg/L | $C_6$-$C_{36}$ Hydrocarbons mg/L | Bacteria | pH |
|---|---|---|---|---|---|
| Typical frac return | 55-80 | 55-80 | 200-900 | — | 7.5-8.0 |
| Following first EC treatment | 35-40 | 15-20 | 2-5 | — | 8.0-9.0 |
| Following second EC treatment | 20-25 | 5-10 | <1 | — | 7.5-8.0 |
| After carbon filtration | 15-18 | 5-10 | <0.5 | — | 2.0-3.0 |
| After media/sand filtration | 10-15 | 5-7 | 0.1 | 1 CFU/100 ml | 8.0 |
| After nano filtration | 15 | 5 | 0.01 | 0 | 8.0 |
| After reverse osmosis (RO) | 2 | 0.5 | 0.01 | 0 | 8.0 |
| Maximum Target | <10 mg/l | <10 mg/l | <30 mg/l | <$10^5$/mL | 6-8 |
| Preferred Targets | <5 mg/l | <5 mg/l | <10 mg/l | 1 CFU/100 ml | end-use dependent |

TABLE 10B

Purification of Frac Return Water

| Element | Temp | Chloride mg/L | Calcium (mg/L) | Magnesium mg/L | Iron (iron plates) mg/L |
|---|---|---|---|---|---|
| Typical frac return | Ambient | 10-20,000 | 75 | 25 | 1 |
| Following first EC treatment | Ambient | — | <5 | <5 | 2-3 |
| Following second EC treatment | Ambient | 10-20,000 | <10 | <5 | <5.0 |
| After carbon filtration | Ambient | 10-20,000 | <2 | <2 | <1.0 |
| After media/sand filtration | Ambient | 10-20,000 | <2 | <2 | 1-2 |
| After nano filtration | Ambient | 10-20,000 | <1 | <1 | 0.75-1.0 |
| After reverse osmosis (RO) | Ambient | 150 | 0.1 | 0.1 | 0.1 |
| Maximum Target | 40° F.-100° F. | <15,000 | <2,000 | 25-500 | <10 |
| Preferred Targets | — | end-use dependent | <500 | — | <2 |

TABLE 10C

Purification of Frac Return Water

| Element | Iron (aluminium plates) mg/L | Fluoride mg/L | Phosphate mg/L | Total Dissolved Solids (TDS) mg/L | Chemical Oxygen Demand (COD) mg/L |
|---|---|---|---|---|---|
| Typical frac return | 1 | 10-30 | 5-10 | <50,000 | 3,500-8,000 |
| Following first EC treatment | <1 | 5-10 | <5 | <50,000 | 1,700-2,500 |
| Following second EC treatment | <1 | <5 | <1 | <50,000 | 600-800 |
| After carbon filtration | <0.5 | <10 | <0.1 | <50,000 | 400-500 |
| After media/sand filtration | <1 | <10 | <1 | <50,000 | <400 |
| After nano filtration | 0.5 | <10 | <1 | <35,000 | <40 |
| After reverse osmosis (RO) | 0.1 | <2 | 0.1 | <5 | 1-2 |
| Maximum Target | — | <10 | <5 | <50,000 | <10 |
| Preferred Targets | — | end-use dependent | end-use dependent | end-use dependent | end-use dependent |

The methods described above in preferred embodiments of the present disclosure (as for example illustrated in FIGS. 34 and 35) provide several advantages for the improved treatment of oil and gas wastewater. These, for example, may include:

Improved ability to treat fluids such as frac flow-back fluids compared to methods that rely on filtration. In the present methods, the electrochemical treatment places a charge on most, if not all particles, which provides improved phase separation. In particular, the methods provide separation of the hydrocarbons from the aqueous phase/solution long before membrane filtration. Furthermore, inorganics may also be removed before membrane filtration. This reduces the likelihood of membrane fouling, which can frequently occur.

Highly efficient, modular, scalable and fully relocatable methods and system components.

Effective separation of fluids such as frac-flow back water decreases: transport costs; chemical costs; chemical use; waste disposal costs; water purchase, transport and storage costs; and reduce the water treatment footprint. Furthermore, the methods may provide an increased water treatment throughput, a wider range of re-use or disposal options and improved environmental compliance. Water and chemicals may be recovered and effectively re-used or discharged to the environment.

The system may be operable with extended maintenance intervals and allow for remote real-time monitoring, control and water analysis.

Most treated water by most conventional advanced oxidation processes is unsuitable for re-use or environmental discharge and is costly to treat. This is because frac return contains high levels of refractory organic components designed to withstand high temperature drilling and completion operations, and while free hydroxyl radicals are strong oxidants produced by electrochemically splitting water, most existing advanced oxidation electrochemical processes ignore the presence of radical scavengers in the effluent matrix.

Recovery of agents such as catalysts improve process efficiencies.

When treating frac flow-back water, costs may be reduced by: recovery of hydrocarbons following emulsion breaking; denser solid residues (sludge) which allows more rapid settling; and reduced solid residue (sludge) volumes and higher density solid residues reduces handling and management costs.

When treating frac flow-back water, compliance with environmental regulations may be improved by: early stage settling and clarification producing clear, low turbidity water free of fouling contaminants; exposure to natural and ultraviolet light for extensive periods to enable mineralization of principal contaminants as carbon dioxide and water rather than high COD organic residuals (such as organic acids); consistently low levels of all contaminants provides reassurance to regulatory agencies; final polishing (if required) with ion exchange or membranes is more efficient due to low scaling potential and high throughput.

The apparatus 1, 201 defined in preferred embodiments of the present disclosure (as for example illustrated in FIGS. 1 to 33) provides several advantages. These, for example, may include:

Reduced passivation or surface fouling of the electrodes 40, 240;

Even dispersal of fluid relative to the electrodes 40, 240 throughout the treatment chamber 10, 210, which may maximise efficient contact between the electrodes 40, 240 and the fluid being treated;

Minimisation of so-called "dead-spots" within the treatment chamber 10, 210, where flow of the fluid is reduced;

The fluid substantially rises as it passes through the treatment chamber 10, 210 such that substantially all floc travels to the top 14 of the treatment chamber 10, 210, rather than settling at the bottom as in many prior art apparatuses;

The presence of an oxidant or reductant (or other treatment agent) within the treatment chamber 10, 210 may encourage or facilitate the further electrochemical reactions of reduction or oxidation or may result in enhanced oxidation processes or enhanced reduction processes within the treatment chamber 10, 210;

The floc mover 80 (especially floc skimmer) may assist in providing a horizontal flow for the fluid at the top 14 of the treatment chamber 10 (or top of a vessel (such as a clarifier) in which floc is separated) to thereby assist in removing floc;

The angled electrodes 40 may provide a number of advantages including: (i) preventing passivation (build-up of floc) on the electrodes 40; (ii) applying a horizontal movement to the fluid as it travels through the treatment chamber 10, which may assist in directing the fluid to the fluid outlet 34 and floc to the floc outlet 32; (iii) assisting in agglomerating floc. However, the electrodes 40, 240 need not be angled;

Substantially all floc may be able to efficiently exit the treatment chamber 10 via the floc outlet 32, where it may be separated from the fluid;

Electrodes 40, 240 may be readily replaced or removed (this is important as the anode 44 in particular may corrode during electrochemical treatment);

Even dispersal of gas relative to the electrodes 40, 240 throughout the treatment chamber 10, 210, which may improve or increase the fluid flow velocity between the electrodes 40, 240. This has advantages including: (i) reduction of dangerous gas accumulation at the electrodes 40, 240; (ii) reduced passivation of the at least one cathode 42; and (iii) floc is more likely to be pushed to the top 14 of the treatment chamber 10, 210 where it may be efficiently removed;

An electrode holder 100, 280 may allow for rapid replacement of the electrodes 40, 240 to thereby minimise down-time of the apparatus 1, 201;

The use of a separate vessel for separation of floc (such as clarifier 306 as in FIGS. 11-12) may be advantageous when processing large volumes of fluid;

The use of a flow aligner 290 and a pressure differential across the flow aligner 290 may assist in providing an even flow of fluid between the electrodes 240;

An angled first wall 212 of the treatment chamber, together with a disperser (such as 222) may assist in directing the flow of the fluid towards the electrodes 280);

The use of at least one treatment agent and/or at least one treatment enhancer during, before or after the electrochemical treatment may assist in purifying the fluid. The use of increased pressure may also assist in purifying the fluid (e.g. by facilitating decomposition of contaminants); and The use of defoamers 252 and/or a defoaming chamber 250 may assist in separating the floc from the fluid (by allowing entrained gases to escape which could otherwise be problematic for pumps).

The above advantages when considered individually or collectively provide an apparatus with improved efficiency for electrochemical processes (especially electrocoagulation processes), in particular for oil and gas wastewater treatments. This may include one or more of: improved removal of contaminants, enhanced oxidation or reduction processes, reduced down-time for maintenance, reduced power consumption and higher through-put of a fluid being treated compared to prior art processes. For the avoidance of doubt, this does not mean that other features of the present disclosure do not also provide improved efficiency of electrochemical processes.

In the present specification and claims, the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described includes preferred forms of putting the invention into effect. The invention is, therefore, claimed in any of its forms or modifications within the proper scope of the appended claims appropriately interpreted by those skilled in the art.

The invention claimed is:

1. A method of treating a fluid mixture, the fluid mixture comprising an aqueous phase, a hydrophobic phase and aqueous contaminants, the method comprising the steps of:
   (i) performing a first electrochemical treatment on the fluid mixture to at least partially separate the aqueous phase and the hydrophobic phase; and
   (ii) performing a second electrochemical treatment on the at least partially separated aqueous phase to thereby remove aqueous contaminants from the aqueous phase;
   wherein the first and/or second electrochemical treatment is performed using an electrochemical liquid treatment apparatus comprising:
   a treatment chamber comprising:
      at least one inlet for entry of a liquid to be treated, and
      at least one outlet for exit of electrochemically treated liquid;
   a plurality of electrodes comprising at least one anode, at least one cathode, and at least one electrical conductor positioned intermediate said at least one cathode and said at least one anode;
   at least one electrode holder holding electrodes comprising: (i) at least one electrical conductor; and (ii) at least one anode and/or at least one cathode; wherein the at least one electrode holder is slideable between:
      (i) a holding position in which the electrode holder is engaged with the treatment chamber and said electrodes held by the electrode holder are positioned within the treatment chamber for electrochemical treatment of the liquid; and wherein at least two of said electrodes held by the electrode holder are configured to be differently charged so as to define an electrochemical treatment zone in a liquid passageway therebetween; and
      (ii) a released position in which the electrode holder is not present in the treatment chamber; and
   a flow aligner positioned intermediate the at least one inlet and the plurality of electrodes when the at least one electrode holder is in the holding position; wherein the flow aligner comprises a wall defining a plurality of apertures for passage of the liquid; and wherein the flow aligner is configured to align the flow of the liquid into the liquid passageway between the at least two electrodes and substantially along a longest axis of at least one of the at least two electrodes;
   wherein, when the at least one electrode holder is in the holding position, the treatment chamber comprises at least one power connector for connecting power to said anode or said cathode held by the at least one electrode holder; and wherein, when the at least one electrode holder is in the holding position, the at least one power connector comprises a resilient metal flexed against said anode or said cathode to thereby connect power thereto without use of a screwed connector;

wherein laminar flow of fluid occurs between the electrodes.

2. The method of claim 1, wherein both the first and second electrochemical treatments are performed using an electrochemical liquid treatment apparatus comprising:

a treatment chamber comprising:
at least one inlet for entry of a liquid to be treated, and at least one outlet for exit of electrochemically treated liquid;

a plurality of electrodes comprising at least one anode, at least one cathode, and at least one electrical conductor positioned intermediate said at least one cathode and said at least one anode;

at least one electrode holder holding electrodes comprising: (i) at least one electrical conductor; and (ii) at least one anode and/or at least one cathode; wherein the at least one electrode holder is slideable between:
(i) a holding position in which the electrode holder is engaged with the treatment chamber and said electrodes held by the electrode holder are positioned within the treatment chamber for electrochemical treatment of the liquid; and wherein at least two of said electrodes held by the electrode holder are configured to be differently charged so as to define an electrochemical treatment zone in a liquid passageway therebetween; and
(ii) a released position in which the electrode holder is not present in the treatment chamber; and a flow aligner positioned intermediate the at least one inlet and the plurality of electrodes when the at least one electrode holder is in the holding position; wherein the flow aligner comprises a wall defining a plurality of apertures for passage of the liquid; and wherein the flow aligner is configured to align the flow of the liquid into the liquid passageway between the at least two electrodes and substantially along a longest axis of at least one of the at least two electrodes;

wherein, when the at least one electrode holder is in the holding position, the treatment chamber comprises at least one power connector for connecting power to said anode or said cathode held by the at least one electrode holder; and wherein, when the at least one electrode holder is in the holding position, the at least one power connector comprises a resilient metal flexed against said anode or said cathode to thereby connect power thereto without use of a screwed connector;

wherein laminar flow of fluid occurs between the electrodes.

3. The method of claim 1, wherein the residence time of fluid in the second electrochemical treatment is less than 10 minutes.

4. The method of claim 1, wherein said electrodes are from 1 to 8 mm apart in the electrochemical liquid treatment apparatus.

5. The method of claim 1, wherein the fluid mixture is or is derived from fluid from an oil or gas well.

6. The method of claim 1, wherein the first electrochemical treatment is performed at a resistance of greater than 5 Ω.

7. The method of claim 1, wherein the first electrochemical treatment separates the aqueous phase and the hydrophobic phase.

8. The method of claim 1, wherein the first electrochemical treatment is performed at a pH of less than 6.5.

9. The method of claim 1, wherein the second electrochemical treatment is performed at a resistance of less than 5 Ω.

10. The method of claim 1, wherein the aqueous contaminants include one or more of: a gelling agent, a cross-linker for cross-linking the gelling agent, a boiling point modifier, a salt, a surfactant, an antiscaling agent, a breaking agent, a pH modifier, an anti-clay swelling or suspension agent, an iron chelant, an iron chelate, a microorganism, a de-emulsification agent and an agent to control microorganism content.

11. The method of claim 1, wherein the second electrochemical treatment reduces the concentration of boron in the aqueous phase by at least 40%.

12. The method of claim 1, wherein the second electrochemical treatment reduces the chemical oxygen demand of the aqueous phase by at least 30%.

13. The method of claim 1, wherein the second electrochemical treatment is performed in the presence of at least one treatment agent.

14. The method of claim 13, wherein the at least one treatment agent is an oxidant.

15. The method of claim 1, wherein a treatment enhancer is applied to the aqueous phase during or after the second electrochemical treatment.

16. The method of claim 15, wherein the treatment enhancer is ultraviolet light or ultrasonic waves.

17. A method of treating a fluid mixture, the fluid mixture comprising an aqueous phase, a hydrophobic phase and aqueous contaminants, the method comprising the steps of:
performing a first treatment with electrochemically produced ions on the fluid mixture to at least partially separate the aqueous phase and the hydrophobic phase; and
(ii) performing a second electrochemical treatment on the at least partially separated aqueous phase to thereby remove aqueous contaminants from the aqueous phase;
wherein the second electrochemical treatment is performed using an electrochemical liquid treatment apparatus comprising:
a treatment chamber comprising:
at least one inlet for entry of a liquid to be treated, and at least one outlet for exit of electrochemically treated liquid;
a plurality of electrodes comprising at least one anode, at least one cathode, and at least one electrical conductor positioned intermediate said at least one cathode and said at least one anode;
at least one electrode holder holding electrodes comprising: (i) at least one electrical conductor; and (ii) at least one anode and/or at least one cathode; wherein the at least one electrode holder is slideable between:
(i) a holding position in which the electrode holder is engaged with the treatment chamber and said electrodes held by the electrode holder are positioned within the treatment chamber for electrochemical treatment of the liquid; and wherein at least two of said electrodes held by the electrode holder are configured to be differently charged so as to define an electrochemical treatment zone in a liquid passageway therebetween; and
(ii) a released position in which the electrode holder is not present in the treatment chamber; and
a flow aligner positioned intermediate the at least one inlet and the plurality of electrodes when the at least one electrode holder is in the holding position; wherein the flow aligner comprises a wall defining a plurality of apertures for passage of the liquid; and wherein the flow aligner is configured to align the flow of the liquid into the liquid passageway between the at least two electrodes and substantially along a longest axis of at least one of the at least two electrodes;

wherein, when the at least one electrode holder is in the holding position, the treatment chamber comprises at least one power connector for connecting power to said anode or said cathode held by the at least one electrode holder; and wherein, when the at least one electrode holder is in the holding position, the at least one power connector comprises a resilient metal flexed against said anode or said cathode to thereby connect power thereto without use of a screwed connector;

wherein laminar flow of fluid occurs between the electrodes.

18. The method of claim 1, wherein the plurality of electrodes are planar.

19. The method of claim 1, wherein the at least one outlet for exit of electrochemically treated liquid is only one outlet in the form of a weir.

* * * * *